United States Patent
Nazari et al.

(10) Patent No.: US 11,055,861 B2
(45) Date of Patent: Jul. 6, 2021

(54) DISCRETE EVENT SIMULATION WITH SEQUENTIAL DECISION MAKING

(71) Applicant: SAS Institute Inc., Cary, NC (US)

(72) Inventors: Mohammadreza Nazari, Champaign, IL (US); Afshin Oroojlooyjadid, North East, MD (US); Alexander Richard Phelps, Morrisville, NC (US); Davood Hajinezhad, Cary, NC (US); Bahar Biller, Chapel Hill, NC (US); Jonathan Lee Walker, Raleigh, NC (US); Hamza Mustafa Ghadyali, Apex, NC (US); Kedar Shriram Prabhudesai, Morrisville, NC (US); Xunlei Wu, Cary, NC (US); Xingqi Du, Cary, NC (US); Jorge Manuel Gomes da Silva, Durham, NC (US); Varunraj Valsaraj, Cary, NC (US); Jinxin Yi, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 17/060,957

(22) Filed: Oct. 1, 2020

(65) Prior Publication Data

US 2021/0082129 A1    Mar. 18, 2021

Related U.S. Application Data

(63) Continuation of application No. 17/060,504, filed on Oct. 1, 2020, which is a continuation of application
(Continued)

(51) Int. Cl.
*G06T 7/292*    (2017.01)
*G06T 7/00*    (2017.01)
(Continued)

(52) U.S. Cl.
CPC .......... *G06T 7/292* (2017.01); *G06F 11/2025* (2013.01); *G06T 7/0004* (2013.01);
(Continued)

(58) Field of Classification Search
CPC ....... G06T 7/292; G06T 7/0004; G06T 7/246; G06T 11/60; G06T 2207/30232;
(Continued)

(56) References Cited

U.S. PATENT DOCUMENTS

| 5,974,235 A | 10/1999 | Nunally et al. |
| 6,263,101 B1 | 7/2001 | Klein |

(Continued)

FOREIGN PATENT DOCUMENTS

| CN | 108875600 A | 11/2018 |
| CN | 109118523 A | 1/2019 |
| CN | 109902677 A | 6/2019 |

OTHER PUBLICATIONS

Huang, X. et al., "Intelligent Intersection: Two-Stream Convolutional Networks for Real-time Near Accident Detection in Traffic Video", Cornell University Computer Science, Jan. 4, 2019, pp. 1-23.

(Continued)

*Primary Examiner* — Kenny A Cese
(74) *Attorney, Agent, or Firm* — Coats + Bennett, PLLC

(57) ABSTRACT

A computing system receives historical data. The historical data comprises physical actions taken in an experiment in a physical environment. The experiment comprises user-defined stages. The historical data comprises a recorded outcome, according to user-defined performance indicator(s) related to the user-defined stages, for each physical action taken in the experiment. The system generates, by a discrete event simulator, a computing representation of a simulated environment of the physical environment. The simulated
(Continued)

environment comprises processing stages. The system obtains simulation data. The simulation data comprises simulated actions taken by the discrete event simulator. The simulation data comprises a predicted outcome, according to user-defined performance indicator(s) related to the processing stages, for each simulated action taken by the discrete event simulator. The system validates accuracy of the discrete event simulator at predicting the recorded outcome in the experiment. The system trains a computing agent according to a sequential decision-making algorithm.

30 Claims, 55 Drawing Sheets
(15 of 55 Drawing Sheet(s) Filed in Color)

Related U.S. Application Data

No. 17/060,260, filed on Oct. 1, 2020, which is a continuation-in-part of application No. 16/863,093, filed on Apr. 30, 2020, now Pat. No. 10,867,380.

(60) Provisional application No. 63/022,388, filed on May 8, 2020, provisional application No. 62/869,278, filed on Jul. 1, 2019.

(51) Int. Cl.
| | |
|---|---|
| *G06T 7/246* | (2017.01) |
| *G06K 9/00* | (2006.01) |
| *G06T 11/60* | (2006.01) |
| *G06F 11/20* | (2006.01) |

(52) U.S. Cl.
CPC .............. *G06T 7/246* (2017.01); *G06T 11/60* (2013.01); *G06F 2201/805* (2013.01); *G06K 9/00348* (2013.01); *G06K 9/00771* (2013.01); *G06T 2207/30241* (2013.01)

(58) Field of Classification Search
CPC . G06T 2207/30196; G06T 2207/30241; G06T 2207/20081; G06F 11/2025; G06K 9/00771; G06K 9/00348
See application file for complete search history.

(56) References Cited

U.S. PATENT DOCUMENTS

| | | | |
|---|---|---|---|
| 9,477,220 | B2 | 10/2016 | Shteinfeld et al. |
| 10,372,734 | B2 | 8/2019 | Trovero et al. |
| 2008/0215508 | A1 | 9/2008 | Hanneman et al. |
| 2009/0225174 | A1 | 9/2009 | Handa et al. |
| 2010/0208942 | A1 | 8/2010 | Porter et al. |
| 2012/0020518 | A1* | 1/2012 | Taguchi .................. G06T 7/292 382/103 |
| 2015/0339519 | A1 | 11/2015 | Ueta et al. |
| 2016/0191865 | A1 | 6/2016 | Beiser et al. |
| 2017/0178013 | A1 | 6/2017 | Beloglazov et al. |
| 2017/0287443 | A1 | 10/2017 | Boyce |
| 2017/0344834 | A1 | 11/2017 | Hirakawa et al. |
| 2018/0173173 | A1 | 6/2018 | Leonard |
| 2018/0189461 | A1 | 7/2018 | Ghafouriar et al. |
| 2018/0268240 | A1 | 9/2018 | Loce et al. |
| 2019/0122233 | A1* | 4/2019 | Itoh .................... G06Q 30/0201 |
| 2019/0122638 | A1 | 4/2019 | Anderson |
| 2019/0156274 | A1 | 5/2019 | Fisher et al. |
| 2019/0251702 | A1 | 8/2019 | Chandler et al. |
| 2019/0373210 | A1 | 12/2019 | Nguyen et al. |
| 2020/0019921 | A1 | 1/2020 | Buibas et al. |
| 2020/0134319 | A1 | 4/2020 | Ranjan et al. |
| 2020/0175075 | A1 | 6/2020 | Makhija |
| 2020/0273200 | A1 | 8/2020 | Ellwein et al. |

OTHER PUBLICATIONS

Gupta, S., "How Visual Object Detection can Transform Manufacturing Industries", pp. 1-5, retrieved on May 28, 2018, retrieved from internet https://hackernoon.com/how-visual-objection-detection-can-transform-manufacturing-industries-8b6698cc0a47.

Benhimane, S. et al., "Real-Time Object Detection and Tracking for Industrial Applications", Computer Science, 2008, pp. 1-8.

Durant, T., "Tracking Things in Object Detection Videos", pp. 1-9, retrieved on Apr. 26, 2018, retrieved from internet https://lab.moovel.com/blog/tracking-things-in-object-detection-videos.

4th Vector Technologies, "Integrating Machines: Machine Vision Integrator", pp. 1-9, retrieved on Jul. 25, 2019, retrieved from internet https://www.4thvectortech.com.

Wojke, N. et al., "Simple Online and Realtime Tracking with a Deep Association Metric", Cornell University Computer Science, Mar. 21, 2017, pp. 1-5.

Wang, Y. et al., "PointIT: A Fast Tracking Framework Based on 3D Instance Segmentation", Cornell University Computer Science, Feb. 18, 2019, pp. 1-6.

Hardin, W., "Better, Faster, Cheaper: Machine Vision Comes of Age in Automotive Manufacturing", Collaborative Robots, Advanced Vision and AI Conference, Nov. 12-13, 2019, pp. 1-5, Vision Online.

Vengateshwaran, N., "Building a YOLO objection detection model using SAS", The SAS Data Science Blog, Mar. 21, 2019, pp. 1-11, retrieved from internet https://blogs.sas.com/content/subconsciousmusings/2019/03/21/building-a-yolo-object-detection-model-using-sas/.

Boudewijn, C. et al., "Computer Vision at the luggage handling system of Brussels airport", May 16, 2012, pp. 1-86.

Song, J. et al., "Computer Vision-Based Video Interpretation Model for Automated Productivity Analysis of Construction Operations", Journal of Computing in Civil Engineering, May/Jun. 2010, pp. 252-263.

Integro Technologies, "High Speed Machine Vision Inspection", pp. 1-11, retrieved on Jul. 25, 2019, retrieved from internet https://integro-tech.com/high-speed-inspection/.

Cognex, "Introduction to Machine Vision: A guide to automating process & quality improvements", 2016, pp. 1-24.

Ananthakrishnan, "Multi Object Tracker Using Kalman Filter & Hungarian Algorithm", pp. 1-2, retrieved on Jul. 25, 2019, retrieved from internet https://github.com/srianant/kalman_filter_multi_object_tracking.

Chauhan, V. et al., "A Comparative Study of Machine Vision Based Methods for Fault Detection in an Automated Assembly Machine", 43rd Proceedings of the North American Manufacturing Research Institution of SME, 2015, pp. 416-428.

CVI-IITM, "Summer School Session 4: Tracking Methods—Meanshift, Camshift and Kalman Filter", pp. 1-29, retrieved on Jul. 25, 2019, retrieved from internet https://iitmcvg.github.io/summer_school/Session4/.

Mathworks, "Using Kalman Filter for Object Tracking—MATLAB & Simulink", pp. 1-10, retrieved on Jul. 25, 2019, retrieved from internet https://www.mathworks.com/help/vision/examples/using-kalman-filter-for-object-tracking.html.

Ese, David, et al., "An Intelligent System for Traffic Control in Smart Cities: A Case Study", American Journal of Artificial Intelligence, vol. 1, No. 1, pp. 36-43 (2017).

Smart Store | KANKAN AI Recognition Computer Platform, Industry Application, https://www.kankanai.com.cn/en/case/store/ (downloaded Jun. 7, 2020).

Baker, Francesca, "Machine Minds | Artificial Intelligence, The technology that could end traffic jams", https://www.bbc.com/future/article/20181212-can-artificial-intelligence-end-traffic-jams, pp. 1-10 (downloaded Jun. 7, 2020).

3rd Hour Today, Consumer Confidential, NBC Video, SAS_NBC_Video(1) 4839-1648-9666 v1; https://www.today.com/video/new-technology-allows-retailers-to-track-customers-every-move-79151685521 (Feb. 21, 2020).

(56) References Cited

OTHER PUBLICATIONS

Hermanto, Rinda, et al., "Waiting-Time Estimation in Bank Customer Queues using RPROP Neural Networks", Procedia Computer Science, vol. 135, pp. 35-42 (2018).
Kleinrock, Leonard, "Queuing Systems", A Queuing Theory Primer, vol. 2, pp. 1-26.
Chen, Hao-peng, et al., "A Queueing-based Model for Performance Management on Cloud", IEEE Xplore (downloaded Aug. 24, 2020).
Casale, Giuliano, "Approximating passage time distributions in queueing models by Bayesian expansion", Performance Evaluation, vol. 67, pp. 1076-1091 (2010).
SAS Simulation Studio 15.1 User's Guide, SAS Institute (2018).
Kankan AI, "Remark's KanKan Continues Transformation of CP Lotus's Traditional Supermarkets Into Smart Stores with Xishan Market Opening", https://www.kankanai.com.cn/en/news/ (downloaded Jun. 7, 2020).

* cited by examiner

| Key Point | Object | Position | Velocity | Acceleration |
|---|---|---|---|---|
| Key Point 1 | id1 | (X,Y) | - | - |
| Key Point 2 | id1 | (X,Y) | - | - |
| Key Point 3 | id1 | (X,Y) | - | - |
| Key Point 4 | id1 | (x,y) | - | - |
| Derived Key Point 5 | id1 | (Cx,Cy) | - | - |

| Object | Size | Position | Velocity | Acceleration | # of Objects | Skew | Distance to Forward Object | Distance to Back Object |
|---|---|---|---|---|---|---|---|---|
| id6 | 4x2 | Key Point 5 | .5m/s | -2m/s^2 | 7 | 0% | 107cm | 237 cm |

| Key Point | Object | Position | Change | Uncertainty | Time |
|---|---|---|---|---|---|
| Key Point 1 | id1 | (x,y) | x+1 | 98% | t |
| Key Point 1 | id1 | (x,y) | x+1, y+1 | 1% | t |
| Key Point 1 | id1 | (x,y) | x+1, y-1 | 1% | t |

1800

| Key Point | Object | Position | Change | Uncertainty | Time |
|---|---|---|---|---|---|
| Key Point 1 | id1 | (x+1,y+1) | x+1 | 10% | t+1 |
| Key Point 1 | id1 | (x+1,y+1) | x+1, y+1 | 85% | t+1 |
| Key Point 1 | id1 | (x+1,y+1) | x+1, y-1 | 5% | t+1 |

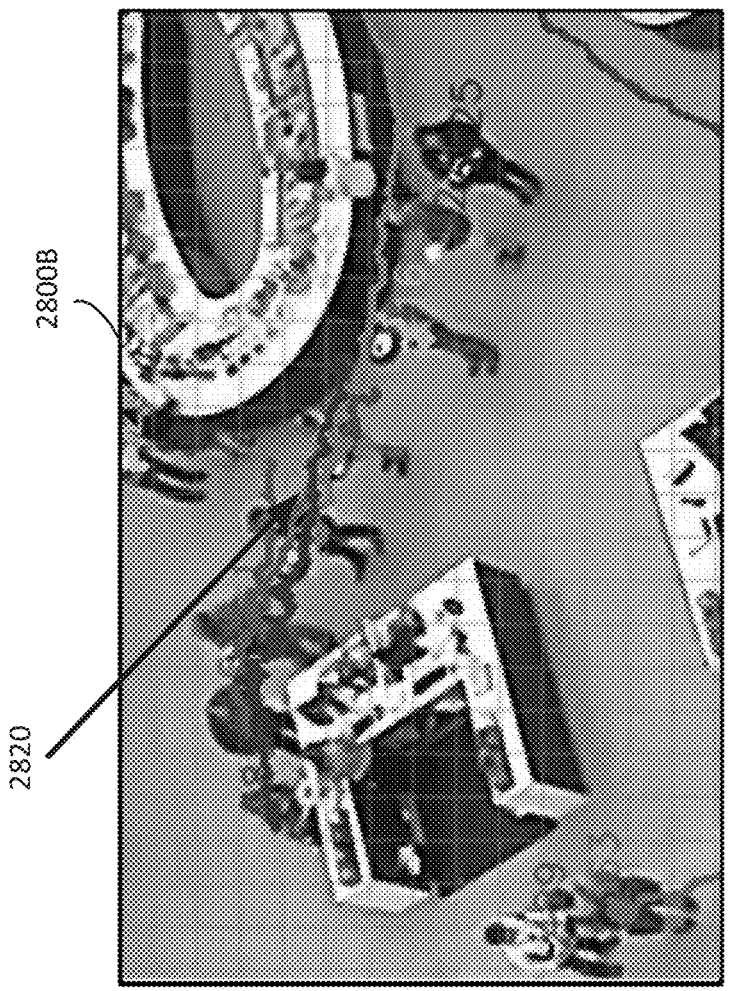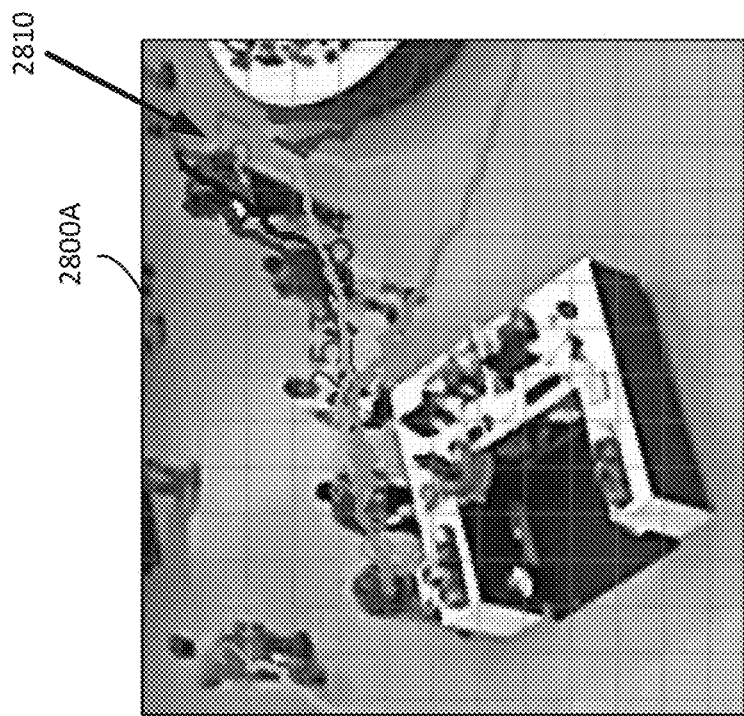
FIG. 28

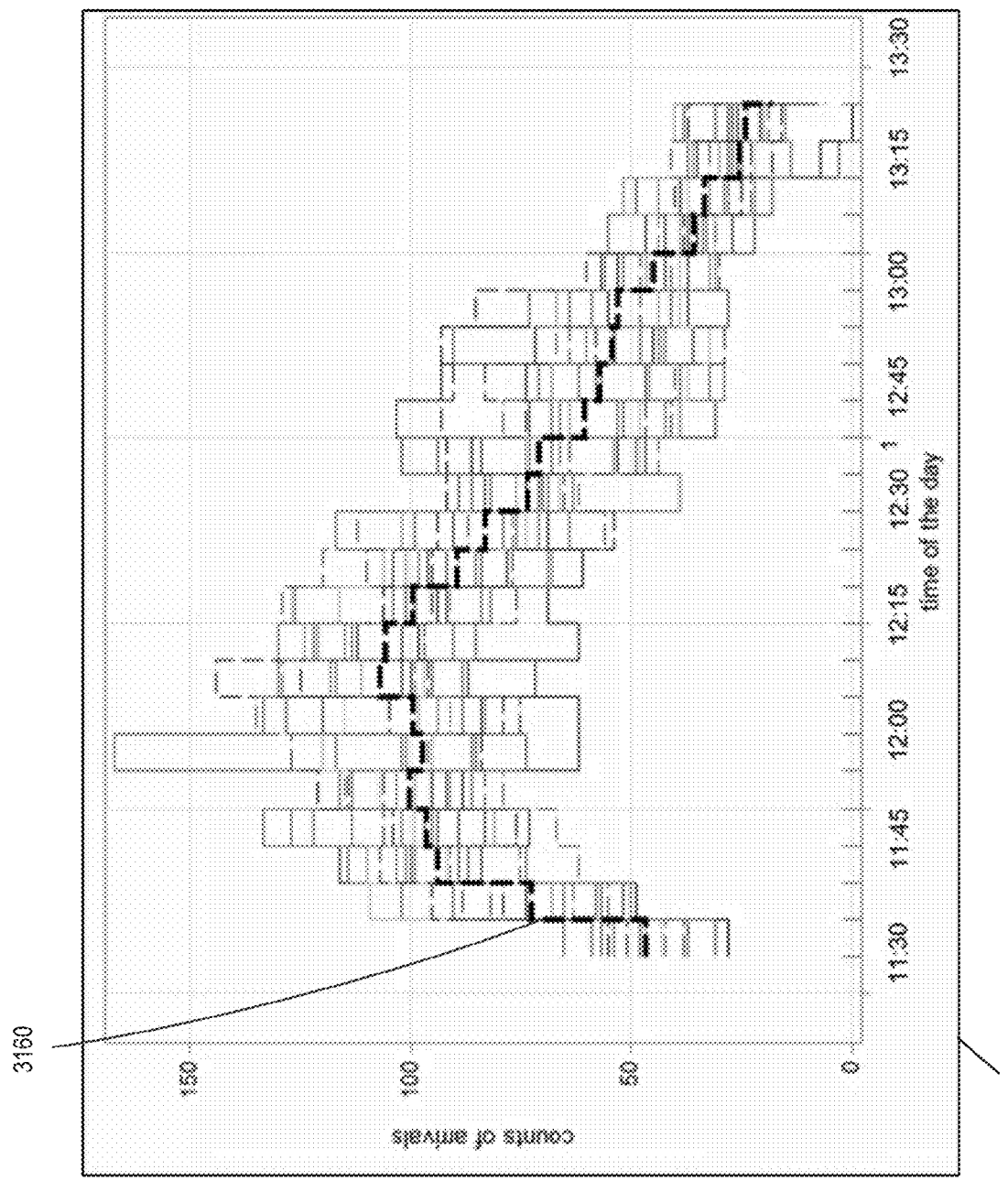
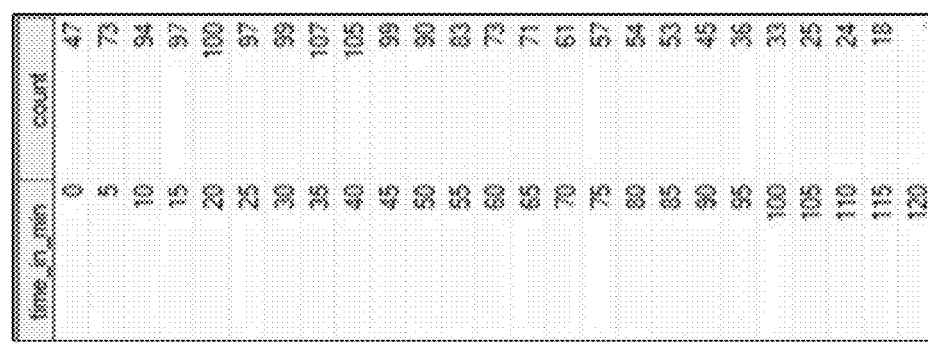
FIG. 31

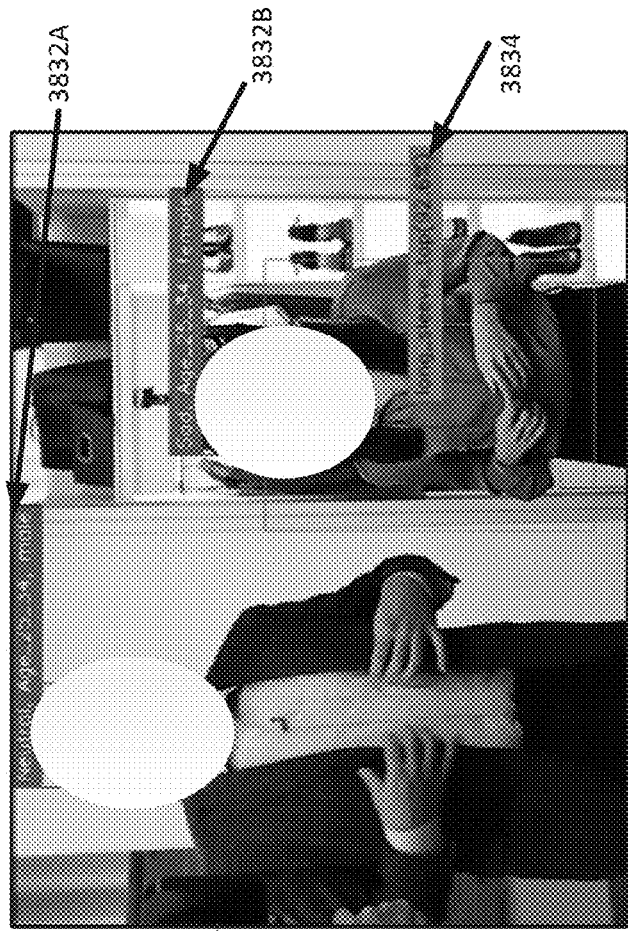
FIG. 38B
FIG. 38A
| Id 3861 | Emotion 3862 | Age 3863 | Gender 3864 | Pixel Color 3865 |
|---|---|---|---|---|
| 1 | neutral | 3 (25-34) | male | White |
| 2 | sad | 3 (25-34) | female | White |
FIG. 38C

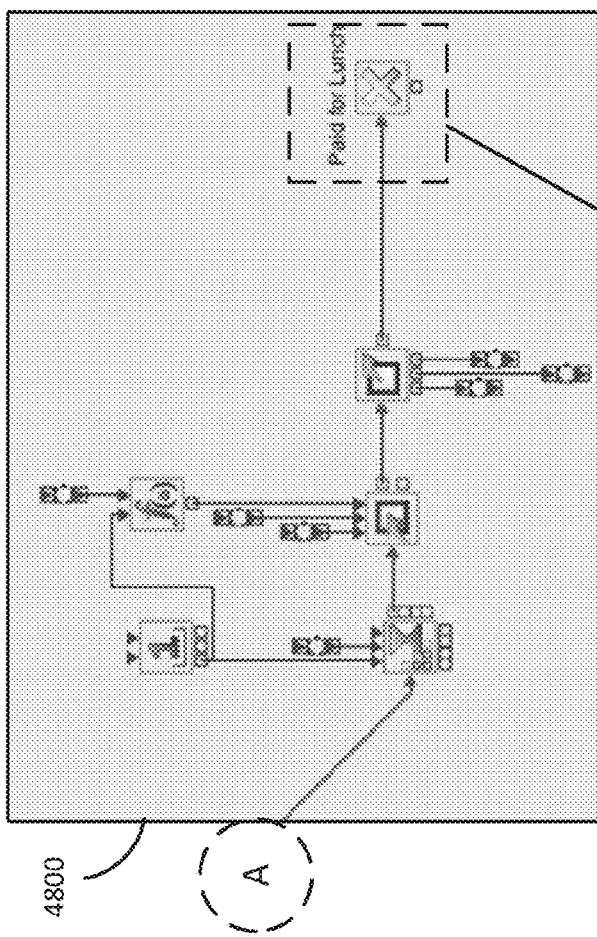
FIG. 48B
FIG. 48C
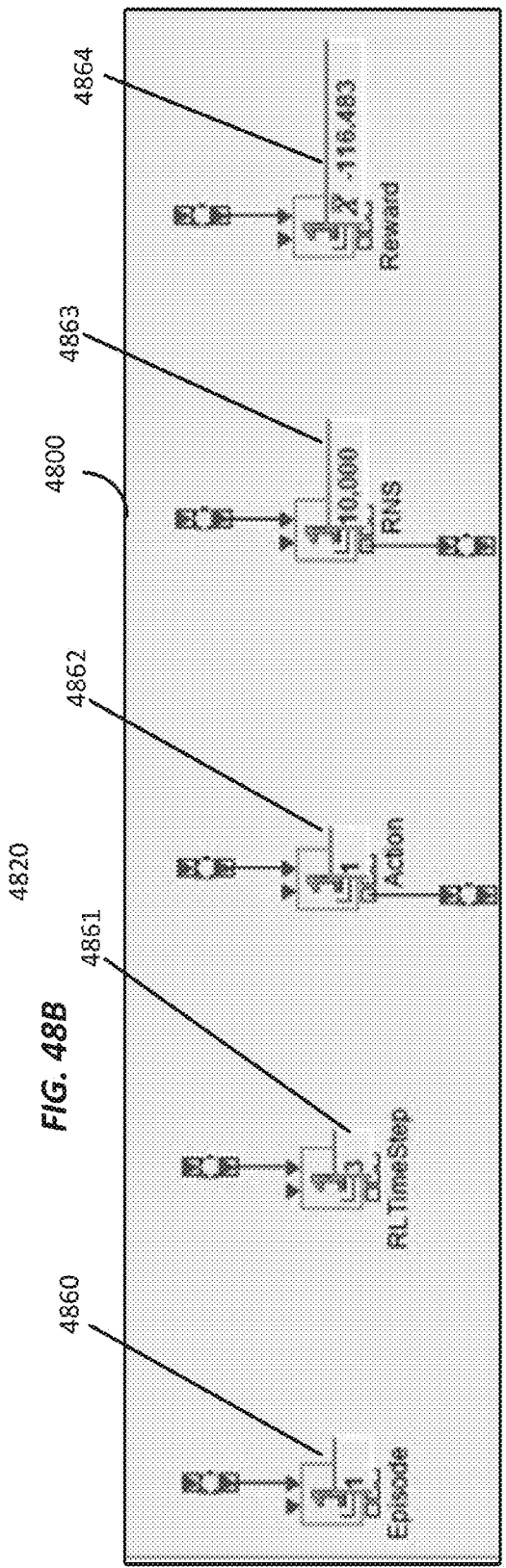
FIG. 48D

DISCRETE EVENT SIMULATION WITH SEQUENTIAL DECISION MAKING

CROSS-REFERENCE TO RELATED APPLICATIONS

This application is a continuation of U.S. application Ser. No. 17/060,504, filed Oct. 1, 2020, which is a continuation of U.S. application Ser. No. 17/060,260, filed Oct. 1, 2020, which claims the benefit of, and priority based on, 35 U.S.C. § 119 to U.S. Provisional Application No. 63/022,388, filed May 8, 2020, and is a continuation in part of U.S. application Ser. No. 16/863,093, filed Apr. 30, 2020, which claims the benefit of, and priority based on, 35 U.S.C. § 119 to U.S. Provisional Application No. 62/869,278, filed Jul. 1, 2019, the disclosures of each of which are incorporated herein by reference in their entireties.

BACKGROUND

Manufacturing environments often involve an automated process for producing similar products. This automated process may use, for instance, conveyer belts to move an assembly line of similar products in a synchronized fashion through development stages. The assembly line may be sensitive to changes in the timing or orientation of objects moving through these development stages. The automated process may have little to no direct operator oversight to observe these changes. This lack of oversight may lead to problems for the assembly line. For instance, products may run into each other or turn leading to damaged products or damaged equipment for the assembly line. If the damage is severe enough, the entire assembly line may need to be shut down to correct the issue.

Physical environments may also involve objects that move in other unpredictable ways (e.g., objects influenced by human choices such as trucks queuing up at a weighing station, or people waiting in line). These unpredictable systems may have little oversight and be difficult to track and control the environment (e.g., for efficiently moving objects through the system).

SUMMARY

In an example embodiment, a computer-program product tangibly embodied in a non-transitory machine-readable storage medium is provided. The computer-program product includes instructions to cause a computing system to obtain image data representing a plurality of images. Each of the plurality of images is captured at different time points of a physical environment. The physical environment comprises a first object and a second object different from the first object. The computer-program product includes instructions to cause a computing system to execute a control system to augment the physical environment. The computing system executes the control system by detecting, by the control system, a group forming in the plurality of images based on: detecting a distance between the first object and the second object that is below a threshold; and determining a trajectory indication of the first object compared to the second object. The computing system executes the control system by tracking, by the control system, an aspect of a movement, of a given object, in the group. The computing system executes the control system by simulating, by the control system, the physical environment and the movement, of the given object, in the group in a simulated environment. The computing system executes the control system by evaluating, by the control system, simulated actions in the simulated environment for a predefined objective for the physical environment. The predefined objective is related to an interaction between objects in the group and is predefined by a first user of the control system. The computing system executes the control system by generating, by the control system, based on evaluated simulated actions and autonomously from involvement by any user of the control system, an indication to augment the physical environment.

In another example embodiment, a computing device is provided. The computing device includes, but is not limited to, a processor and memory. The memory contains instructions that when executed by the processor control the computing device to execute a control system to augment a physical environment.

In another example embodiment, a method of executing a control system to augment a physical environment is provided.

In another example embodiment, a computer-program product tangibly embodied in a non-transitory machine-readable storage medium is provided. The computer-program product includes instructions to cause a computing system to obtain original image data representing a plurality of images. Each of the plurality of images is captured at different time points of a physical environment. The computer-program product includes instructions to cause a computing system to responsive to obtaining the original image data, detect a first set of one or more data points in the original image data. The first set of one or more data points indicates a first object in the physical environment for tracking in the physical environment. The computer-program product includes instructions to cause a computing system to determine, based on the first set of one or more data points, a first set of pixels associated with the first object in the original image data. The computer-program product includes instructions to cause a computing system to generate a first alternative visual identifier for the first object that provides a unique identifier for the first set of pixels absent in the original image data. The unique identifier uniquely distinguishes the first set of pixels from pixels associated with other tracked objects in the physical environment. The computer-program product includes instructions to cause a computing system to generate, autonomously from intervention by any user of the computing system, first pixel information associated with the first set of pixels to visually conceal one or more features of the first object. The first pixel information is associated with the unique identifier in a dataset pertaining to the first object. The computer-program product includes instructions to cause a computing system to obtain modified image data comprising the first alternative visual identifier. The modified image data further comprises the one or more features of the first object in the original image data visually concealed in the modified image data according to the first pixel information. The computer-program product includes instructions to cause a computing system to, based on the first set of one or more data points, track a trajectory of the first object through the modified image data using the first alternative visual identifier. The computer-program product includes instructions to cause a computing system to output an image representation of the trajectory of the first object through the modified image data.

In another example embodiment, a computing system is provided. The computing system includes, but is not limited to, a processor and memory. The memory contains instructions that when executed by the processor control the computing system to output an image representation of a trajectory of a first object through modified image data.

In another example embodiment, a method of outputting an image representation of a trajectory of a first object through modified image data is provided.

In another example embodiment, a computer-program product tangibly embodied in a non-transitory machine-readable storage medium is provided. The computer-program product includes instructions to cause a computing system to receive historical data. The historical data comprises multiple physical actions taken in an experiment in a physical environment. The experiment comprises a plurality of user-defined stages. The historical data comprises a recorded outcome, according to one or more user-defined performance indicators related to the plurality of user-defined stages, for each physical action of the multiple physical actions taken in the experiment. The computer-program product includes instructions to cause a computing system to generate, by a discrete event simulator, a computing representation of a simulated environment of the physical environment. The simulated environment comprises a plurality of processing stages. The computer-program product includes instructions to cause a computing system to obtain simulation data. The simulation data comprises multiple simulated actions taken by the discrete event simulator in the simulated environment of the physical environment. The simulation data comprises a predicted outcome, according to one or more user-defined performance indicators related to the plurality of processing stages, for each simulated action of the multiple simulated actions taken by the discrete event simulator. The computer-program product includes instructions to cause a computing system to validate, based on the historical data, accuracy of the discrete event simulator at predicting the recorded outcome in the experiment. The computer-program product includes instructions to cause a computing system to train a computing agent according to a sequential decision-making algorithm. The computer-program product includes instructions to cause a computing system to train the computing agent by providing, to the computing agent, a computer policy indicating instruction for the computing agent to take an action according to the sequential decision-making algorithm. The computer-program product includes instructions to cause a computing system to train the computing agent by receiving, at the discrete event simulator, from the computing agent, a computer instruction, according to the computer policy, for a simulated action in the discrete event simulator. The computer-program product includes instructions to cause a computing system to train the computing agent by responsive to simulating the simulated action according to the computer instruction, generating a new state in the simulated environment. The new state indicates a predicted result if a physical action is conducted in the physical environment according to the simulated action. The computer-program product includes instructions to cause a computing system to train the computing agent by computing a predicted performance in the simulated environment associated with the new state. The computer-program product includes instructions to cause a computing system to train the computing agent by transmitting, to the computing agent, the new state with a reward indication based on the predicted performance.

In another example embodiment, a computing system is provided. The computing system includes, but is not limited to, a processor and memory. The memory contains instructions that when executed by the processor control the computing system to train a computing agent according to a sequential decision-making algorithm.

In another example embodiment, a method of training a computing agent according to a sequential decision-making algorithm is provided.

Other features and aspects of example embodiments are presented below in the Detailed Description when read in connection with the drawings presented with this application.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 18 illustrates an example of predicted changes for a data point in at least one embodiment of the present technology.

FIG. 28 illustrates an example of tracking objects' movement in a group in at least one embodiment of the present technology.

FIG. 31 illustrates an example of data collection of tracking objects in a group in at least one embodiment of the present technology.

FIGS. 38A-C illustrate an example of pixel concealing and data point detection in at least one embodiment of the present technology.

FIGS. 48A-E illustrate an example graphical user interface for a simulation in at least one embodiment of the present technology.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Systems depicted in some of the figures may be provided in various configurations. In some embodiments, the systems may be configured as a distributed system where one or more components of the system are distributed across one or more networks in a cloud computing system.

Figure 1:
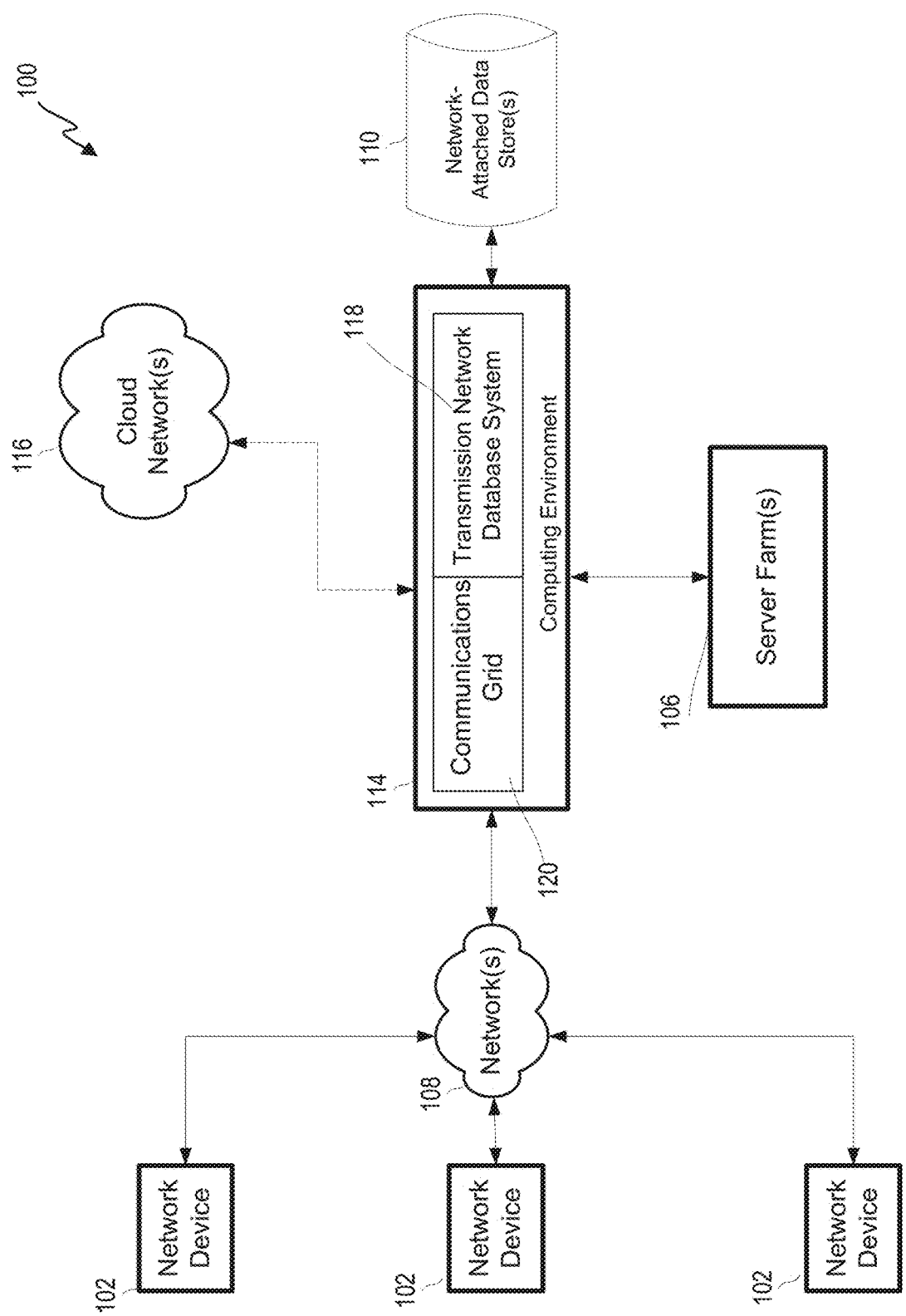
FIG. 1 illustrates a block diagram that provides an illustration of the hardware components of a computing system, according to at least one embodiment of the present technology.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
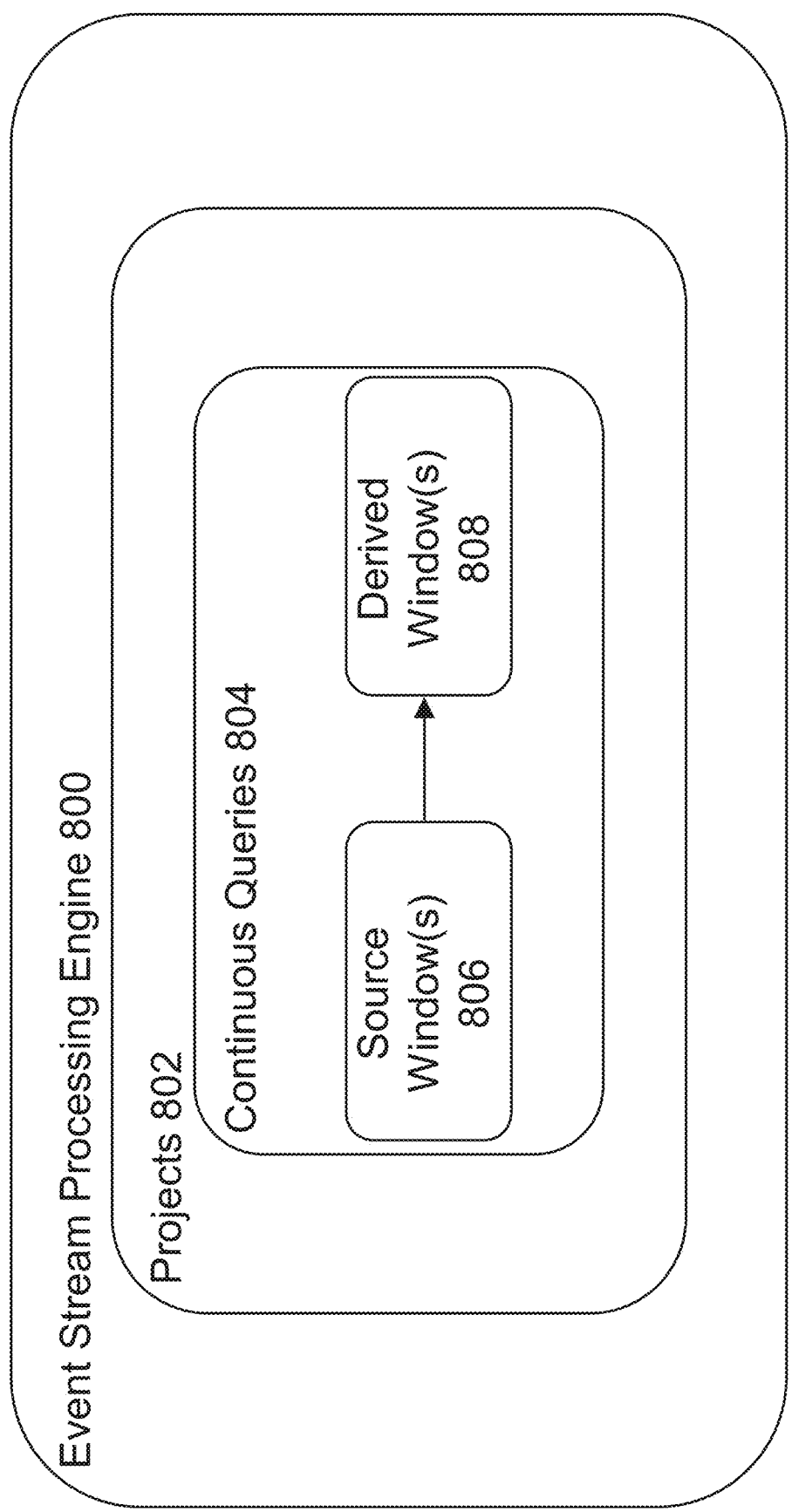
FIG. 8 illustrates a block diagram including components of an Event Stream Processing Engine (ESPE), according to at least one embodiment of the present technology.
Figure 9:
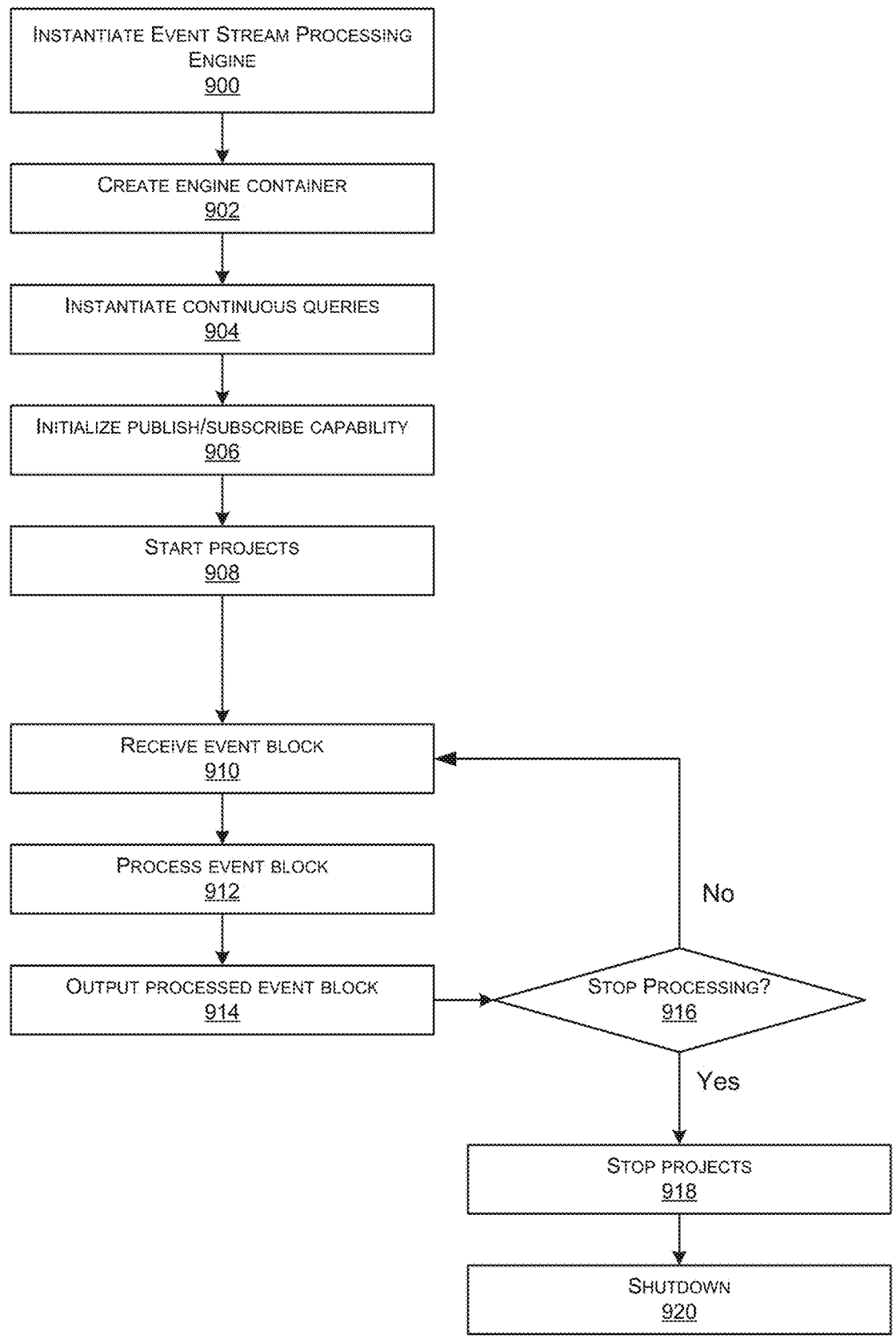
FIG. 9 illustrates a flow chart showing an example process including operations performed by an event stream processing engine, according to at least one embodiment of the present technology.
Figure 10:
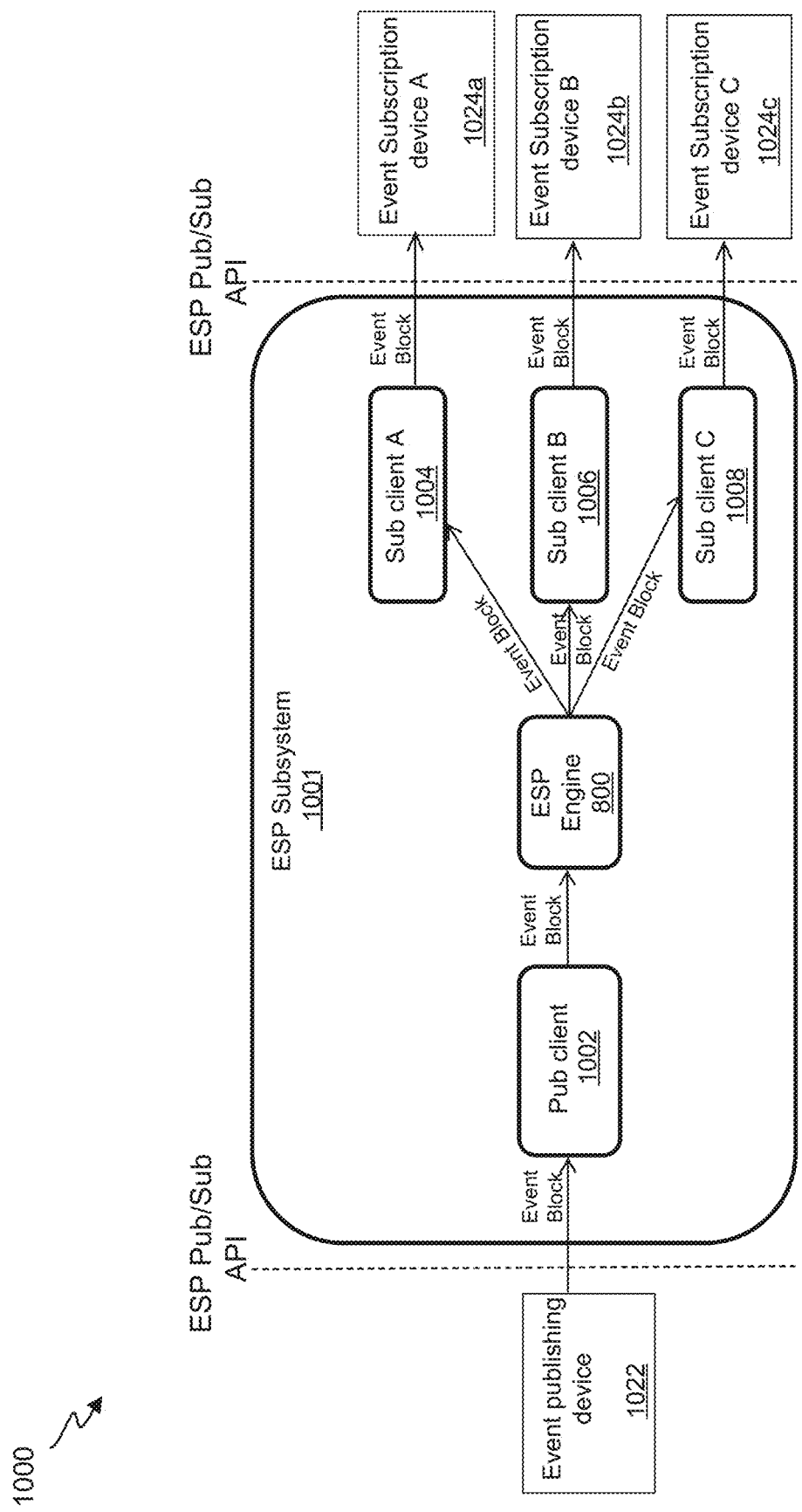
FIG. 10 illustrates an ESP system interfacing between a publishing device and multiple event subscribing devices, according to at least one embodiment of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models)

or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. IoT may be implemented in various areas, such as for access (technologies that get data and move it), embed-ability (devices with embedded sensors), and services. Industries in the IoT space may automotive (connected car), manufacturing (connected factory), smart cities, energy and retail. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
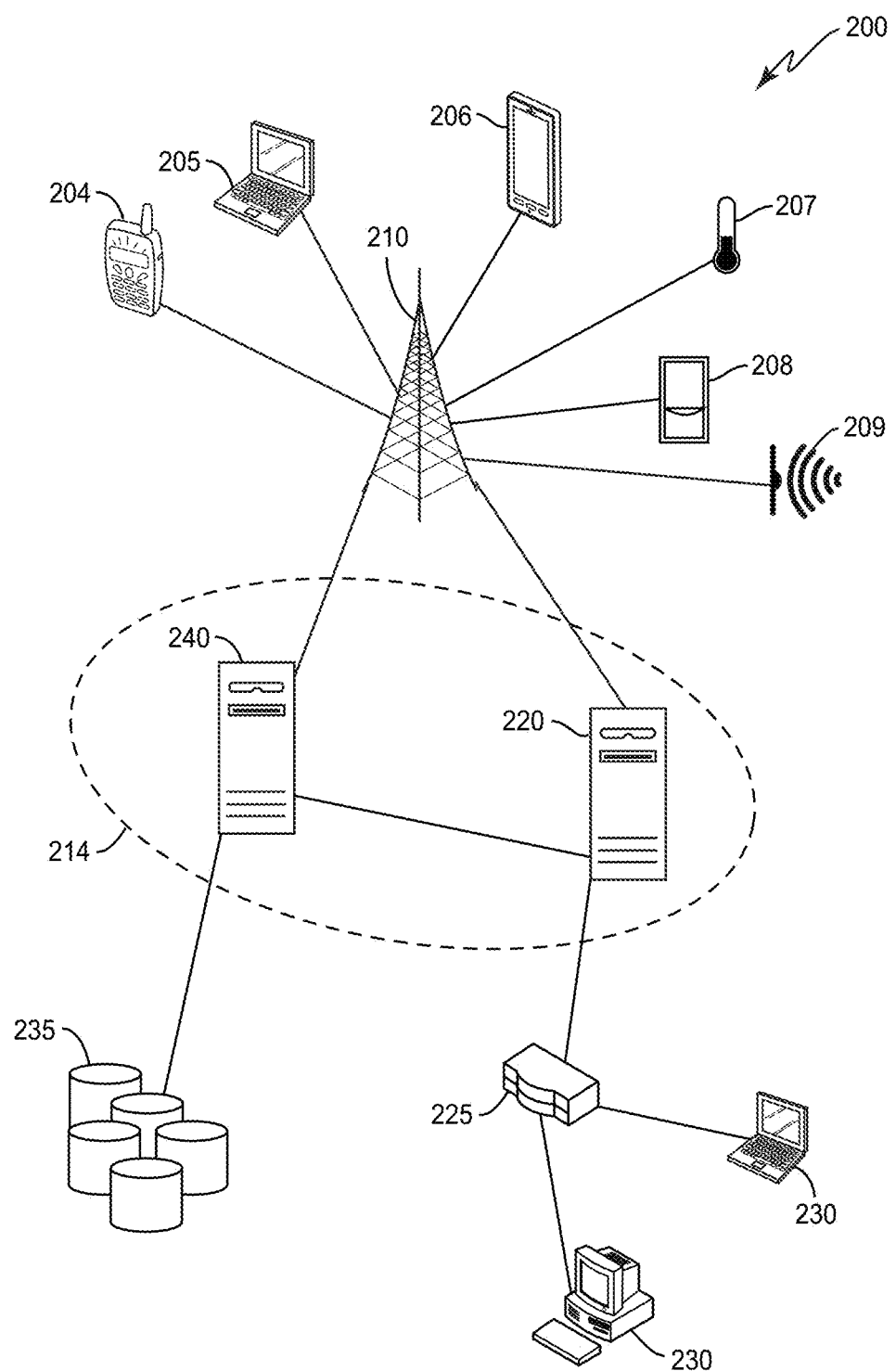
FIG. 2 illustrates an example network including an example set of devices communicating with each other over an exchange system and via a network, according to at least one embodiment of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other internetwork or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
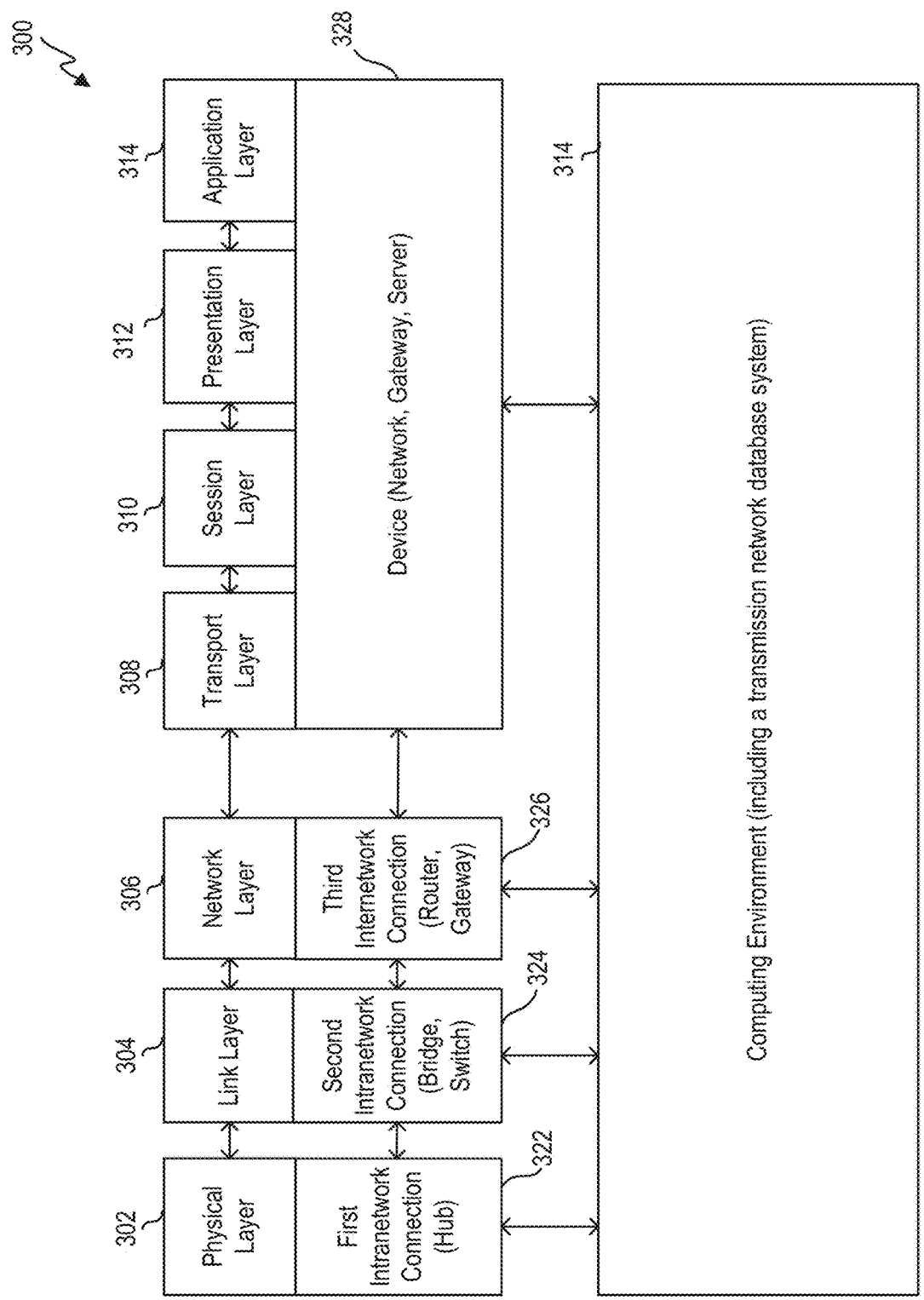
FIG. 3 illustrates a representation of a conceptual model of a communications protocol system, according to at least one embodiment of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 302-314. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 302. Physical layer 302 represents physical communication, and can define parameters of that physical communication. For example, such physical communication may come in the form of electrical, optical, or electromagnetic signals. Physical layer 302 also defines protocols that may control communications within a data transmission network.

Link layer 304 defines links and mechanisms used to transmit (i.e., move) data across a network. The link layer manages node-to-node communications, such as within a grid computing environment. Link layer 304 can detect and correct errors (e.g., transmission errors in the physical layer 302). Link layer 304 can also include a media access control (MAC) layer and logical link control (LLC) layer.

Network layer 306 defines the protocol for routing within a network. In other words, the network layer coordinates transferring data across nodes in a same network (e.g., such as a grid computing environment). Network layer 306 can also define the processes used to structure local addressing within the network.

Transport layer 308 can manage the transmission of data and the quality of the transmission and/or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt and/or format data based on data types known to be accepted by an application or network layer.

Application layer 314 interacts directly with software applications and end users, and manages communications between them. Application layer 314 can identify destinations, local resource states or availability and/or communication content or formatting using the applications.

Intra-network connection components 322 and 324 are shown to operate in lower levels, such as physical layer 302 and link layer 304, respectively. For example, a hub can operate in the physical layer and a switch can operate in the link layer. Inter-network connection components 326 and 328 are shown to operate on higher levels, such as layers 306-314. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
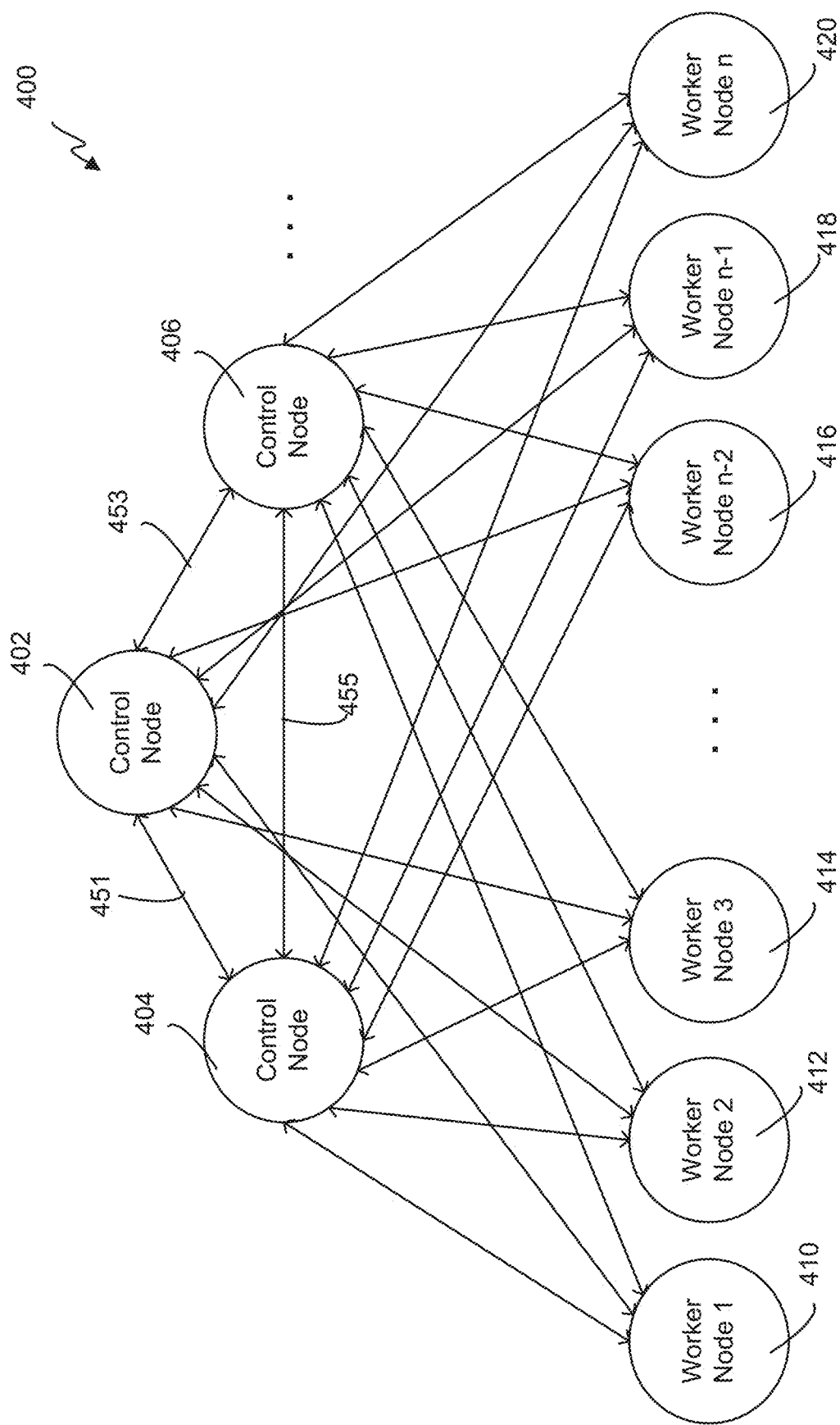
FIG. 4 illustrates a communications grid computing system including a variety of control and worker nodes, according to at least one embodiment of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be receive or stored by a machine other than a control node (e.g., a Hadoop data node).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes). The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
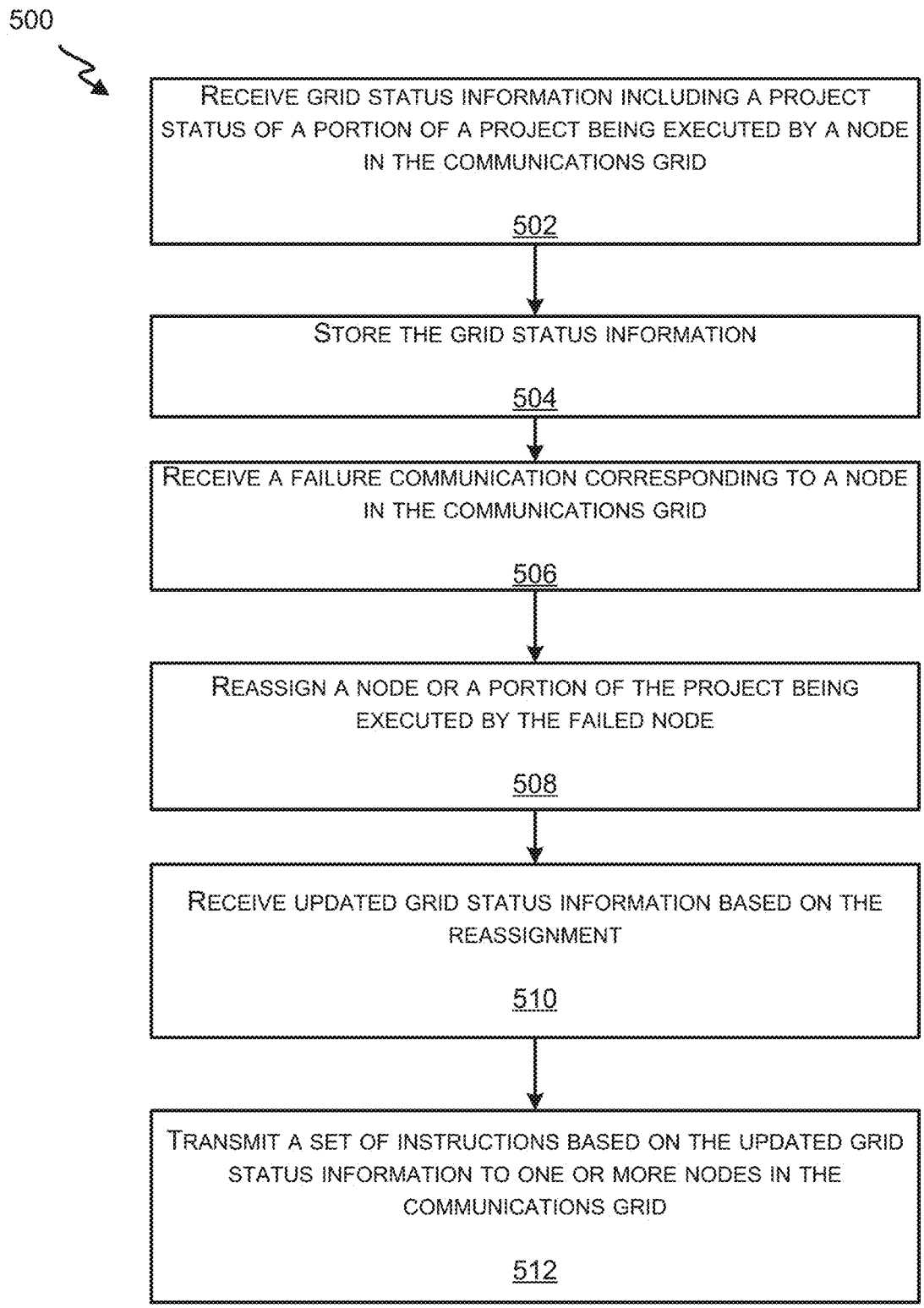
FIG. 5 illustrates a flow chart showing an example process for adjusting a communications grid or a work project in a communications grid after a failure of a node, according to at least one embodiment of the present technology.

FIG. 5 illustrates a flow chart showing an example process for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
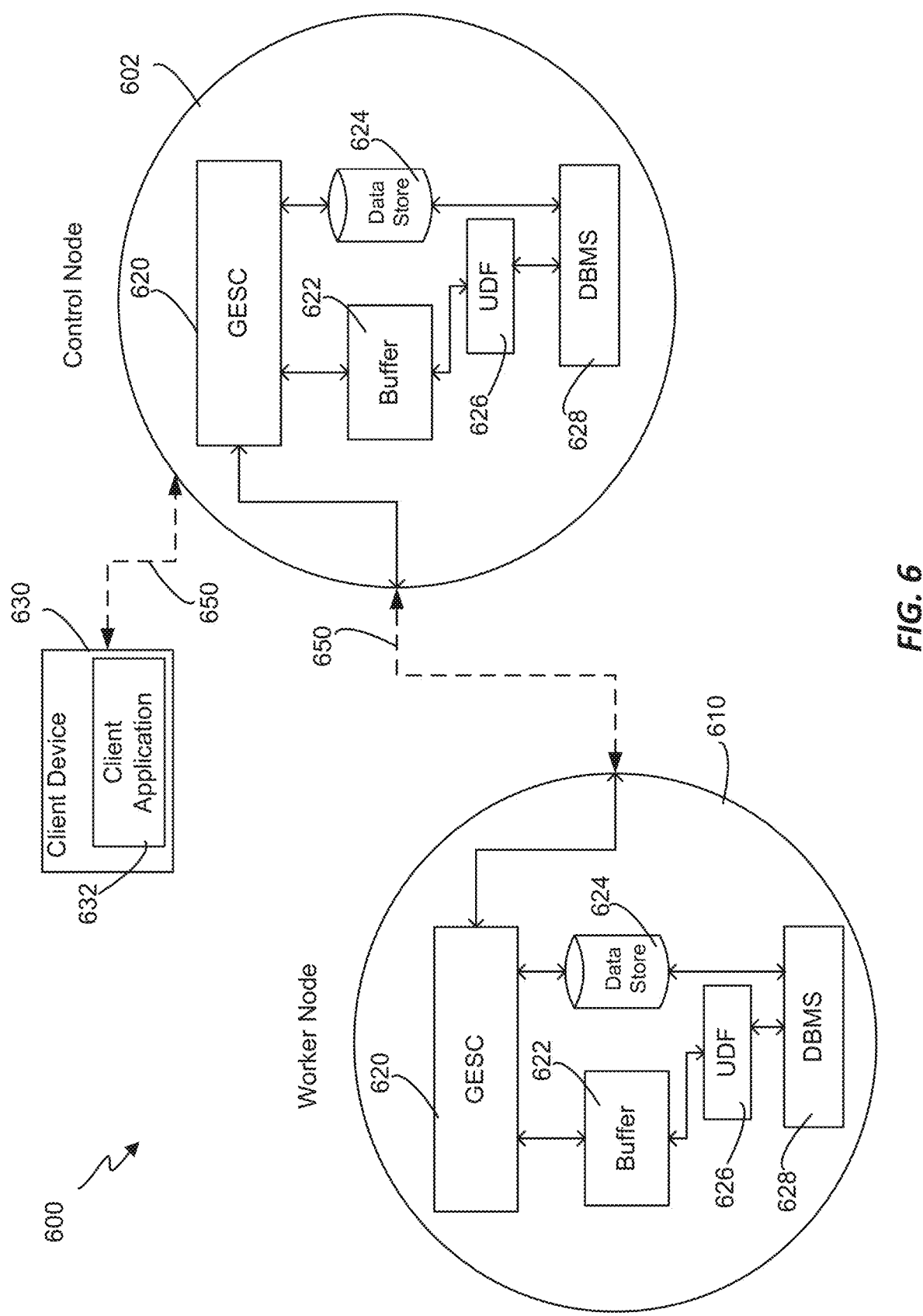
FIG. 6 illustrates a portion of a communications grid computing system including a control node and a worker node, according to at least one embodiment of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within a nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
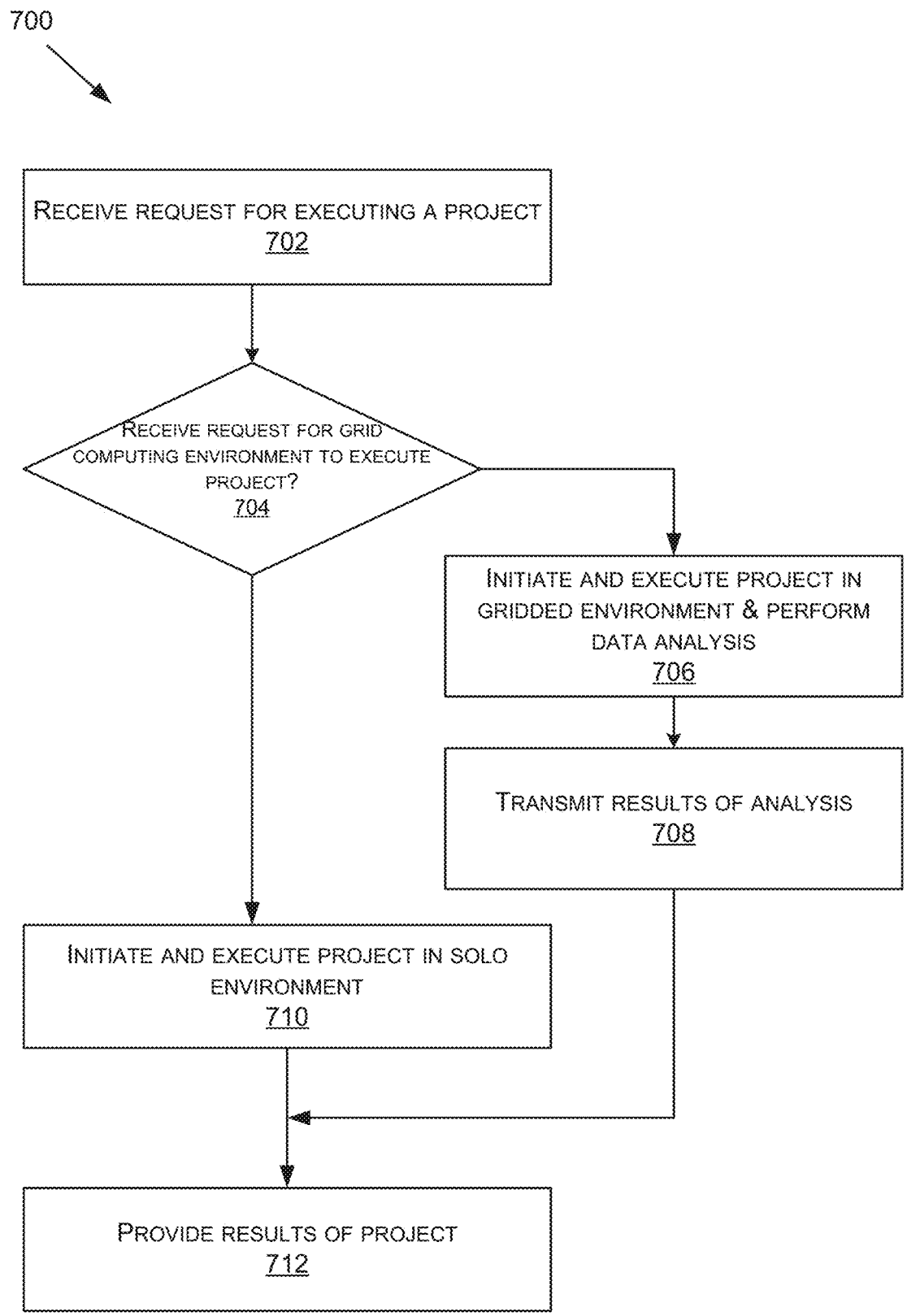
FIG. 7 illustrates a flow chart showing an example process for executing a data analysis or processing project, according to at least one embodiment of the present technology.

FIG. 7 illustrates a flow chart showing an example method for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024a-c, according to embodiments of the present technology. ESP system 1000 may include ESP device or subsystem 1001, event publishing device 1022, an event subscribing device A 1024a, an event subscribing device B 1024b, and an event subscribing device C 1024c. Input event streams are output to ESP device 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024a, event subscribing device B 1024b, and event subscribing device C 1024c. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 1001 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 806, and subscribing client C 808 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024a-c. For example, subscribing client A 1004, subscribing client B 1006, and subscribing client C 1008 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
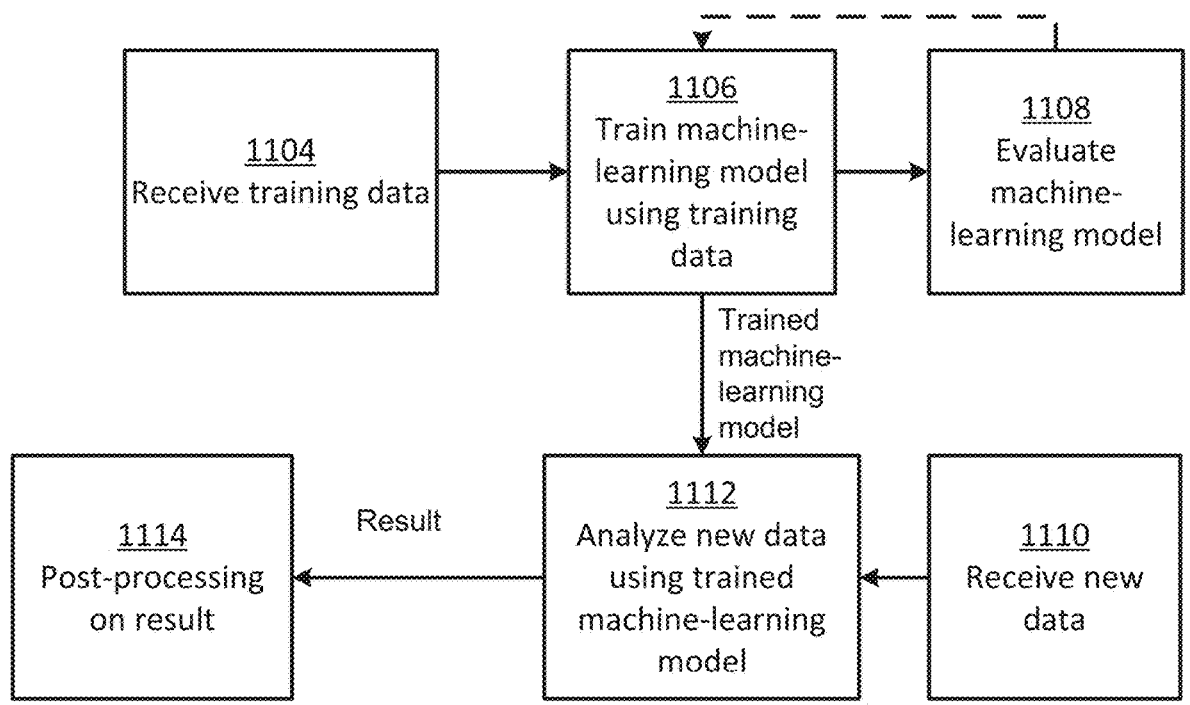
FIG. 11 illustrates a flow chart of an example of a process for generating and using a machine-learning model according to at least one embodiment of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
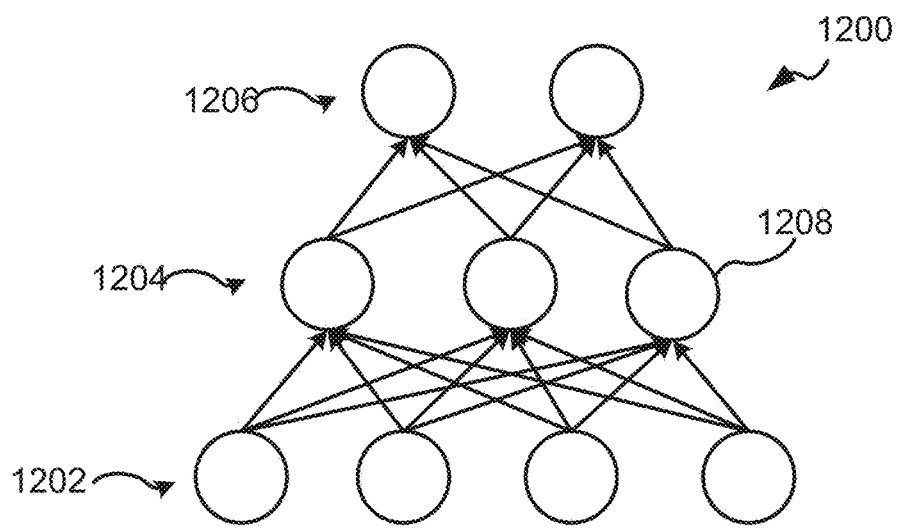
FIG. 12 illustrates an example of a machine-learning model as a neural network.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the following equation:

$$y = \max(x, 0)$$

where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide(GaAs)) devices. Furthermore, these processors may also be employed in heterogeneous computing architectures with a number of and a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
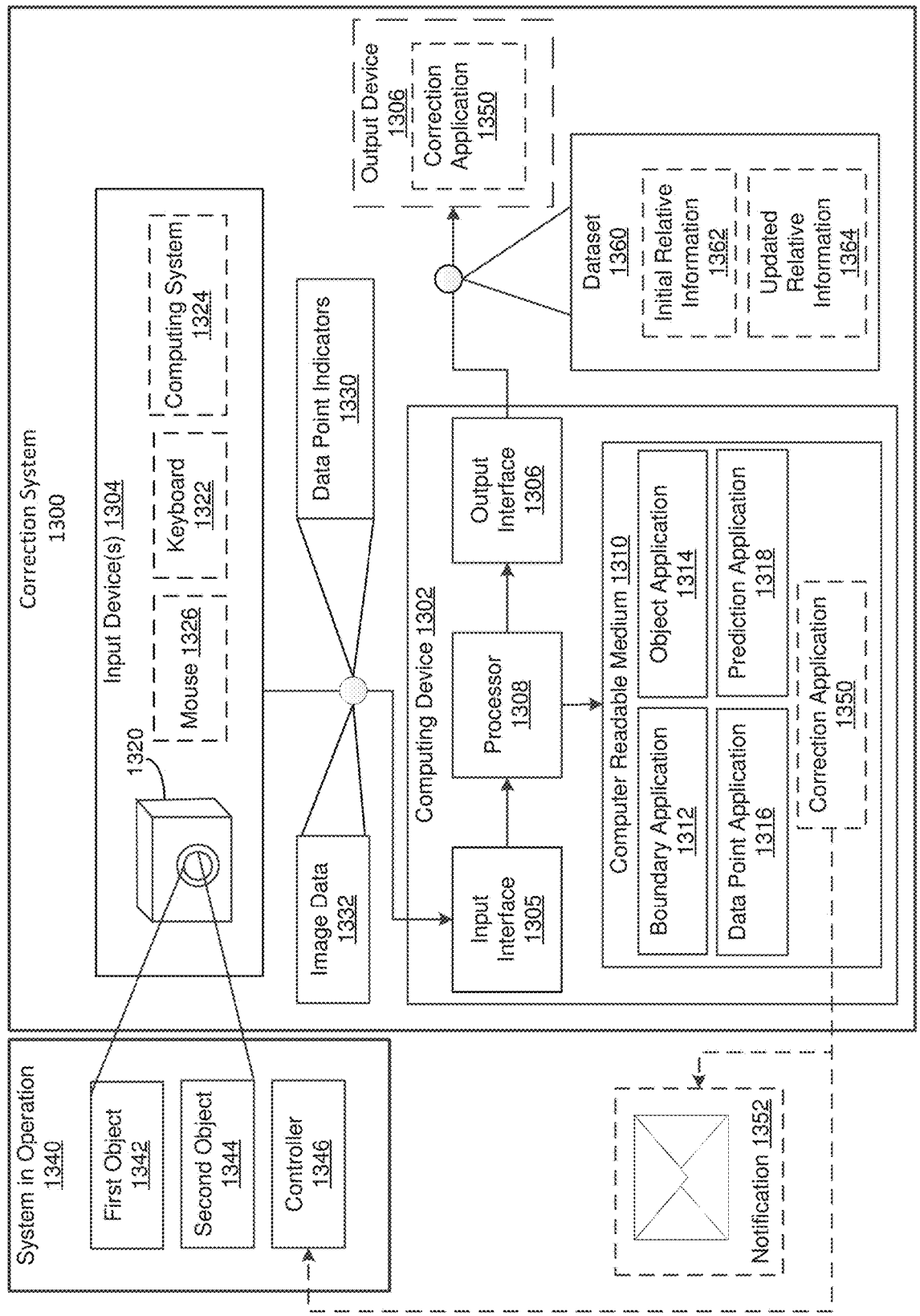
FIG. 13 illustrates an example of a block diagram for generating and outputting a dataset comprising relative information between objects in a system in operation in at least one embodiment of the present technology.

FIG. 13 illustrates a block diagram for generating and outputting a dataset 1360 comprising relative information between objects (e.g., first object 1342 and second object 1344) in a system in operation 1340. The system in operation 1340 could be, for example, a manufacturing system with multiple objects being manufactured.

In one or more embodiments, a correction system 1300 is used to determine whether the system in operation 1340 needs correction in some respect (e.g., if objects on a conveyer belt have moved too close to each other and are in danger of crashing or otherwise jamming the system). A control could be used to prevent an unplanned event in the manufacturing system like equipment failures from jams that triggers unplanned maintenance and might incur additional costs (e.g., from downtime). Downtimes constitute the single largest source of loss in production for any manufacturing industry.

The correction system 1300 comprises one or more input devices 1304 for receiving information regarding the system in operation 1340. The correction system 1300 includes a computing device 1302 for generating a dataset 1360 regarding the system in operation 1340. In one or more embodiments, this dataset 1360 can be output to an output device 1370. Optionally, in one or more embodiments, this output device 1370, or the computing device 1302 itself, triggers a control to correct an operation of a system in operation 1340 (e.g., by executing correction application 1350).

The correction system 1300 is configured to exchange information between devices in the system (e.g., via wired and/or wireless transmission). For example, a network (not shown) can connect one or more devices of correction system 1300 to one or more other devices of correction system 1300. Alternatively, or additionally, one or more devices in the correction system 1300 are integrated together.

One or more input devices 1304 are used to capture image data 1332 regarding the system in operation 1340. The input devices 1304 may include an image capture device 1320 capturing images at different time points of a system in operation. For instance, the image capture device 1320 may be a camera, video camera, camcorder, etc. and the system in operation may have one or more objects (e.g., first object 1342 and second object 1344) within view of the image capture device 1320. For instance, the objects could be products on a manufacturing conveyer belt and the image capture device 1320 may be positioned to view a section of the conveyer belt. In other examples, the objects could be vehicles passing on a highway or packages passing through a sorting room. The image data 1332 may represent different images captured by the image capture device 1320. For instance, the image data may comprise multiple data points that make up the electronic representation of images captured by the image capture device 1320.

In one or more embodiments, the input devices 1304 include other devices (e.g., a computing system 1324, a mouse 1326, or keyboard 1322) for user input regarding the image data (e.g., identification of data points in the image). The one or more input devices 1304 could include different or other devices not shown (e.g., a display, a track ball, a keypad, one or more buttons, a sensor, a phone, etc.). Alternatively, or additionally, the other input devices are integrated with the image capture device 1320.

In one or more embodiments, the computing device 1302 receives information from input device 1304 via input interface 1305. For instance, the computing device 1302 receives the image data 1332 and receives data point indicators 1330. The data point indicators 1330 include an indication of user-identified data points in the image data 1332. For instance, the data point indicators 1330 may indicate an image coordinate location for each of the user-identified data points in a coordinate system associated with an image. The user identified data points identify the first object 1342 and the second object 1344.

In one or more embodiments, the computing device outputs information (e.g., to an output device 1370). Output interface 1306 provides an interface for outputting information (e.g., one or more components of dataset 1360) for review by a user and/or for use by another application (e.g., correction application 1350) or device or multiple applications or devices. For example, output interface 1306 may interface with various output technologies including, but not limited to, a display, a printer, data storage, or another computing device or system.

In one or more embodiments, the output device 1370 may be a computing device that analyzes the dataset 1360 (e.g., using a separate model of the system in operation 1340) to identify collisions, orientation issues, or other issues indicated by the dataset 1360 regarding the objects in the system of operation 1340. For instance, the correction application 1350 may comprise instructions to generate a model of the system in operation 1340 (e.g., based on specifics of a manufacturing plant system). This model can be used to trigger alerts (e.g., notification 1352) or take proactive corrective action (e.g., interfacing with a controller 1346 for the system in operation 1340). Alternatively, or additionally, such a correction application 1350 could be integrated with computing device 1302 and one or more components of the dataset 1360 are output (e.g., via output interface 1306) as part of a corrective action (e.g., accompanying or in a notification 1352 or a message to controller 1346).

In an alternative embodiment, the same interface supports both input interface 1305 and output interface 1306. For example, a touch screen provides a mechanism for user input and for presentation of output to the user. Alternatively, the input interface 1305 has more than one input interface that uses the same or different interface technology. Alternatively, or additionally, the output interface 1306 has more than one output interface that uses the same or different interface technology.

Computer-readable medium 1310 is an electronic holding place or storage for information so the information can be accessed by processor 1308. Computer-readable medium 1310 can include, but is not limited to, any type of random access memory (RAM), any type of read only memory (ROM), any type of flash memory, etc. such as magnetic storage devices (e.g., hard disk, floppy disk, magnetic strips), optical disks (e.g., compact disc (CD), digital versatile disc (DVD)), smart cards, flash memory devices, etc.

Processor 1308 executes instructions (e.g., stored at the computer readable medium 1310). The instructions can be carried out by a special purpose computer, logic circuits, or hardware circuits. In one or more embodiments, processor 1308 is implemented in hardware and/or firmware. Processor 1308 executes an instruction, meaning it performs or controls the operations called for by that instruction. The term "execution" is the process of running an application or the carrying out of the operation called for by an instruction. The instructions can be written using one or more programming language, scripting language, assembly language, etc. Processor 1308 operably couples with input interface 1305, with output interface 1306 and with computer readable medium 1310 to receive, to send, and to process information. Processor 1308 in one or more embodiments can retrieve a set of instructions from a permanent memory device and copy the instructions in an executable form to a temporary memory device that is generally some form of RAM.

In one or more embodiments, computer-readable medium 1310 stores instructions for execution by processor 1308. For example, computer-readable medium 1310 could comprise instructions for a boundary application 1312 for determining a boundary of a first object in an image of the image data 1332 (e.g., based on the data point indicators 1330). The computer-readable medium 1310 could comprise instructions for an object application 1314 for identifying an object defined by a determined boundary (e.g., a polygon associated with the object). A given object may have multiple boundaries defining polygon surfaces of the object.

The computer-readable medium 1310 could comprise instructions for a data point application 1316 for computing data values related to key points of a first image. A given key point could be indicated explicitly or implicitly by the data point indicators 1330. For instance, a given key point could be a derived key point (e.g., from user-identified data points). As an example, a user may identify the farthest points on the surface of an object, but the computing device may determine a key point that is at a center point to the identified objects. A key point could be an indication of a type of feature common to all the objects (e.g., a middle point or top left corner point) and associated with a particular data point in each of the objects. The computer-readable medium 1310 could comprise instructions for a prediction application 1318 to predict a change in computed values (e.g., in subsequent images of the image data 1332). The computer-readable medium 1310 could comprise instructions for a correction application 1350 to generate a data set for analysis for corrective action. In other embodiments, fewer, different, or additional applications can be stored in computer-readable medium 1310.

In one or more embodiments, one or more applications stored on computer-readable medium 1310 are implemented in software (e.g., computer-readable and/or computer-executable instructions) stored in computer-readable medium 1310 and accessible by processor 1308 for execution of the instructions. The applications can be integrated with other analytic tools (e.g., offered by SAS Institute Inc. of Cary, N.C., USA).

Embodiments may be advantageous in manufacturing plant surveillance where there is no known tool that serves an end to end process for object tracking using key points and derived engineering metrics from the unstructured video input. In one or more embodiments, artificial intelligence models are implemented to capture surveillance camera footage and detect and predict downtimes/failures. For example, live video data is input (e.g., to input interface 1305), and the computing device 1302 detects objects (e.g., products being manufactured), identifies key points, assign identifiers to track objects as they move along (e.g., on an assembly line), derives engineering metrics from this unstructured video feed, performs analysis on-the-fly to detect anomalies, and optimally alarms of a possible failure (e.g., by sending an alarm to operator or controllers). In one or more embodiments, the artificial intelligence models are robust enough to handle multiple camera angles and varying dimensions of the objects.

Embodiments will be described in the context of a manufacturing plant, as an example. However, embodiments can be applied in other domains such as, but not limited to, people tracking, surveillance camera monitoring, security, manufacturing, consumer packaged goods, transportation, packaging and shipping, and warehouse logistics.

In one or more embodiments, the correction system 1300 or one or more devices in the correction system 1300 (e.g., computing device 1302) implements a method as described herein (e.g., a method shown in FIGS. 14A-14C) for generating or outputting a dataset (e.g., dataset 1360).

Figure 14A:
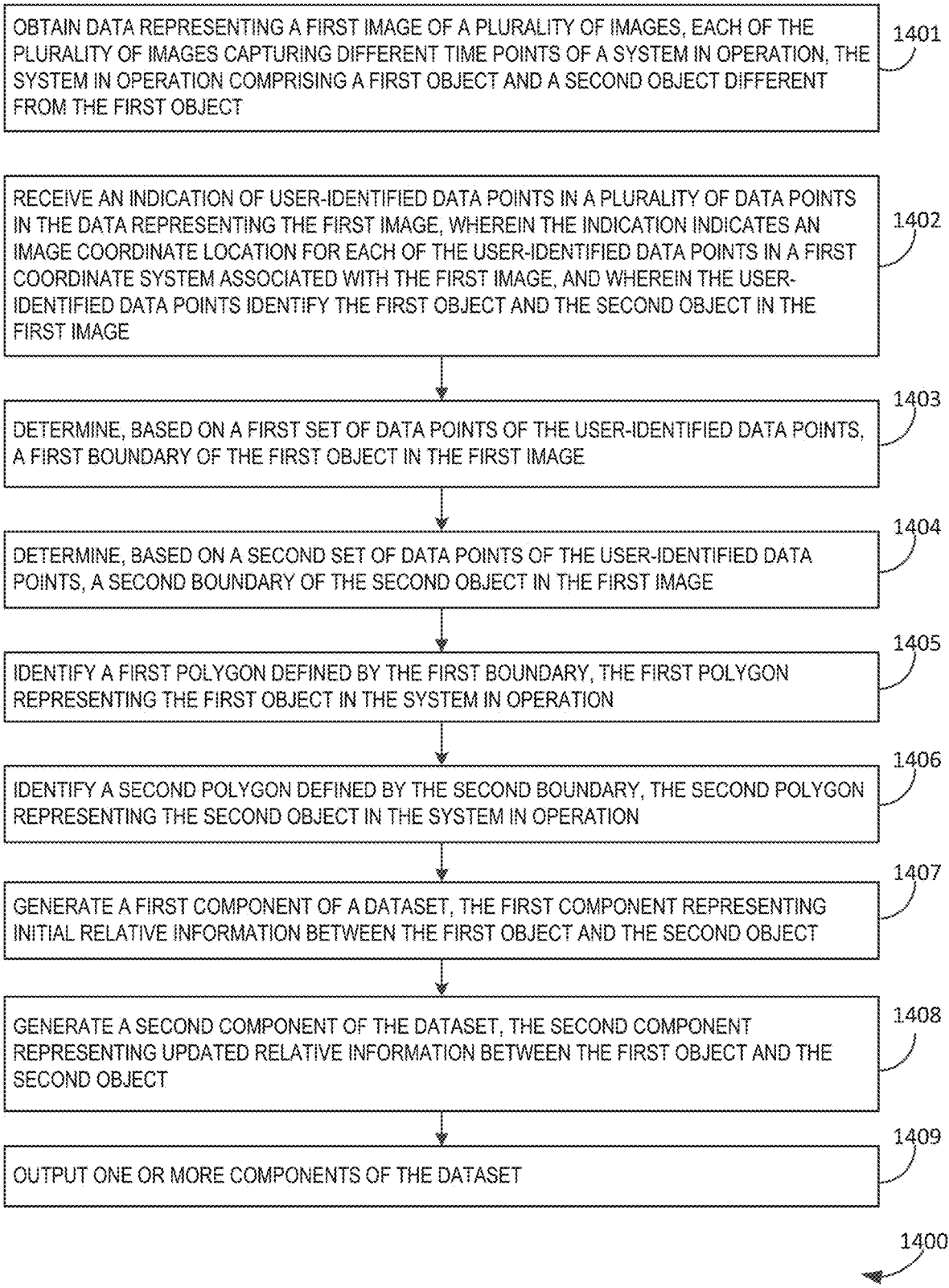
FIG. 14A illustrates an example of a flow diagram for generating and outputting a dataset comprising relative information between objects in a system in operation in at least one embodiment of the present technology.

FIG. 14A illustrates a method 1400 for generating and outputting a dataset comprising relative information between objects in a system in operation. FIGS. 15A-D illustrate object identification in an example image according to the method 1400.

Figure 15A:
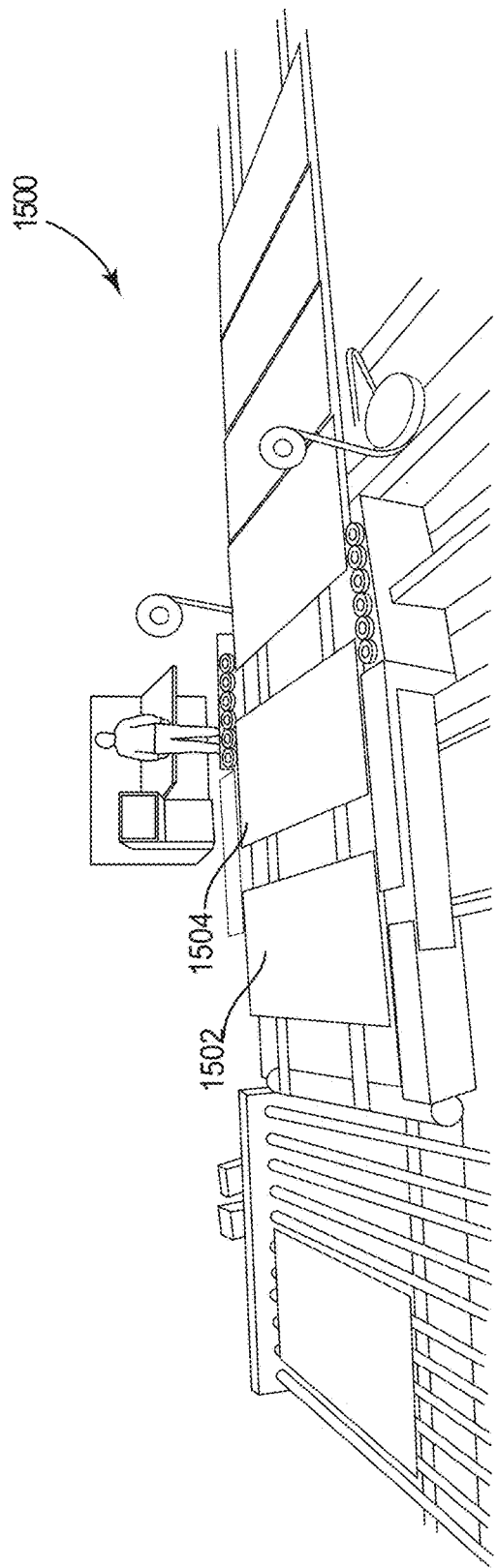
FIGS. 15A-D illustrate examples of object identification in an image in at least one embodiment of the present technology.

In an operation 1401, the method 1400 comprises obtaining data representing a first image of a plurality of images. Each of the plurality of images captures different time points of a system in operation. FIG. 15A shows an example of a video image 1500 of boards on a conveyor belt of a manufacturing plant. In the method 1400 the system in operation comprises a first object and a second object (board 1502 and board 1504). The first object is different than the second object in that it is a different board and a different position within the manufacturing process. However, otherwise the boards would appear very similar and difficult to track and distinguish. More than two objects are possible (e.g., other boards shown within the video image 1500). In other embodiments, the system in operation could comprise only one object.

Figure 15B:
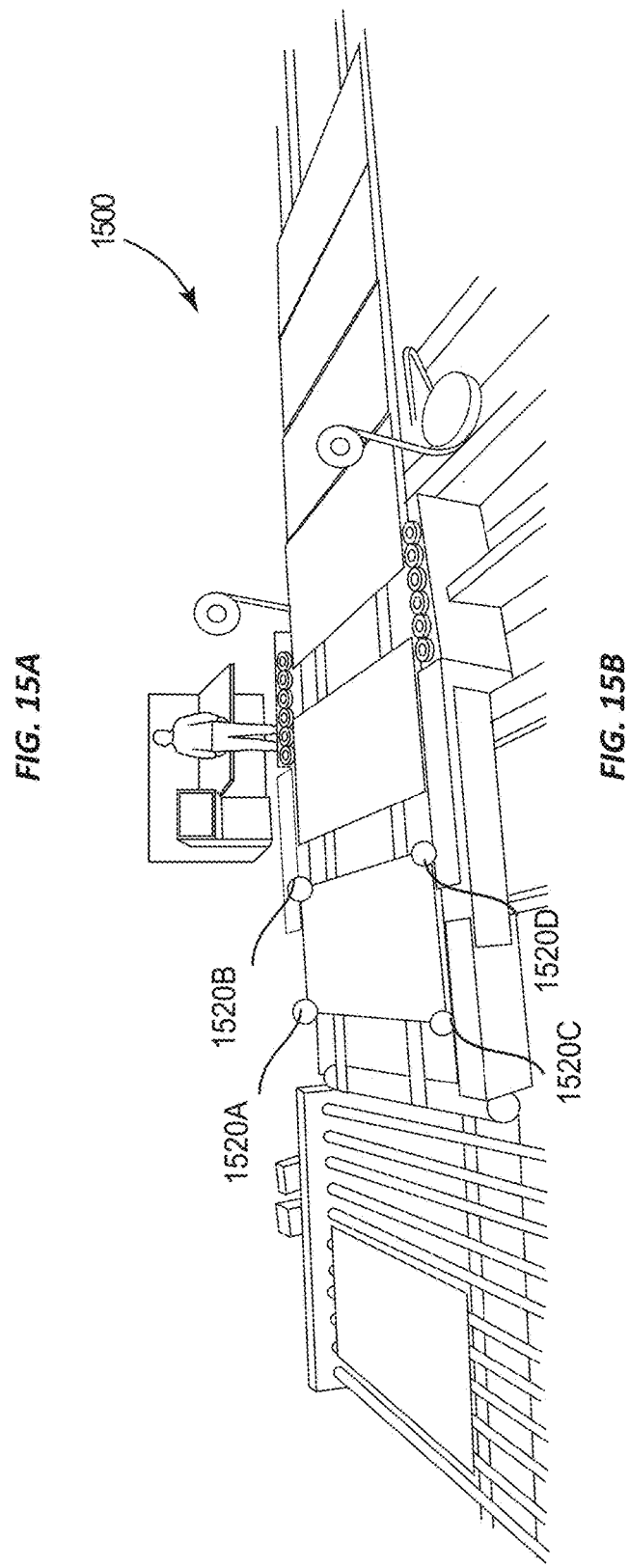

In an operation 1402, the method 1400 comprises receiving an indication of user-identified data points in a plurality of data points in the data representing the first image. The indication indicates an image coordinate location for each of the user-identified data points in a first coordinate system associated with the first image. The user-identified data points identify the first object and the second object in the first image. FIG. 15B shows an example of user-identified data points 1520 for board 1502. In one or more embodiments, a computing system (e.g., computing device 1302) receives user-identified data points (e.g., user-identified datapoints 1520) for each corner of an object shown in an image (e.g., board 1502 in video image 1500).

Figure 15C:
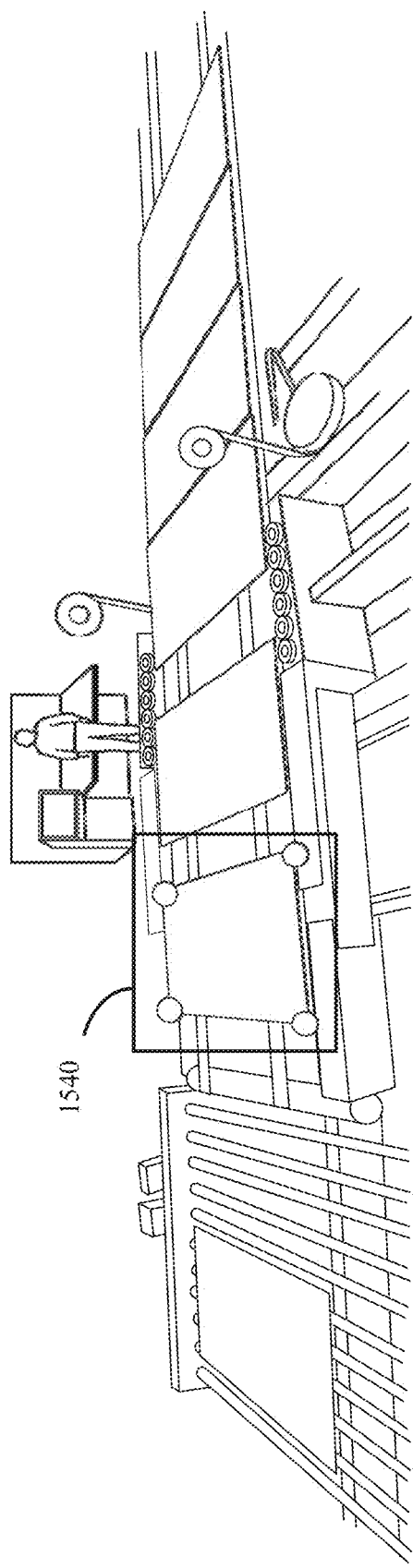

In an operation 1403, the method 1400 comprises determining, based on a first set of data points of the user-identified data points, a first boundary of the first object in the first image. FIG. 15C shows an example boundary 1540 for board 1502. In this example the bounding box formed by the boundary 1540 has a rectangular shape for an object that appears non-rectangular in video image 1500.

In an operation 1404, the method 1400 comprises determining, based on a second set of data points of the user-identified data points, a second boundary of the second object in the first image.

In an operation 1405, the method 1400 comprises identifying a first polygon defined by the first boundary. The first polygon represents the first object in the system in operation. In one or more embodiments, a you only look once (YOLO) detection algorithm is implemented on the rectangular bounding box in a given image to identify a polygon. Using this algorithm, a computing system can identify a non-rectangular shape in a given image corresponding to the non-rectangular shape in a previous image. As shown in FIG. 15C the bounding box is not necessarily tight to the polygon or the datapoints within the bounding box to ensure that the object or a polygon representing the object is within the bounding box. For instance, the computing system may determine a rectangular bounding box for a polygon by extrapolating corners for the rectangular bounding box based on determining a maximum distance between one or more of the user-identified data points, and providing an offset from any corners of the first object.

Figure 15D:
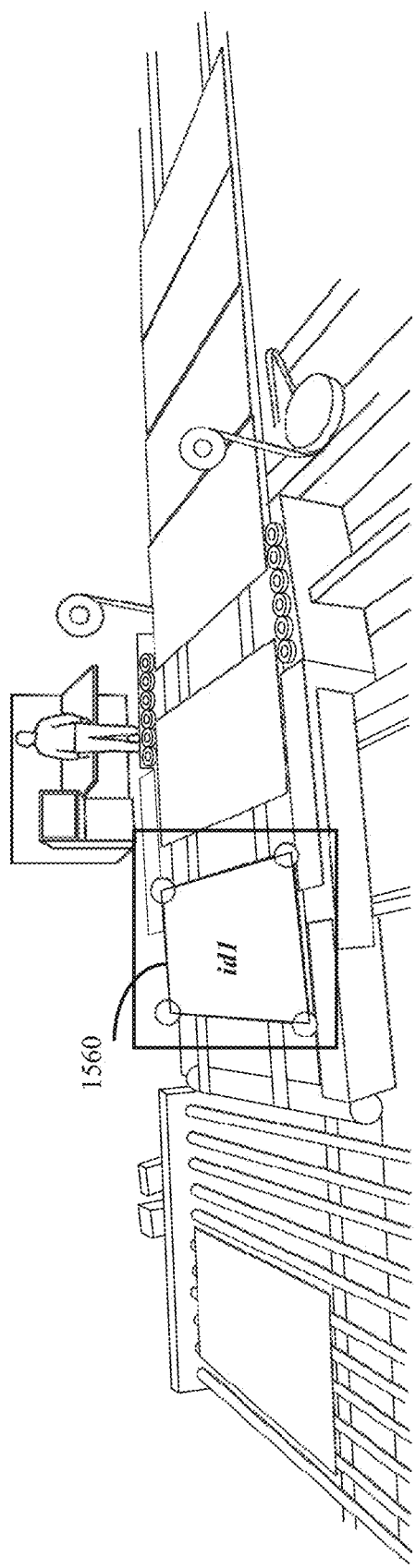

FIG. 15D shows an example polygon 1560. As shown the example polygon 1560 corresponds to the object as it appears in the video image 1500. In this example, the polygon 1560 is distorted from the original rectangular shape of the object to have a non-rectangular shape (e.g., a trapezoid shape) in the video image 1500. The distortion could be due, for example, to an angle of the recording device that capture the image.

In an operation 1406, the method 1400 comprises identifying a second polygon defined by the second boundary. The second polygon represents the second object in the system in operation.

In an operation 1407, the method 1400 comprises generating a first component of a dataset. The first component represents initial relative information between the first object and the second object.

In an operation 1408, the method 1400 comprises generating a second component of the dataset. The second component represents updated relative information between the first object and the second object.

In an operation 1409, the method 1400 comprises outputting one or more components of the dataset.

In one or more embodiments, a computing system can compare the updated relative information to a predicted change for the relative information. Based on the comparison, the computing system can trigger a control to correct the system in operation. For instance, the trigger could comprise sending an electronic notification (e.g., notification 1352) or augmenting the operation of the system (e.g., by sending a notification to a controller 1346).

Figure 14B:
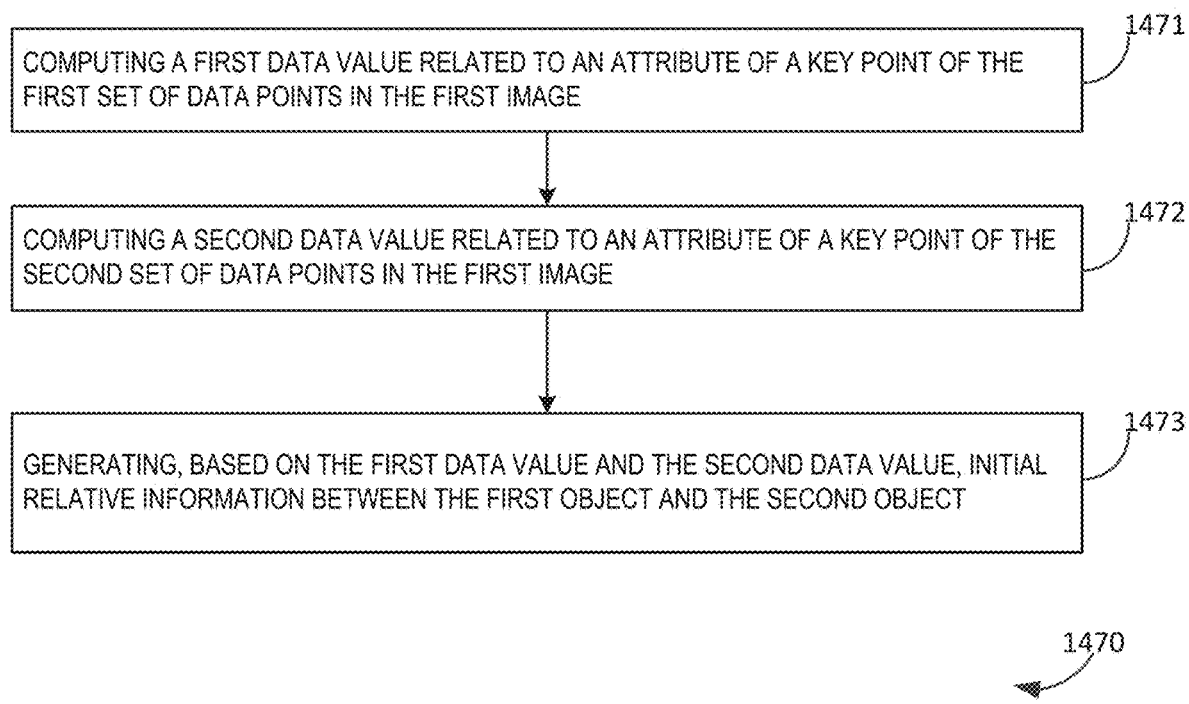
FIG. 14B illustrates an example of a flow diagram for generating a dataset representing initial relative information between objects in a system in operation in at least one embodiment of the present technology.

FIG. 14B illustrates an example method 1470 for generating a dataset representing initial relative information between objects in a system in operation.

In an operation 1471, the method 1470 comprises computing a first data value related to an attribute of a key point of the first set of data points in the first image. The attribute could indicate information about a polygon associated with the key point (e.g., a velocity, acceleration, size, or orientation of the first polygon).

In an operation 1472, the method 1470 comprises computing a second data value related to an attribute of a key point of the second set of data points in the first image (e.g., a velocity, acceleration, size, or orientation of the second polygon).

In an operation 1473, the method 1470 comprises generating, based on the first data value and the second data value, initial relative information between the first object and the second object. This could indicate information such as a current relative position between the objects.

Figure 14C:
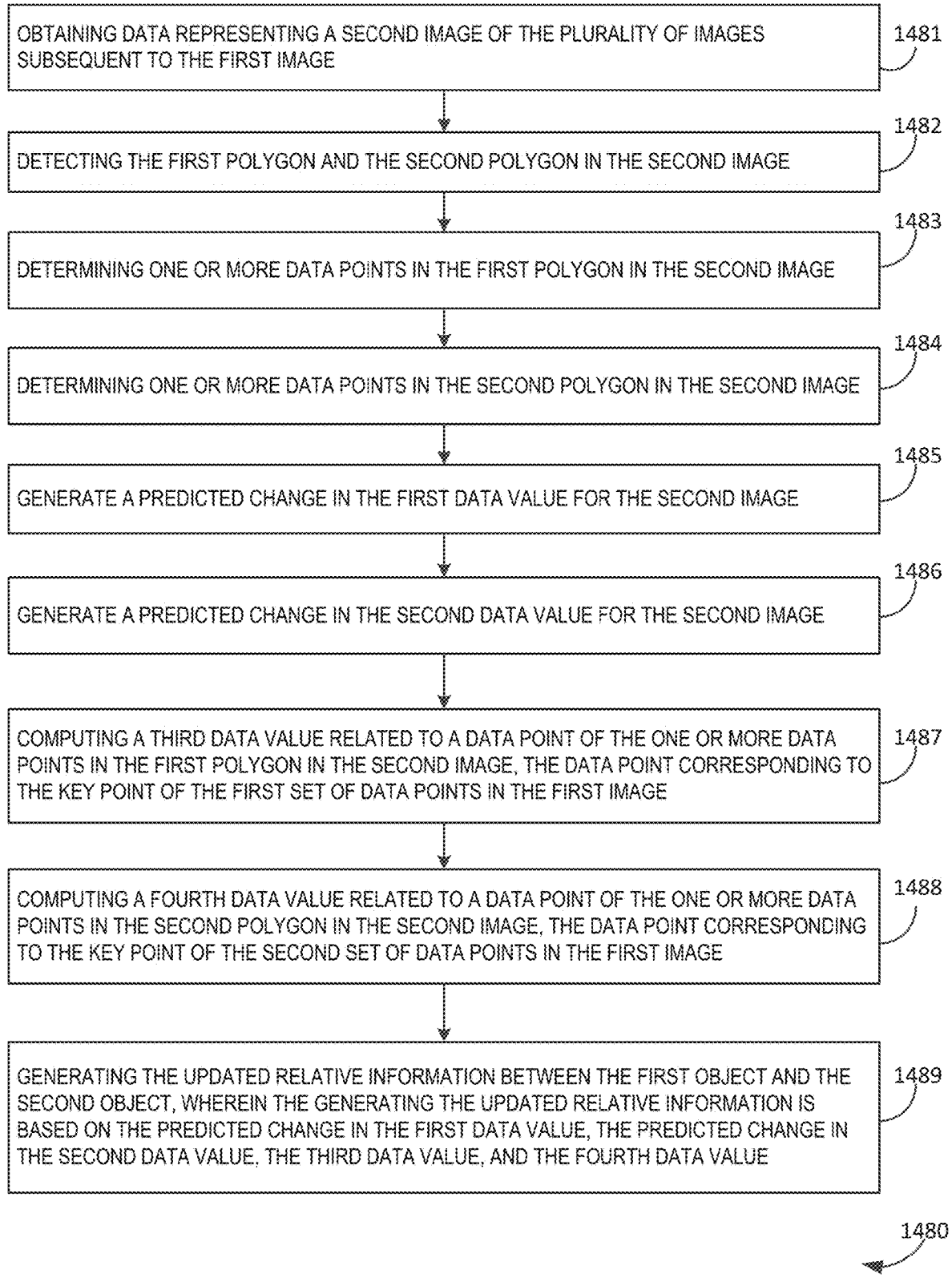
FIG. 14C illustrates an example of a flow diagram for generating a dataset representing updated relative information between objects in a system in operation in at least one embodiment of the present technology.

FIG. 14C illustrates a method 1480 for generating a dataset representing updated relative information between objects in a system in operation.

In an operation 1481, the method 1480 comprises obtaining data representing a second image of the plurality of images subsequent to the first image.

In an operation 1482, the method 1480 comprises detecting the first polygon and the second polygon in the second image. This type of detection may be difficult because the object may not appear the same in each image (e.g., due to issues with different video feeds or environments). In one or more embodiments, the computing system detects a given polygon for a given object in the second image by training, in an overlapping time period, an object detection model on a previous boundary for a given object and a data point detection model.

In one or more embodiments, the computing system may label objects with the same identifier to aid in tracking. For example, computing system may determine an additional boundary for the first object in the second image. The computing system may generate a data set representing pixels within the first boundary and the additional boundary. However, the computing device is able to label, in the data set, pixels within the additional boundary with a same identifier as pixels within the first boundary even though the pixels within the additional boundary have a different pixel resolution or pixel coding than pixels within the first boundary. Regardless, of the detection method, in an operation 1483, the method 1480 comprises determining one or more data points in the first polygon in the second image and in an operation 1484, the method 1480 comprises determining one or more data points in the second polygon in the second image.

In an operation 1485, the method 1480 comprises generating a predicted change in the first data value for the second image. In an operation 1486, the method 1480 comprises generating a predicted change in the second data value for the second image. For instance, Kalman filtering can be used to predict temporal change.

In an operation 1487, the method 1480 comprises computing a third data value related to a data point of the one or more data points in the first polygon in the second image. The data point corresponds to the key point of the first set of data points in the first image. For instance, this computing system may compute an actual change in the first data value to the third data value.

In an operation 1488, the method 1480 comprises computing a fourth data value related to a data point of the one or more data points in the second polygon in the second image. The data point corresponds to the key point of the second set of data points in the first image. For instance, this computing system may compute an actual change in the second data value to the fourth data value.

In an operation 1489, the method 1480 comprises generating updated relative information between the first object and the second object. The generating the updated relative information is based on the predicted change in the first data value, the predicted change in the second data value, the third data value, and the fourth data value.

In one or more embodiments, the predict change and actual changes are compared to determine whether to trigger a control of the system in operation.

FIGS. 15A-D illustrate object identification in an image and have been described in the context of a method 1400. As shown in FIGS. 15A-D, object identification can be performed on raw video footage. This approach contrasts to traditional oversight of manufacturing that must rely on lasers or sensors to supervise objects. Raw video footage presents challenges for identifying an object across different image frames that may look different depending on the objects position. In one or more embodiments, a computing system (e.g., computing device 1302) extracts data representing an image from a real-time video feed comprising the plurality of images and generates a plurality of data models for identifying a polygon in images the data models may be generated by augmenting the extracted data setting as data model equivalent ones of the first polygon in the augmented extracted data. For instance, the computing device may augment the extracted data by performing color jittering, sharpening, lightening, flipping, changing one or more dimensions; and cropping an image represented by the extracted data.

FIG. 15B can be referred to as single-shot labeling in which images are labeled once and can be used to simultaneously train two deep learning (DL) models: a you only look once (YOLO) model and a key-points model. Since each bounding box can be cropped and saved, coordinates of key points can be computed relative to the bounding box. A YOLO model can be trained on original images with bounding box information and a key-points model can be trained on the cropped images with relative coordinates.

Figures 16A, 16B:
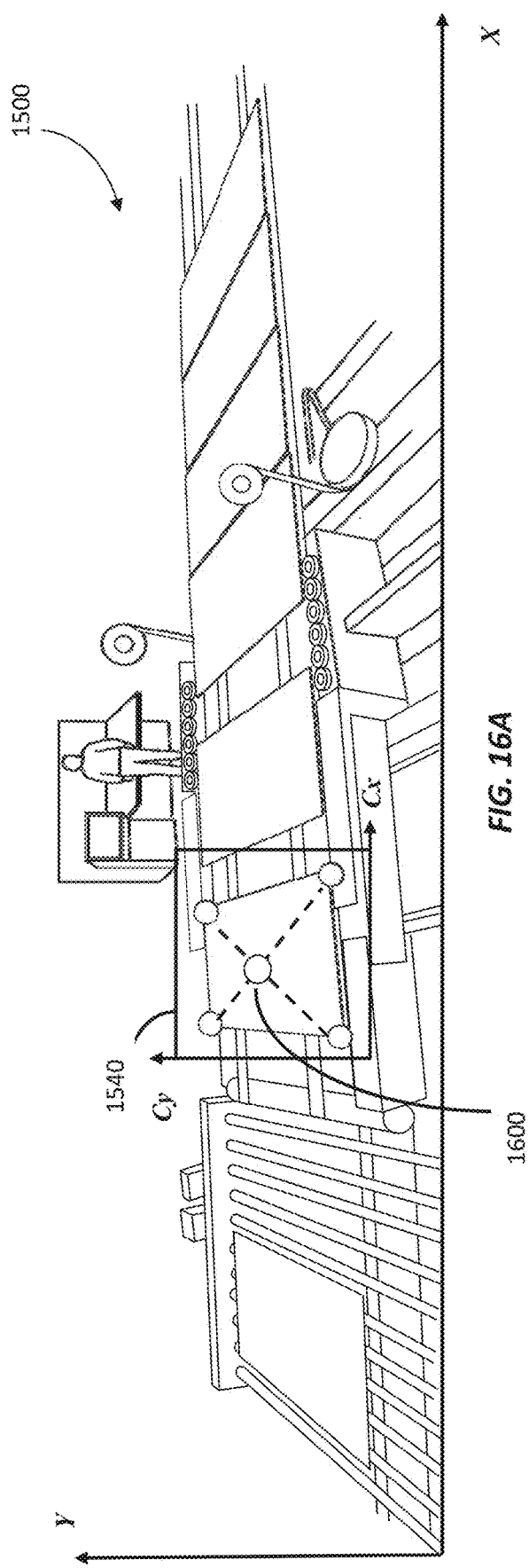
FIG. 16A illustrates an example of a derived data point in at least one embodiment of the present technology.
FIG. 16B illustrates an example of a derived data matrix in at least one embodiment of the present technology.

A key point could be associated with a user-identified data point or it could be a derived data point. FIG. 16A illustrates a derived data point 1600. The derived data point 1600 is at a midpoint of the user-identified datapoints as an example. Other derived data points are possible. For example, a derived data point could be at a midpoint of only a couple of the user-identified data points. The user identified data points and the derived data points in this example are encompassed in a cropped image location formed by the boundary 1540. This cropped image location can be separated from the video image 1500 and have its own coordinate system.

As shown in FIG. 16B a data matrix 1650 shows information regarding the datapoints or derived datapoints generated and stored in a dataset (e.g., an object identifier or position). The position can be computed relative to an image coordinate system (e.g., an X, Y position of video image 1500) or computed relative to a cropped image coordinate system (e.g., Cx, Cy position of a bounding box within the boundary 1540). This is merely given as an example, position can be determined in a location in the image coordinate system, a cropped image coordinate system, or both for derived or user-identified datapoints.

Thus, cropped areas encompassing the polygon can be cropped from each image and a key point location can be defined in the cropped image.

In one or more embodiments data values are computed related to the attribute of the key point that is one of the user-identified data points or one of the derived key points. Data values (e.g., velocity or acceleration) can then be computed based on an image coordinate system or location or a cropped image coordinate system or location and inserted into a dataset (e.g., that represents aspects of data matrix 1650).

For instance, the start position of derived data point 1600 can be used to determine a velocity after obtaining a second cropped area encompassing the polygon in a cropping from a second image. A computing device can determine a second cropped area image location in a second cropped area for one or more data points of the plurality of data points in the first polygon; and derive another data value based on the second cropped area image location.

FIGS. 16A and 16B are shown with respect to key points of a single object for example. However, data can be kept for each of several objects to derive relative information between objects.

Figures 17A, 17B:
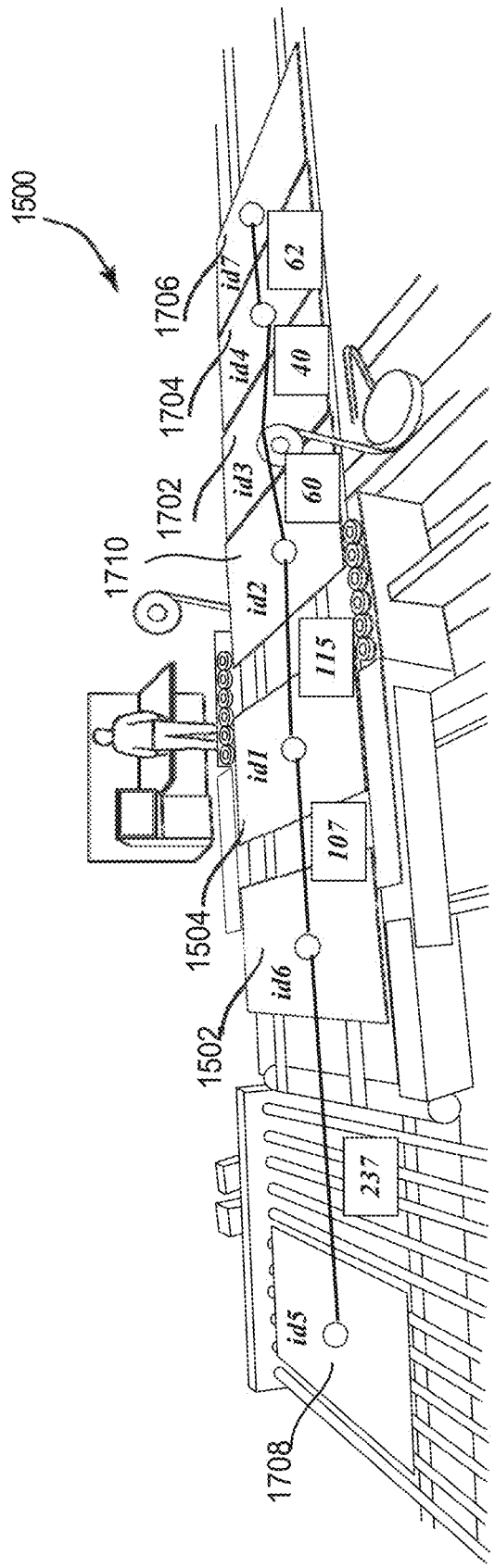
FIG. 17A illustrates an example of derived object information in at least one embodiment of the present technology.
FIG. 17B illustrates an example of derived object data matrix in at least one embodiment of the present technology.

FIG. 17A illustrates derived object information. In this example, a distance is shown between derived center points for boards 1502, 1504, 1702, 1704, 1706, 1708, and 1710. Tight polygons from key points prediction and Kalman filtering can be drawn around the objects and identifiers are assigned to objects to track them as the objects move (e.g., id1-id7). The lines connecting centers of the objects are used to measure distances between them.

FIG. 17B illustrates a derived object data matrix 1700. In this example, different information is associated with a given object. Information is associated with board 1502 regarding the object (e.g., an object label, size and position). Information regarding the object is also generated and associated with the object (e.g., velocity and acceleration). Information is also generated and associated with the object regarding the set of objects in which board 1502 is a part of (e.g., the number of objects). Further information can be derived based on the board 1502's relationship with other objects (e.g., a skew a distance to a forward object and a distance to a back object).

As shown in FIG. 17A, the centerpoint of object 1703 with id3 is obscured by an object in the manufacturing plant. While the centerpoint may be viewable in a previous image and a later image, currently it is obscured. In one or more embodiments, a computing system (e.g., computing device 1302 or correction system 1300) is able to compute a missing attribute of a data point due to an obstruction in a view of the system in operation. For instance, in this case the system is manufacturing many products and there is a predetermined pathway for a given product during manufacture. The computing system can predict a change based on the predetermined pathway. For instance, the computing system can predict a predicted change in a subsequent image that accounts for the obstruction. This preserves the relative information. In this case, the computing system has determined that there is only 40 cm between object 1702 and object 1704. This may indicate the objects are too close together and a collision is likely. In one or more embodiments, the computing system can trigger a control to correct an operation of the system in operation based on a comparison indicating that the given product has moved beyond a tolerance allowed in the predetermined pathway or predicted change based on the predetermined pathway.

In one or more embodiments, a predicted change is computed for one or more data values (e.g., a data value in data matrix 1650). For instance, a computing system may predict a predicted change in a data value by applying a Kalman filter to generate a data table of uncertainties for estimates of the predicted change.

FIG. 18 shows a table 1800 of uncertainties for a first position of key point 1 as an example. As shown the table of uncertainties predicts a change in a data value and the likelihood of that change. The prediction could be based on a model for the system in operation. For instance, as shown in table 1800 the most likely change will be a board will continue advancing along the conveyer belt one unit forward with no change in the y direction. However, it is possible the board will move up or down (e.g., if something blocks its path and causes the board to turn). This creates a degree of uncertainty in the objects path. A Kalman filter allows a weighted prediction in view of the uncertainty given the various possible changes.

Table 1850 shows an updated table of uncertainties after a change in the object's location is observed. In this case the object did in fact have movement in the x and y direction. Now the uncertainties have changed or updated in view of the actual measured movement of the object as well as the model for the system in operation. The estimate can now be updated based on a measured data value and a weighted average derived from the data table of uncertainties for predicting another value different from the previous data values.

Figure 19:
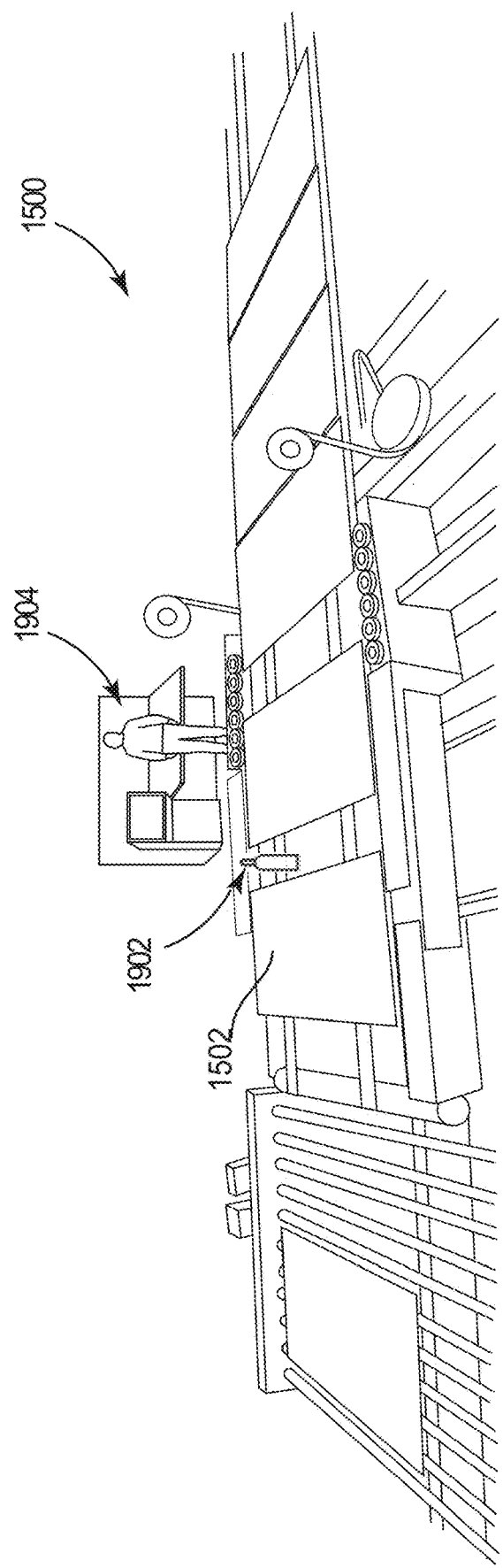
FIG. 19 illustrates an example of controlling a system in operation in at least one embodiment of the present technology.

FIG. 19 illustrates controlling a system in operation. In one or more embodiments, a computing system may determine (e.g., based on generated data for the objects), to trigger a control to correct an operation of the system. In one or more embodiments, the computing system triggers a control to correct an operation of the system in operation by selectively storing data related to a particular object or different objects in images for further analysis of the operation of the system in operation. The system could be analyzed by a computing device to determine whether to correct an operation of the system in operation. The correction could be staging the data or analysis to an operator 1904 of the system for the operator's correction. In the same or different embodiments, a computing system triggers a control to correct the system in operation by stopping or augmenting the operation of the system in operation. For instance, as shown in FIG. 19, if an object is simply skewing, an electronic arm 1902 could be used by the computing system or operator 1904 to correct the object.

In one or more embodiments, the control is based on relative information (e.g., the objects are moving to close together or are moving together too quickly). In the same or different embodiments, the control is based on a comparison of an actual change to a predicted change in a computed value for a given key point for an object. Based on the comparison of the actual change to the predicted change, a computing system can determine a velocity, acceleration, size, or orientation of the first polygon, or one or more data points within the first polygon indicates to correct an operation of the system in operation.

Figure 20:
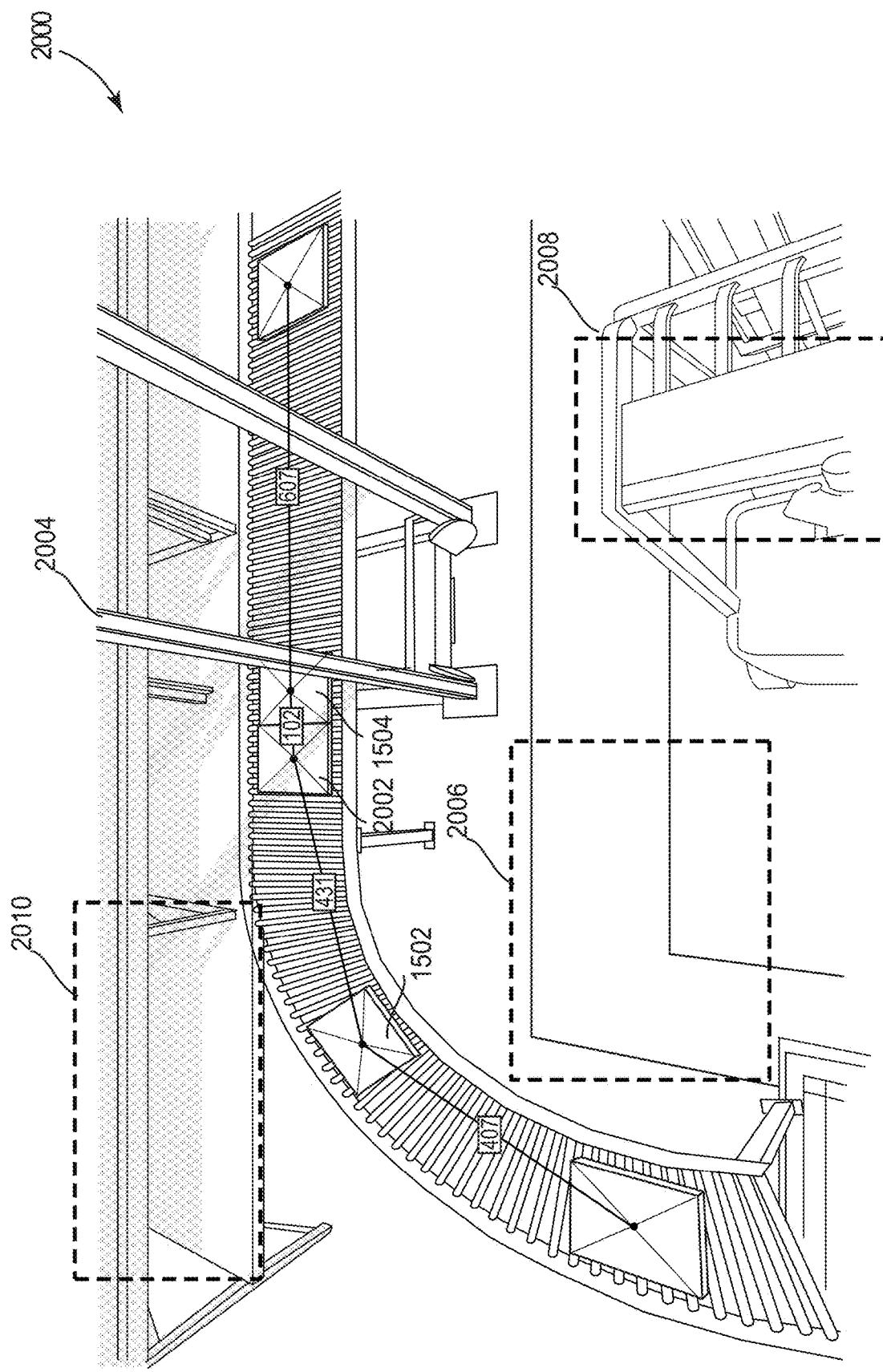
FIG. 20 illustrates an example of object and data point detection in at least one embodiment of the present technology.

FIG. 20 illustrates object and data point detection in an image 2000. As in video image 1500 boards are moving along a conveyor belt. FIG. 20 shows a second image 2000 (e.g., a camera or video image) for the boards 1502 and 1504 seen in a first video image 1500. These products in the subsequent image 2000 are tracked by assigning identifiers and metrics derived from the detected key points with respect to video image 1500.

In one or more embodiments, a computing system (e.g., computing device 1302 or correction system 1300) detects objects even in complex environments with objects of similar shape or shadow or across images from different cameras. In this second image, board 1502 and board 1504 look different from their original form in video image 1500. By modeling the environment, a computing system is also able to detect these objects in the later video image even though the objects may appear distorted or different in color (e.g., due to shadows or different coloring in the video image).

In one or more embodiments, the model or a user may provide information to the computing system regarding one or more attributes of an object (e.g., a pathway or shape of an object) to help in distinguishing an object from other similar polygons. For instance, rectangular shadow 2010, floor tile 2006, and lift 2008 will not be detected as part of the objects even though they present a similar rectangular shape. Different objects may also intervene between the objects and may need to be accounted for in relative information. For instance, object 2002 now appears between board 1502 and board 1504.

In one or more embodiments, the computing system is able to detect these objects that may be distorted by light or angle, or obstructed by other objects in the manufacturing environment. As shown in FIG. 20, object 1504 is now obstructed by post 2004. In this case, the computing system may have been provided with data points for each of the corners of object 1504. However, the computing system is able to determine one or more data points in a polygon corresponding to object 1504 in image 2000 by determining less corresponding data points as the user-identified data points. For instance, the computing system may only determine a midpoint of the object 1504 or a few corners.

Additionally, due to the changing image data, a computing system may need to select a granularity of the coordinate system associated with an image based on the size of the object. For instance, given the much larger image frame compared to the objects, an overly large granularity may not be able to distinguish between object 2002 and 1504. A YOLO detection algorithm implemented on a bounding box could involve selectively modifying the YOLO detection algorithm based on selectively setting the granularity.

Embodiments herein can be used to track objects of varying widths and lengths (e.g., boards of length 8 feet or 20 feet). They can also be used to track objects that change in some respect (e.g., a dimension). In one or more embodiments, a computing device (e.g., computing device 1302) predicts that an object will undergo a change to become two separate objects in the system in operation.

Figure 21:
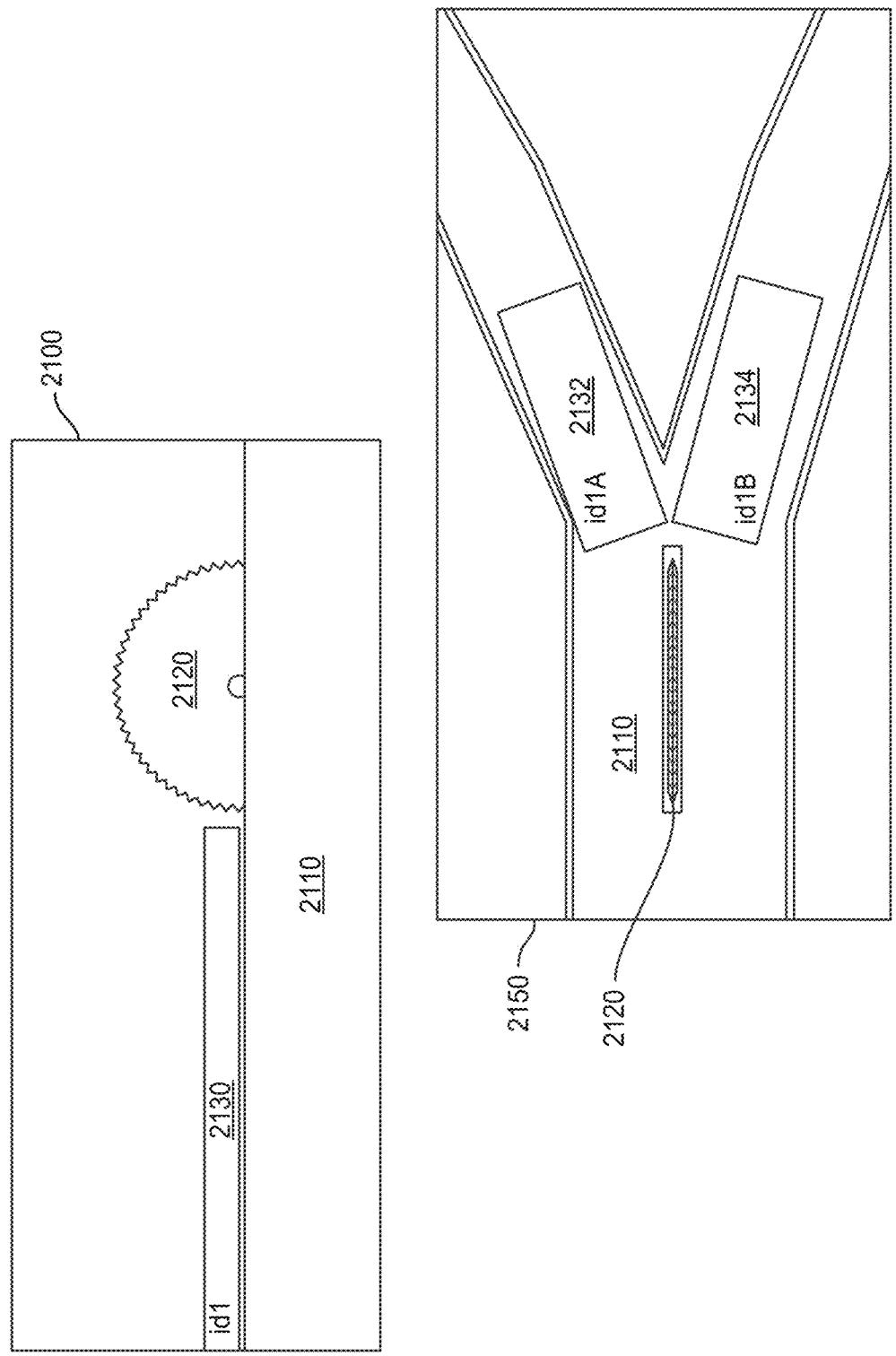
FIG. 21 illustrates an example of tracking of a changing object through different image captures in at least one embodiment of the present technology.

FIG. 21 illustrates tracking of an object 2130. The object in a first image 2100 is cut in half by a saw 2120 and appears as two objects—object 2132 and object 2134—in second image 2150. The width of the object 2130 changed from the first image 2100 to the second image 2150 because the object 2130 was cut in half by saw 2120. The resulting board could be identified as new objects 2132 and 2134 and/or an association with the original object maintained (e.g., by labeling them as still id1, but A and B).

In one or more embodiments, a computing system (e.g., computing device 1302) detects a first polygon (e.g., corresponding to object 2130) in a second image (e.g., image 2150) by detecting two detected polygons (e.g., corresponding to object 2132 and object 2134) each corresponding to components of the first polygon. The computing system assign identifiers (e.g., id1A and id1B) to each of the two detected polygons indicating its relationship to the first polygon in the first image (e.g., image 2100).

Figure 22:
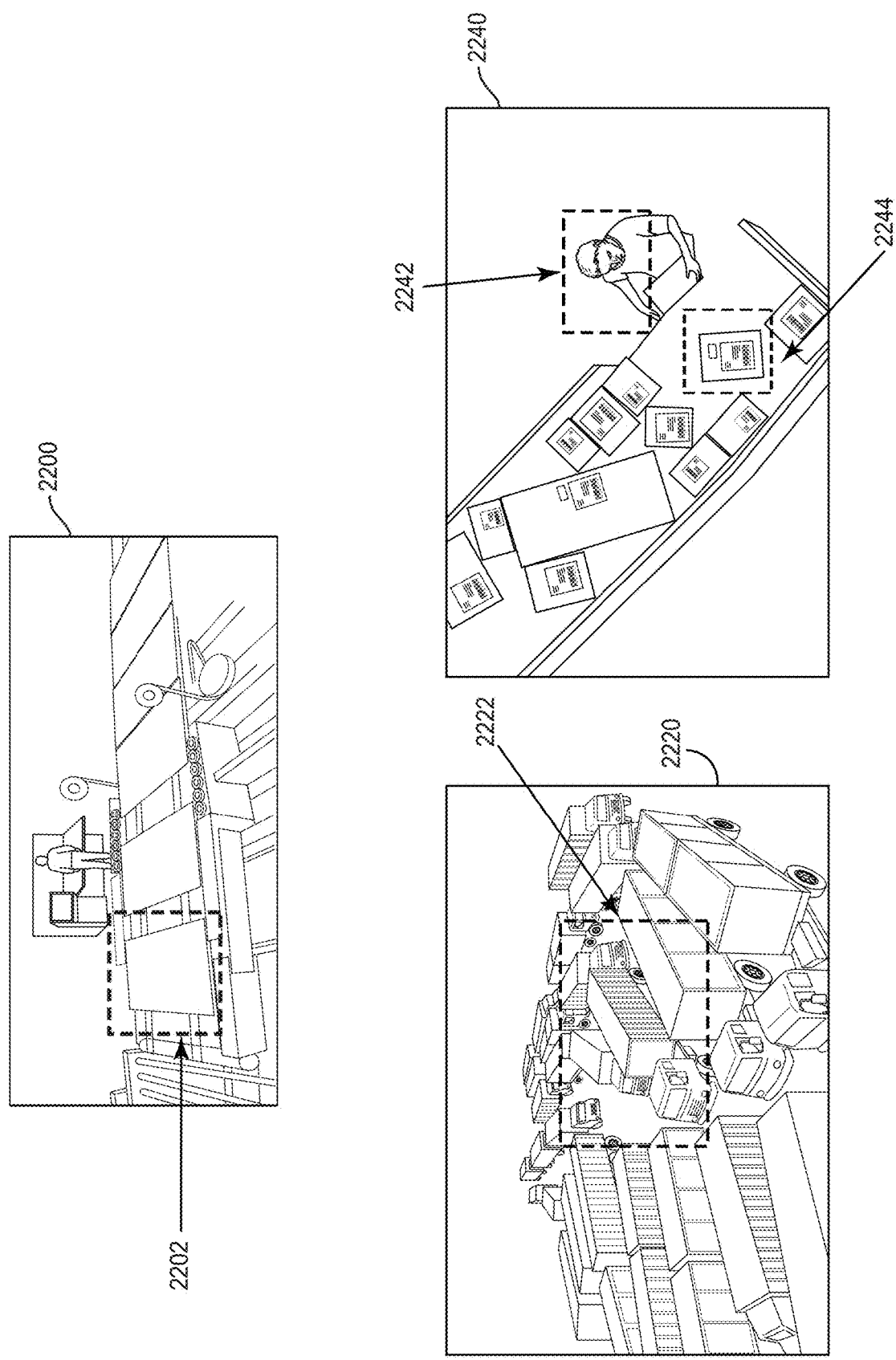
FIG. 22 illustrates an example of video feeds of systems in operations in at least one embodiment of the present technology.

FIG. 22 illustrates video feeds in other applications or domains. One or more embodiments herein were described with respect to a manufacturing environment or system (e.g., the one shown in video image 2200) with objects of manufacture like object 2202. However, embodiments herein are applicable to other systems in operations.

In one or more embodiments, the system in operation is a facial recognition system and the first object is a facial component. Video image 2240 shows facial tracking of an employee 2242. One or more embodiments herein could then be used to detect and track people or personal like the employee 2242. Key points could be identified by a user or derived by a computing system based on particular facial markers. A predetermined pathway for the employees or expected facial expressions is used to model and predict appropriate employee movements or responses.

In one or more embodiments, the system in operation is a transportation, system and an object tracked is a vehicle (e.g., a vehicle transporting a product). Video image 2220 shows a highway with vehicles passing by. The computing system could be used to detect and track a vehicle 2222 and its relationship to other vehicles to ensure appropriate delivery of a package. Key points could be identified or derived based on points on the vehicle. A predetermined pathway for the vehicle could be based on known information about the route the vehicle will take.

In one or more embodiments, the system in operation is a warehouse where products or packages are sorted or stored as shown in video image 2240. In one or more embodiments, an object (e.g., object 2244) is identified and tracked. A predetermined pathway for the vehicle could be based on known information about the expected path for the package. As shown in video image 2240 different models can be generated for the same video image (e.g., a facial recognition system model and package tracking system model).

In each of these examples, the objects identified and tracked could be similar (same truck or box) or different (different trucks, different box sizes). Embodiments described herein are able to handle both situations. It is also expected that the video image size may be different depending on the application (e.g., video image 2200 has different dimensions than video image 2240). Embodiments herein are able to handle different types of image data (e.g., using resizing or modifying a YOLO model).

Figure 23:
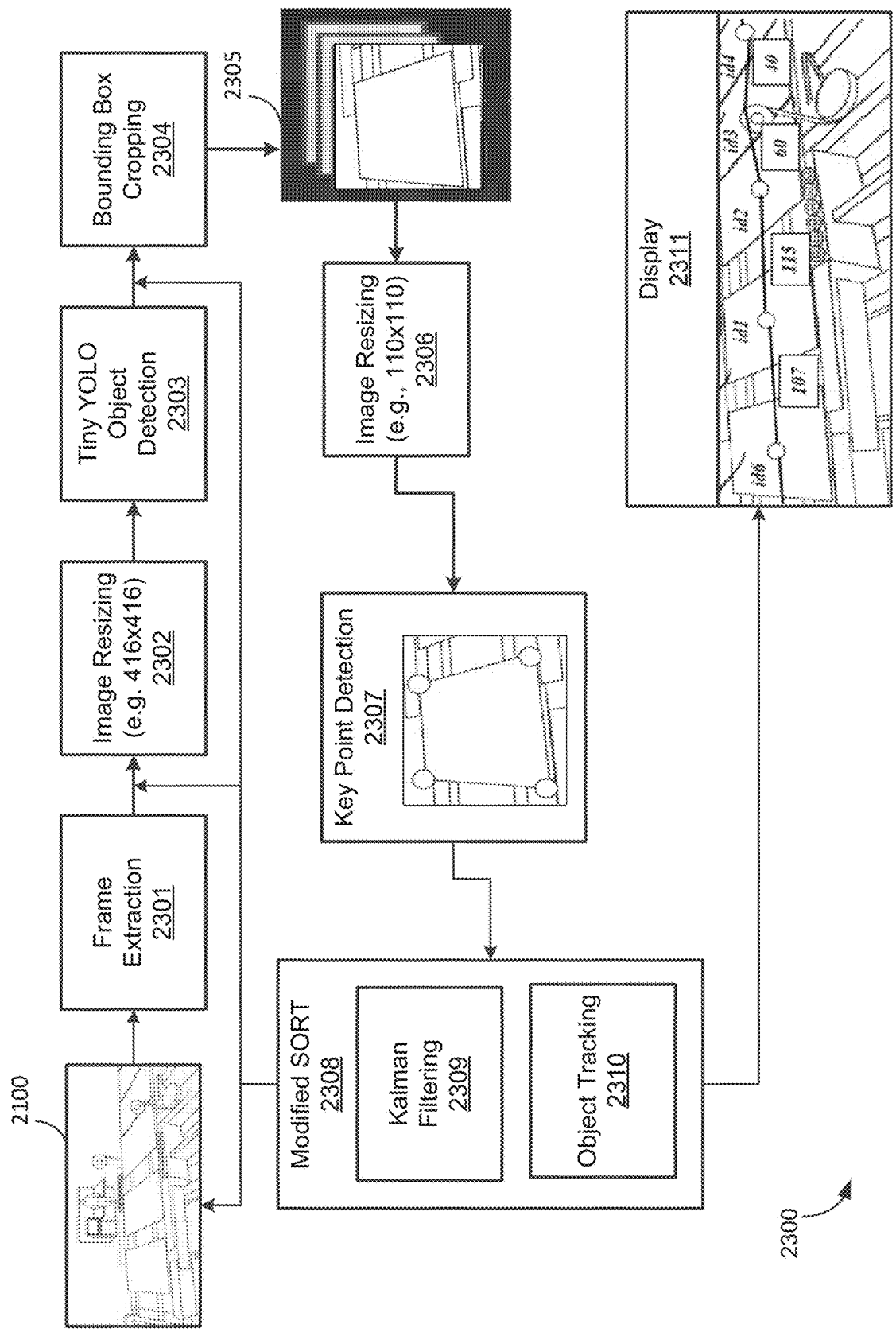
FIG. 23 illustrates an example of a flow diagram for displaying object tracking information in at least one embodiment of the present technology.

FIG. 23 illustrates a flow diagram 2300 (e.g., an artificial intelligence pipeline) for displaying object tracking information.

In an operation 2301 frames are extracted from a video feed 2100. The data representing the frames can be augment or preprocessed. For instance, several data augmentation approaches may be used to make the pipeline models robust. The data augmentation approaches may include color jittering to add noise to the images, sharpening and lightening to perform histogram equalization, random cropping, random flips, and zoom in to train on varying dimensions of the same object.

In an operation 2302, the image is resized. Extracted frames can be resized to 416×416, for example.

In an operation 2303, tiny YOLO object detection is performed. A standard YOLO (You Only Look Once) AI model architecture using Convolutional Neural Networks (CNNs) can be used. The YOLO model draws a bounding box around objects on the assembly line. It can capture objects of varying dimensions. This bounding box information around every object is used to create crops 2305 for each object in the video frame in a bounding box cropping operation 2304. These crops 2305 are then fed to the next stage in the pipeline.

Customizations can be done to these algorithms to make it work for an application (e.g., a manufacturing setting) and also more robust. The standard YOLO architecture may miss out on objects when they come too close to each other. For instance, some pooling layers can be removed from the standard YOLO architecture to have smaller grids which allows embodiments to detect objects even when they are right next to each other, which is common in the manufacturing setting.

The cropped images can be resized in an operation 2306 (e.g., to 110×110).

A key point detection operation 2307 is used to develop a key points model. This is another convolutional neural network (CNN) architecture that takes in as input the crops extracted for every detected object from the YOLO model, and detects key points on objects as defined by the operator/specialist. These are labeled as the x,y pixel coordinates on the video frame, and predictions are made for the same.

In an operation 2308, a modified Simple Online Realtime Tracking (SORT) algorithm can be used. The operation 2308 comprises a Kalman filtering aspect 2309. While there are approaches to track objects using Kalman filtering. These are applied to, or work on the YOLO object detection model. The Kalman filtering aspect 2309 differs from traditional approaches to Kalman filtering in that Kalman filtering is applied to key points. This allows derivation of metrics and other attributes for the object (e.g., a product being manufactured). With other approaches of applying tracking to YOLO, it gives a rectangle bounding box around the object, which cannot really gather any information regarding the features of the object being tracked.

The operation 2308 also comprises an object tracking aspect 2310. Once the objects and key points are detected, intersection-over-union (IOU) of the polygons outlining the objects is computed between consecutive frames. The polygons with highest IOUs are assigned the same identifier (ID) and objects are tracked along the video using these identifiers.

This information derived from the operation 2308 can be fed back to help in subsequent object detection, image resizing and bounding box cropping.

In an operation 2311 derived metrics associated with these identified objects are displayed. Example metrics include information about a set of objects (e.g., a number of objects, distances between objects) or about an individual object (e.g., position of an object, angle of an objects, velocity of an object, acceleration, orientation, skew, alignment or misalignment). This is possible from the key points prediction. In one or more embodiments, the derived metrics can be used to trigger alerts to a controller or notify an operator. These metrics may be used to drive the manufacturing operation in real time. For example, they may help predict and alert about possible jams. In the event of an indicated jam, the controller or operator is notified.

Figure 24:
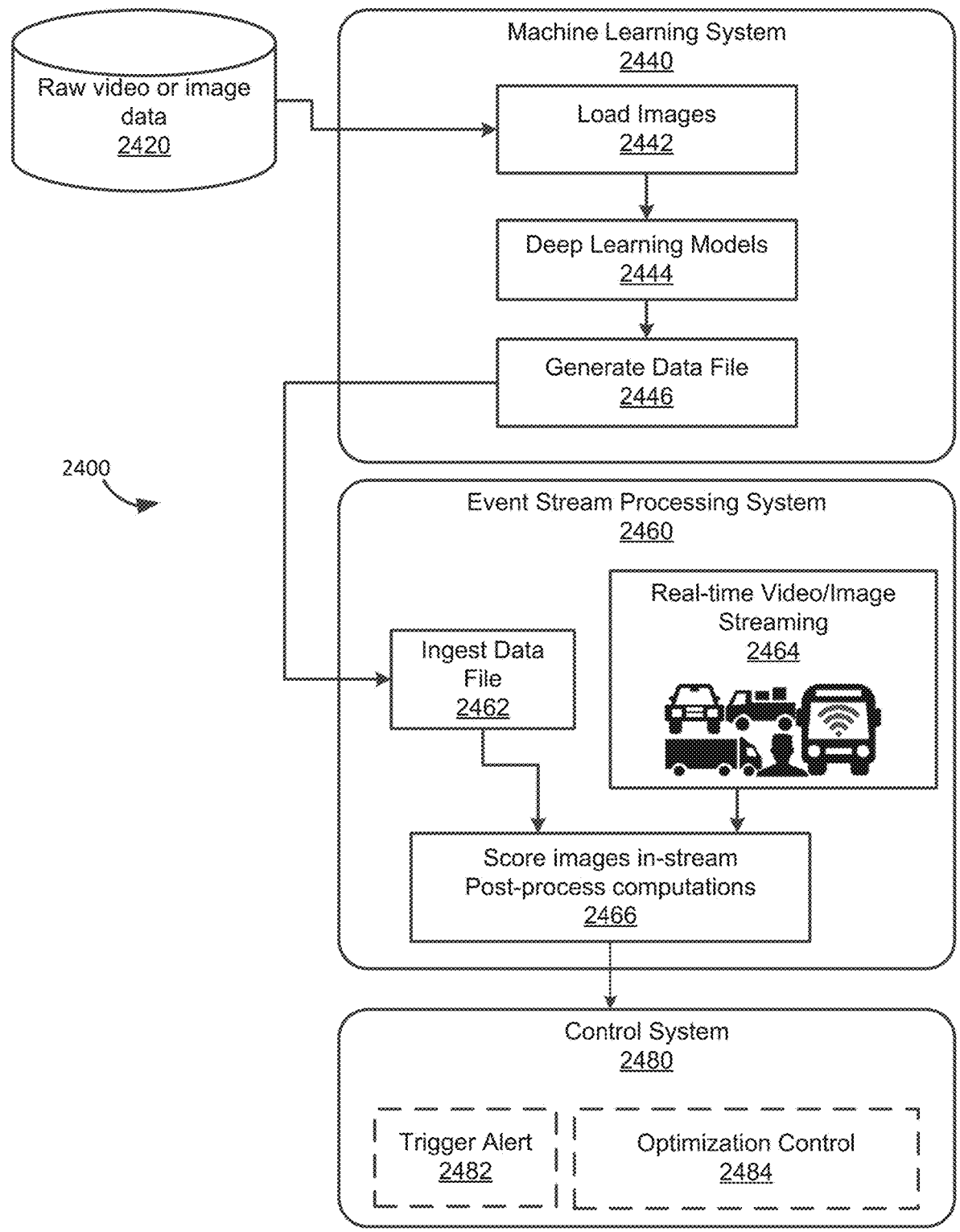
FIG. 24 illustrates an example of a system for displaying object tracking information in at least one embodiment of the present technology.

FIG. 24 illustrates a system 2400 for displaying object tracking information. Raw video or image data 2420 is provided to a machine learning system 2440 to train the models for object detection. For instance, the machine learning system 2440 loads images in an operation 2442, applies deep learning models 2444, and generates a data file 2446. For example, the data file may be an ASTORE file (e.g., generated by a SAS® Viya® Visual Data Mining and Machine Learning (VDMML) procedure provided by SAS Institute Inc. of Cary, N.C.). This data file can be fed into an Event Stream Processing (ESP) System 2460 (e.g., a SAS® Event Stream Processing on the Edge provided by SAS Institute Inc.). The ESP System 2460 ingests the data file in an operation 2462 and real-time video/image streaming is provided in an operation 2464. In an operation 2466, the images are scored in-stream based on the ingested data file and post-process computations are performed. Output from the ESP System 2460 is sent to a control system 2480. In one or more embodiments, the control system is used to trigger an alert in an operation 2482 or optimize control in an operation 2484. For instance, the control system 2480 can be integrated with controllers (programmable logic controllers, PLC) or can be used to send out notifications and signals to other systems (e.g., a real-time SAS® ESP deployment provided by SAS Institute Inc.).

One or more embodiments described herein provide advantages to traditional object detection by applying an artificial intelligence model based on completely unstructured live video to detect object through obstructions and perform real time scoring/predictions on a live video stream directly from a camera. Traditional YOLO object detection models are improved by embodiments through customization to have smaller grids which helps detect objects even when they get very close to each other. The standard YOLO model would otherwise miss these objects. One or more embodiments, advantageously detect objects through an obstruction, detect objects of varying dimensions, and derive position, angle, velocity, orientation, skew, alignment, and distances between objects, using the key points model prediction and Kalman filtering. Kalman filters allow for the incorporation of temporal information into time-independent deep learning models for robust object tracking with assignment of identifiers.

One or more embodiments, are particularly helpful in a manufacturing environment, by integrating with PLC controllers to send out notifications or alert an operator or to derive engineering metrics associated with objects in video by scaling the computed metrics with respect to the environment (e.g., conveyor belt). One or more embodiments can work with varying camera angles and zoom using various data augmentation approaches. However, embodiments are useful in other domains as explained herein.

Embodiments described herein are also useful for tracking objects that arrive in an unstructured manner (such as within a queuing system). For instance, as shown in FIG. 22, trucks in image 2220 may have varying gaps between them or cross into different lanes. As another example, in FIG. 22, image 2240 shows packages with variable sizes arriving in different parts of a conveyor. These objects may be considered objects queuing at or through a particular location. Queueing systems are widely used in operation management for a multitude of problems in hospitals, retail stores, and manufacturing lines.

Existing methods for queue tracking used geofencing techniques to predefine an area where objects were likely to gather. Geofencing techniques are error-prone because unstructured gathering like queues can grow outside of any pre-defined geofence. For instance, if a truck lane is blocked, the trucks may begin queuing on the shoulder.

Other conventional queueing systems use models constructed on a set of unrealistically simplified assumptions that often exhibit degraded performance in practice. For example, they typically consider a specific distribution on dynamical system arrival process and service times, e.g., following a Poisson or Phase-type distribution. There is also a common assumption that the arrivals are from a stationary process and service times are independent and identically distributed (i.i.d) over time. Even though many of these models have proved to exhibit a close-to-optimal performance, they often lack direct applicability to real-world scenarios. It is evident that many of these assumptions such as stationarity do not hold even in the simplest queueing models. Even worse, in many applications of interest dealing with queues of humans, there is no easy way of assessing the state which usually makes theoretically justified frameworks not directly applicable. To address many questions like these, embodiments herein provide a data-driven framework that can facilitate feature extraction, simulation, and designing optimal controls for an environment (e.g., a queueing system).

Figure 25:
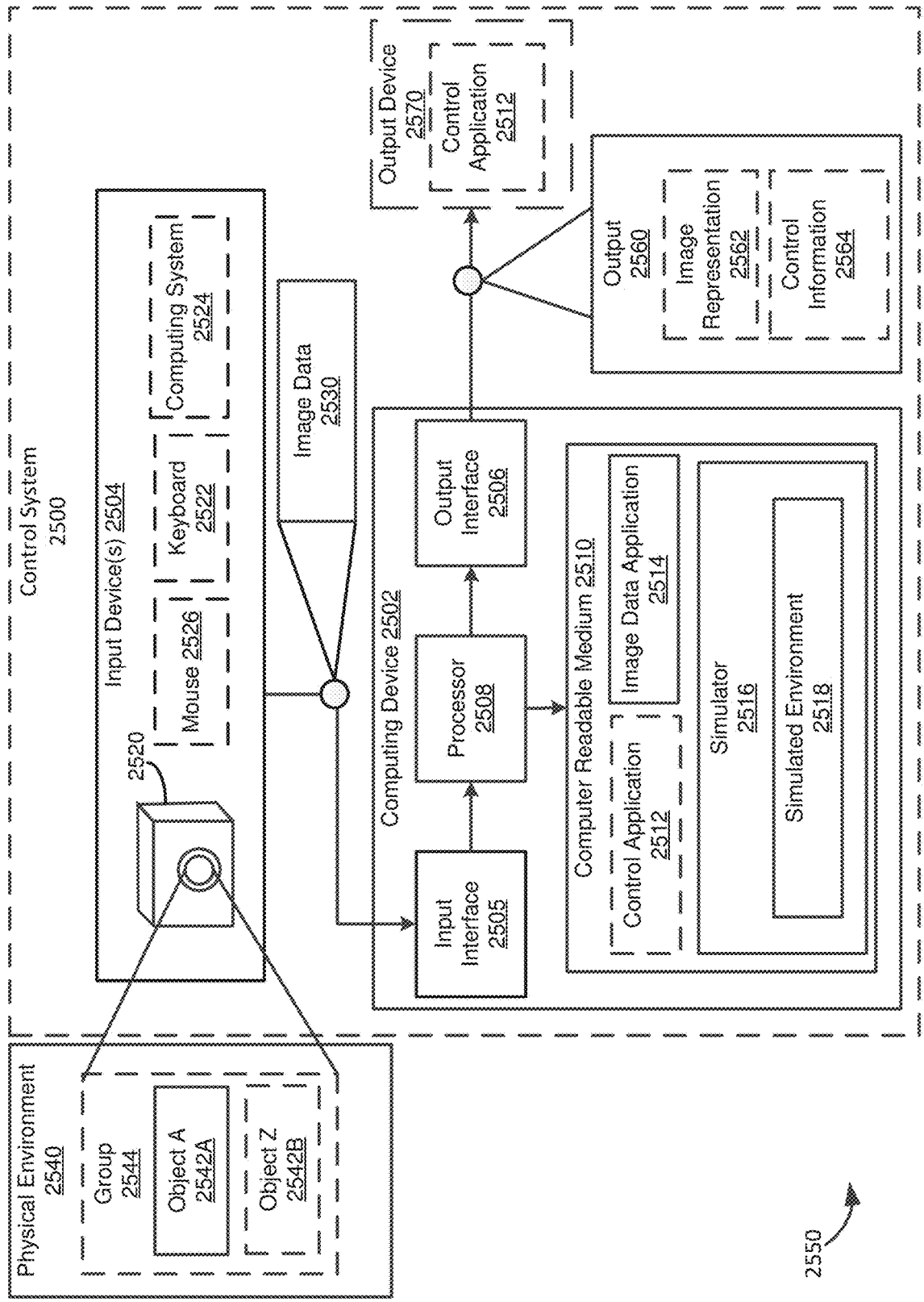
FIG. 25 illustrates an example block diagram of an image system in at least one embodiment of the present technology.

FIG. 25 illustrates an example block diagram of an image system 2550. The image system 2550 comprises a physical environment 2540 (e.g., a single object 2542A, multiple different objects 2542, one or more objects in a group 2544, and/or multiple groups 2544). For instance, the physical environment 2540 may comprise a system with tracked objects (e.g., a queuing system or a system in operation 1340 described in FIG. 13).

In one or more embodiments, the image system 2550 comprises a control system 2500 (e.g., for controlling the physical environment 2540). The control system 2500 can comprise a correction system 1300 described herein for correcting an operation of the physical environment 2540. The control system 2500 is shown separately from the physical environment 2540, merely for example. In other embodiments, one or more components of the control system 2500 is comprised in the physical environment 2540 (e.g., in one or more edge devices in the physical environment 2540).

In one or more embodiments, the control system 2500 comprises input device(s) 2503, computing device 2502, output device 2570, and/or devices of correction system 1300. The control system 2500 is configured to exchange information between devices in the system (e.g., via wired and/or wireless transmission). For example, a network (not shown) can connect one or more devices of control system 2500 to one or more other devices of control system 2500. Alternatively, or additionally, one or more devices in the control system 2500 are integrated together.

In one or more embodiments, the control system 2500 comprises an input device 2520 for receiving information. For instance, the control system may obtain image data 2530 of the physical environment 2540 such as a plurality of images captured over time at different time points. The input device 2520 could be video capturing representations of objects 2542 in the physical environment 2540 in a time-series of images acquired at regular time intervals. Alternatively, or additionally, the input device 2520 captures camera images representations of objects 2542 in the physical environment 2540 at irregular or regular time points in a time series. Alternatively, or additionally, the input device 2520 captures sound navigation and ranging (sonar) representations of objects in the physical environment. Alternatively, or additionally, the input device 2520 captures light detection and ranging (LiDAR) representations of objects in the physical environment. Alternatively, or additionally, the input device 2520 captures radio-frequency identification representations of objects in the physical environment. Alternatively, or additionally, the input device 2520 comprises one or more input device 1320 of correction system 1300 described in FIG. 13 or other devices sensing features of objects.

The input device 2520 may be one of other input devices 2504 (e.g., for user interaction with the control system 2500). In one or more embodiments, the input device 2504 comprises a mouse 2526, a keyboard 2522 or a computing system 2524 and/or is an input device 1304 of FIG. 13. In one or more embodiments, the computing device 2502 receives information from input device 1304 via input interface 2505. For instance, the computing device 2502 receives the image data 2530.

In one or more embodiments, the computing device 2502 outputs information (e.g., to an output device 2570). Output interface 2506 provides an interface for outputting information (e.g., one or more components of dataset 2560) for review by a user and/or for use by another application (e.g., control application 2512) or device or multiple applications or devices. For example, output interface 2506 may interface with various output technologies including, but not limited to, a display, a printer, data storage, another computing device or system, or output device 1370 of FIG. 13.

In one or more embodiments, the output device may be used to receive an image representation 2562 of the physical environment (e.g., a trajectory of an object 2542 of the physical environment 2540) and/or control information 2564 (e.g., control information to augment the physical environment 2540).

In an alternative embodiment, the same interface supports both input interface 2505 and output interface 2506. For example, a touch screen provides a mechanism for user input and for presentation of output to the user. Alternatively, the input interface 2505 has more than one input interface that uses the same or different interface technology. Alternatively, or additionally, the output interface 2506 has more than one output interface that uses the same or different interface technology. Alternatively, or additionally, the input interface 2505 comprises one or more features of input interface 1305 or is input interface 1305 of FIG. 13. Alternatively, or additionally, the output interface 2506 comprises one or more features of output interface 1306 or is output interface 1306 of FIG. 13.

In one or more embodiments, the computing device 2502 comprises a computer readable medium 2510 and a processor 2508. Computer readable medium 2510 is an electronic holding place or storage for information so the information can be accessed by processor 2508. In one or more embodiments, the computer readable medium comprises one or more features of computer readable medium 1310 or is computer readable medium 1310 of FIG. 13.

Processor 2508 executes instructions (e.g., stored at the computer readable medium 2510). In one or more embodiments, the processor 2508 comprises one or more features of processor 1308 or is processor 1308 of FIG. 13. For instance, processor 2508 operably couples with input interface 2505, with output interface 2506 and with computer readable medium 2510 to receive, to send, and to process information.

In one or more embodiments, computer readable medium 2510 stores instructions for execution by processor 2508. For example, computer readable medium 2510 could comprise instructions for an image data application 2514 for obtaining the image data and determining information about the image data or modifying the image data. For example, the image data application 2514 may comprise instructions for detecting one or more objects 2542 or groups 2544 in the physical environment 2540. Additionally, or alternatively, the image data application 2514 may comprise instructions for modifying the image data to visually conceal one or more features of an object 2542 or group 2544. Additionally, or alternatively, the image data application 2514 2514 may comprise instructions for tracking one or more features of the object in image data 2530 or modified image data (a trajectory, unique identifier for the object, group status, distance between objects, etc.). Embodiments may be advantageous for protecting the privacy of tracked objects in a physical environment 2540 (e.g., a person identity, a package address, or a vehicle identity).

Additionally, or alternatively, computer readable medium 2510 could comprise instructions for a simulator 2516 (e.g., a discrete event simulator). For example, the simulator 2516 may comprise instructions for simulating the physical environment 2540 and an object 2542's movement in a group 2544 in the simulated environment 2518.

Additionally, or alternatively, computer readable medium 2510 could comprise instructions for a control application 2512 for generating an indication (e.g., control information 2564) to augment the physical environment 2540. For example, the control application 2512 could comprise instructions to evaluate simulated actions in the simulated environment for a predefined objective for the physical environment. The predefined objective may be related to an interaction between objects 2542 in the group 2544 and is predefined by a first user of the control system 2500. For example, the computing device 2502 could receive a maximum wait time from input devices 2504 for people standing in line. Additionally, or alternatively, the control application 2512 could comprise instructions to generate, based on evaluated simulated actions, an indication to augment the physical environment 2540. The generation can be performed autonomously from involvement by any user of the control system 2500. In one or more embodiments, the computing device 2502 may, for instance, issue an alert to a user of the control system or send the indication to output device 2570 to issue the alert. Embodiments may be advantageous for autonomous and real-time control of a physical environment 2540.

In one or more embodiments, one or more applications stored on computer readable medium 2510 are implemented in software (e.g., computer-readable and/or computer-executable instructions) stored in computer readable medium 2510 and accessible by processor 2508 for execution of the instructions. The applications can be integrated with other analytic tools (e.g., offered by SAS Institute Inc. of Cary, N.C., USA).

Figure 26A:
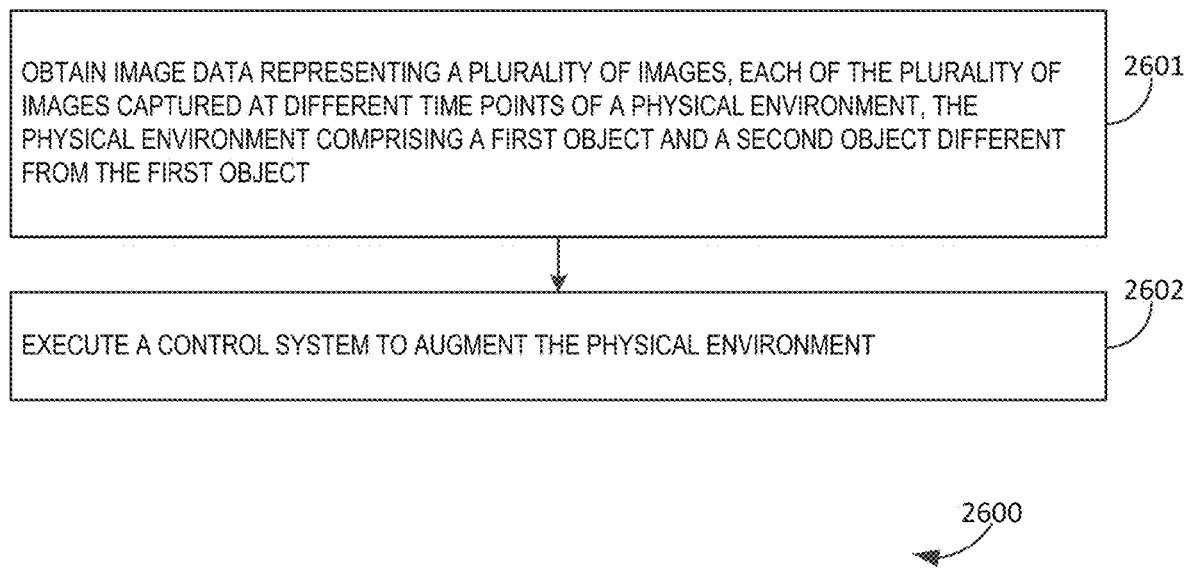
FIGS. 26A-26B illustrate example flow diagrams for executing a control system in at least one embodiment of the present technology.
Figure 26B:
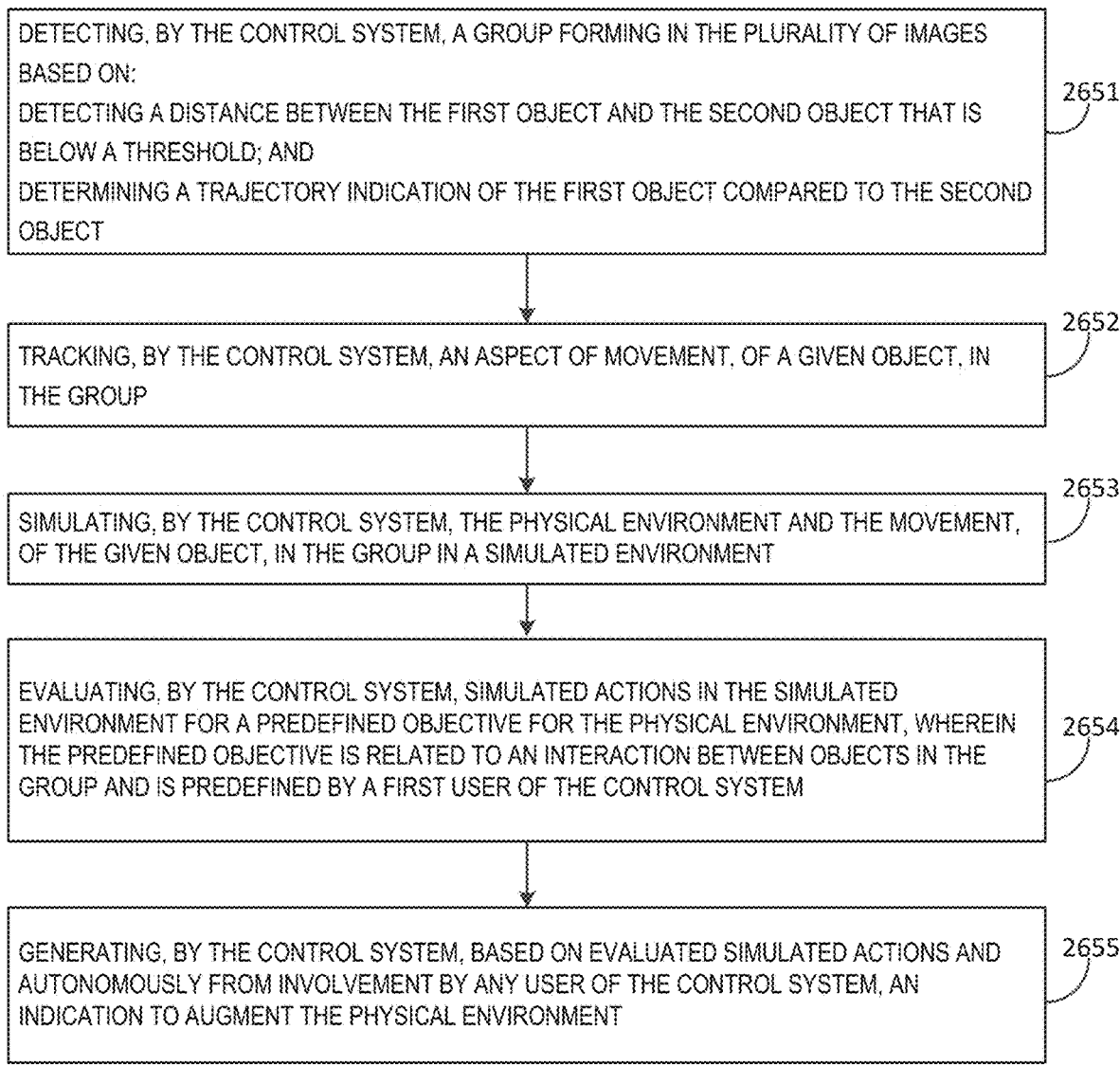

FIGS. 26A and 26B illustrate example flow diagrams for executing a control system. In one or more embodiments, the control system 2500 or one or more devices in the control system 2500 (e.g., computing device 2502) implements a method (e.g., a method shown in FIGS. 26A-26B) as described herein for executing a control system (e.g., control system 2500). Embodiments will be described in the context of a cafeteria environment, as an example in which techniques herein where tested. However, embodiments can be applied in other domains not specifically described. As an illustration, embodiments can be applied to other grouping or queuing systems such as ones involving people, animals, vehicles, and packages. As another example, embodiments can be applied to process environments (e.g., chemical processes, experiments, manufacturing systems, etc.).

Figure 27:
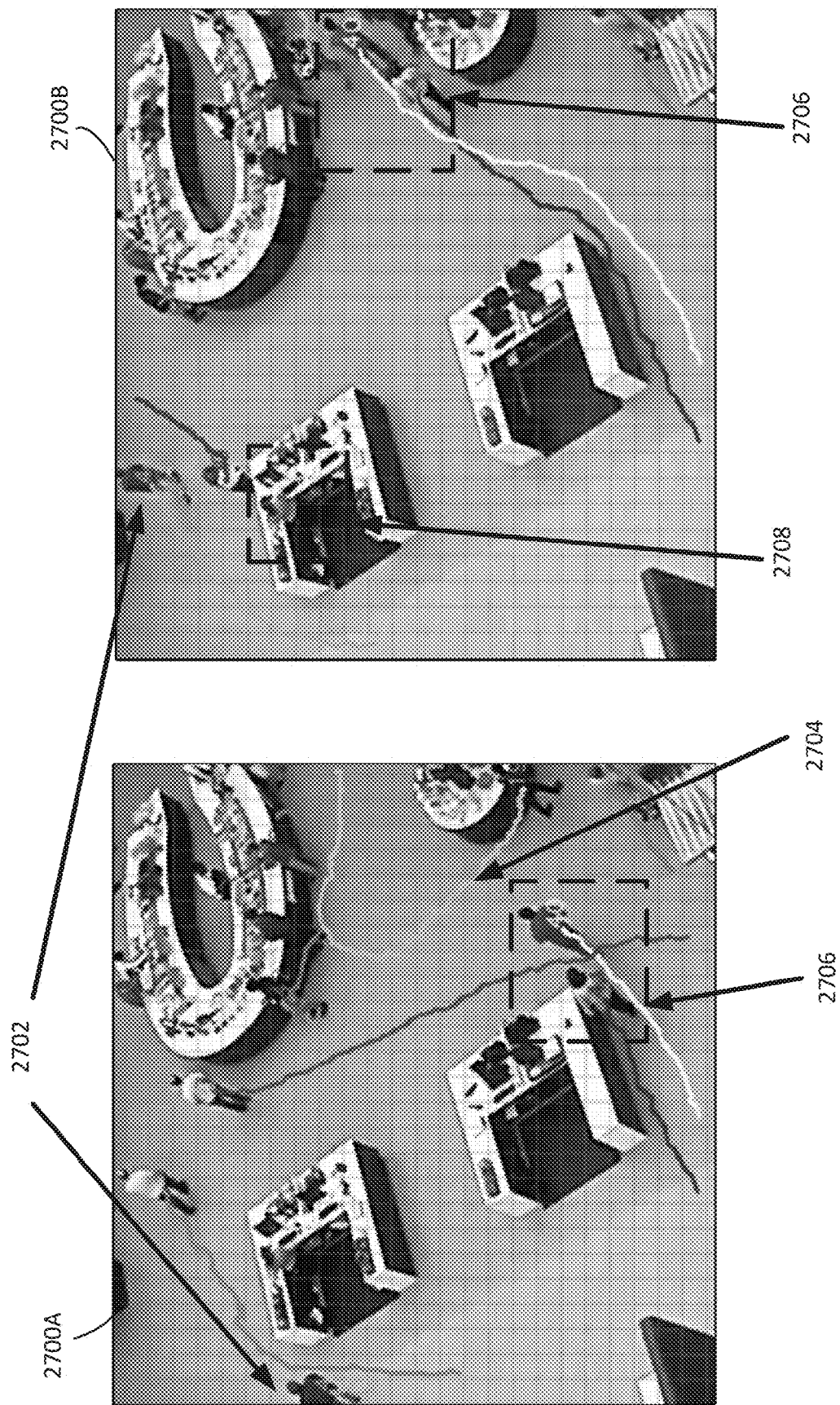
FIG. 27 illustrates an example of tracking objects in at least one embodiment of the present technology.

FIG. 26A illustrates a method 2600 for executing a control system. In an operation 2601, the method 2600 comprises obtaining image data representing a plurality of images. Each of the plurality of images are captured at different time points of a physical environment. For example, a video camera can capture a time series of images acquired at regular time intervals. The physical environment comprises at least two different objects (e.g., a first object and a second object different from the first object). For example, FIG. 27 illustrates an example of tracking objects in a physical environment of a cafeteria. FIG. 27 shows images 2700 capturing people moving within the cafeteria at two different time points.

In an operation 2602, the method 2600 comprises executing a control system to augment the physical environment. For instance, in FIG. 27, the images 2700 only show a single agent 2708. The agent can be a person and/or device that accepts input such as a payment or ticket collector or provides output such as a delivered item or a receipt. The control system could request another agent become available to help with payment for people in the cafeteria (e.g., turning on a self-check out kiosk or sending an alert to a person's phone to turn on an agent).

Operations of FIG. 27A could comprise one or more operations. For instance, FIG. 26B illustrates a method 2650 for executing a control system. In an operation 2651, the method 2650 comprises detecting, by the control system, a group forming in the plurality of images based on: detecting a distance between the first object and the second object that is below a threshold; and determining a trajectory indication of the first object compared to the second object.

As shown in FIG. 27, a trajectory for each of the people is tracked by a control system and displayed on a video image by showing a line indicating an estimation of the objects previous positions in the physical environment. For instance, at a first time, person 2701 is at the middle of the left side of image 2700A but has moved to the middle of the top of image 2700B at a second time. The pink line following person 2701 indicates his pathway through the images 2700. As another example, trajectory 2704 shows a yellow line for a person that has walked around a table of food in the cafeteria.

In image portion 2706, the control system has detected a group comprising two people in the image portion 2706. The distance between the two people is small and the trajectory of the two people is similar. It is possible that these people are the start of a group of a line forming to get food in the cafeteria.

As shown in FIG. 26B, in an operation 2652, the method 2650 comprises tracking, by the control system, an aspect of a movement, of a given object, in the group (e.g., objects entering and leaving the group, objects stopping in the group, etc.). FIG. 28 illustrates an example of tracking objects' movement in a group. The images 2800 show a group forming at the process point no matter which direction the line forms (e.g., line 2810 in image 2800A curves in a different direction that line 2820 in image 2800B). A process point can be an area, line or point where objects move through (e.g., for providing payment or identification). Payment or identification could be performed by providing, for instance, a ticket, an RFID tag, a badge, a QR code, or biometric scan at the process point.

In one or more embodiments, tracking the aspect of the movement, of the given object, in the group comprises tracking in a group persisted after the first object and second object have left the group. For instance, the first two people in a line may indicate the formation of a group, but the control system can track the third person in line even after the first two people have left the line.

As shown in FIG. 26B, in an operation 2653, the method 2650 comprises simulating, by the control system, the physical environment and the movement, of the given object, in the group in a simulated environment.

In an operation 2654, the method 2650 comprises evaluating, by the control system, simulated actions in the simulated environment for a predefined objective for the physical environment. The predefined objective is related to an interaction between objects in the group and is predefined by a first user of the control system. For instance, the predefined objective may include reducing time objects spend in a group (e.g., reducing the amount of time people wait in a queue line). Additionally, or alternatively, the predefined objective comprises augmenting distance between objects in the group. For instance, an operator of the control system may be concerned about the closeness of people for transmitting communicable diseases. The control system according to the objective may send an alert to devices (e.g., devices associated with close people) to communicate an action to increase distance. For instance, the alert may include a message to take a step back or it could include a message to open another process point to encourage a group of people to separate to different process points.

In an operation 2655, the method 2650 comprises generating, by the control system, based on evaluated simulated actions and autonomously from involvement by any user of the control system, an indication to augment the physical environment. For instance, the indication to augment the physical environment may comprise sending an alert to a given user of the control system. For example, a manager of the cafeteria does not need to watch a line forming or define a schedule for agents but can instead wait for an alert to send a second agent. Additionally, or alternatively the indication to augment the physical environment may comprise sending an alert to a given object in the group. For instance, a person in the queue could receive a text message to increase the space between them in line or receive a sound or light message alerting them another agent spot is opening.

In traditional cafeterias, as the queue length at agent locations increases, one of the managers would step in and open a new process point to reduce the waiting time. However, embodiments herein more efficiently can notify an operator when an additional agent is needed. As another example, highway traffic lanes may be controlled on a fixed schedule (e.g., a middle lane directionality set or a lane may sometimes be reserved for emergency traffic). Embodiments can efficiently notify a device to change the status of a lane (e.g., communicating with an electronic lane sign).

In other words, embodiments herein can provide real-time queue monitoring and control. Experiments conducted according to methods 2600 and 2650 in a cafeteria showed significantly lower cost and waiting times compared to traditional approaches. Experiments show that a data-driven pipeline can be an alternative solution to the classical queueing theory techniques in that it can directly optimize the performance of the system through automatic feature extraction (e.g., to detect groups) and use simulation to (e.g., to learn from repeated trial and error) to deploy in a live system.

Figure 29:
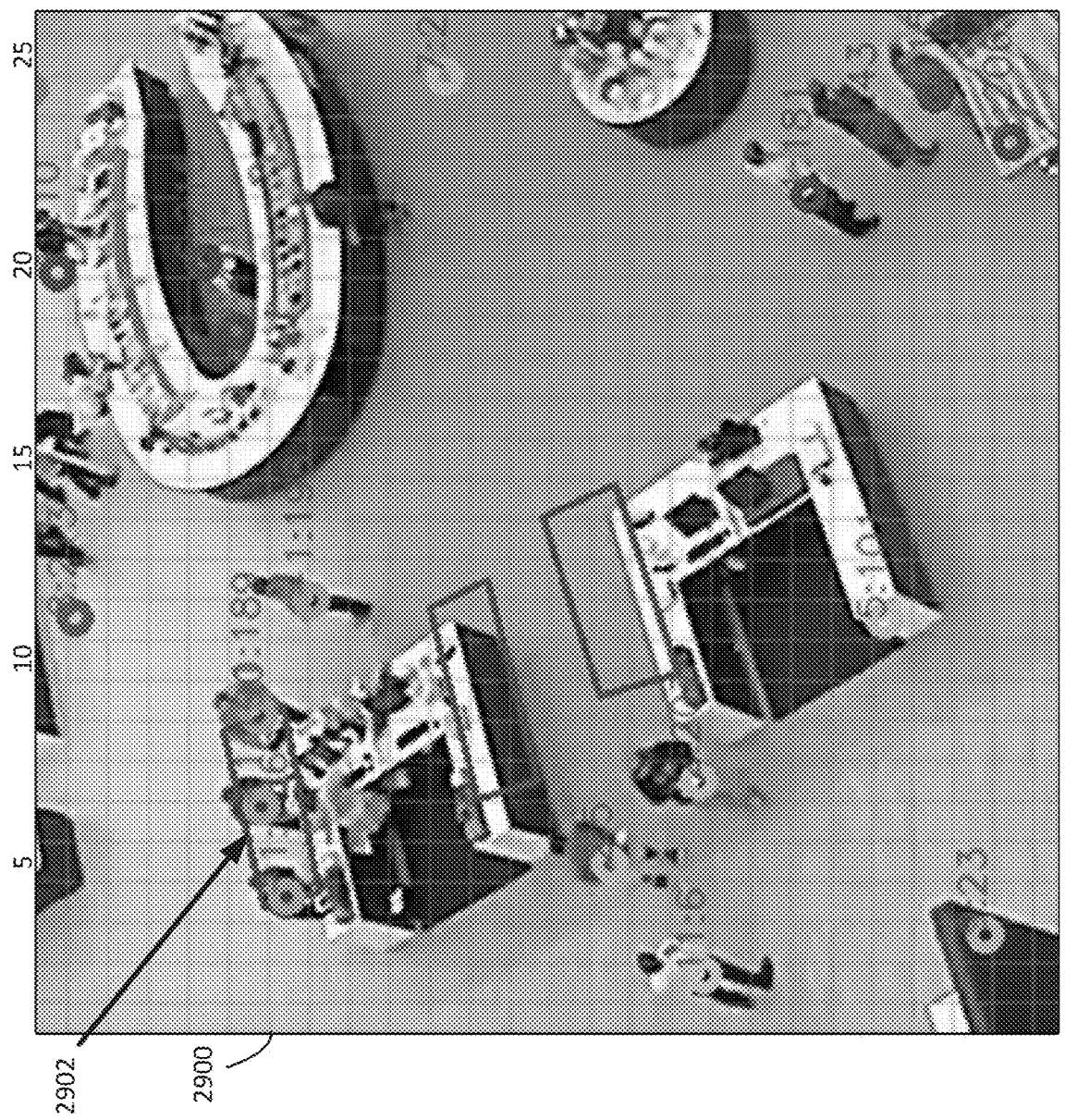
FIG. 29 illustrates an example of tracking objects' movement in a queue in a group in at least one embodiment of the present technology.

FIG. 29 illustrates an example of tracking objects' movement in a queue in a group. In this example, each detected objected in the video image 2900 is assigned a unique identifier shown on the image in proximity to the person and in tracking dataset 2950. The example tracking dataset 2950 is a simplification of a dataset collected in an experiment and of tracking. Tracking techniques are described extensively herein. The tracking dataset 2950 comprises an ordered list of some of the unique identifiers and a respective associated position for each object in the group. In the example, the last two objects in groups −1, 1, 2, 9 and 11 are shown merely for example. The position in this example is defined with respect to the grid (e.g., object −1:189 is at a position 12 grid blocks down from the top of the image 2900 and 7 grid blocks to the right from the left side of the image 2900). However, the position could be defined differently (e.g., an estimate physical distance). Also, multiple positions can be taken to derive or predict information as described by techniques herein (e.g., velocity information shown in tracking dataset 2950).

In one or more embodiments, recorded or predicted position and velocity information can be used to associate objects with a group. In this case, objects with identifier beginning −1 are associated with a queue forming at a process point and objects beginning 1 are associated with a queue forming at a food area. Two objects with identifier beginning with 2 are temporarily associated with each other and the association will be broken when the next recorded position indicates the objects are no longer moving in a similar trajectory. Objects 9 and 11 only have one object in their group because no other object is moving with a similar trajectory and/or there is no other object nearby. The computing system is able to determine even though object 11:6 is stationary and in proximity to group 1 it is not a part of the queue while object −1:198 is even though the person is slightly moving still as it joins the queue. Object 9:23 is tracked even though it is not obscured by an object and its velocity predicted. Objects in an ordered list can also be assigned to a unique polygonal region in the image data. For instance, as shown objects identified beginning −1 are assigned to a region 2902. This can be useful for identifying queues that need to be addressed (e.g., adding a second agent). Alternatively, or additionally a group region can be generated responsive to detecting the group. For instance, a group region for objects identified beginning with 1 could be defined. In one or more embodiments, a control system generates an indication to augment an aspect of the physical environment in an assigned or generated group region (e.g., to send a worker to help processing people waiting near the group region).

Additionally, or alternatively, a control system generates an indication to augment an aspect of the physical environment outside an assigned or generated group region. For instance, embodiments advantageously allow tracking of objects in groups that grow outside a defined group region (e.g., object −1:198). For instance, an arrival count can be determined for objects entering and exiting a queue even outside the queue region based on image data.

In one or more embodiments, the indication to augment the control system comprises generating the indication to increase or decrease a number of detected groups in the physical environment. For instance, a control to open a new process point location may increase the number of groups, but a control to close a process point may be used to decrease the number of groups.

Figure 30:
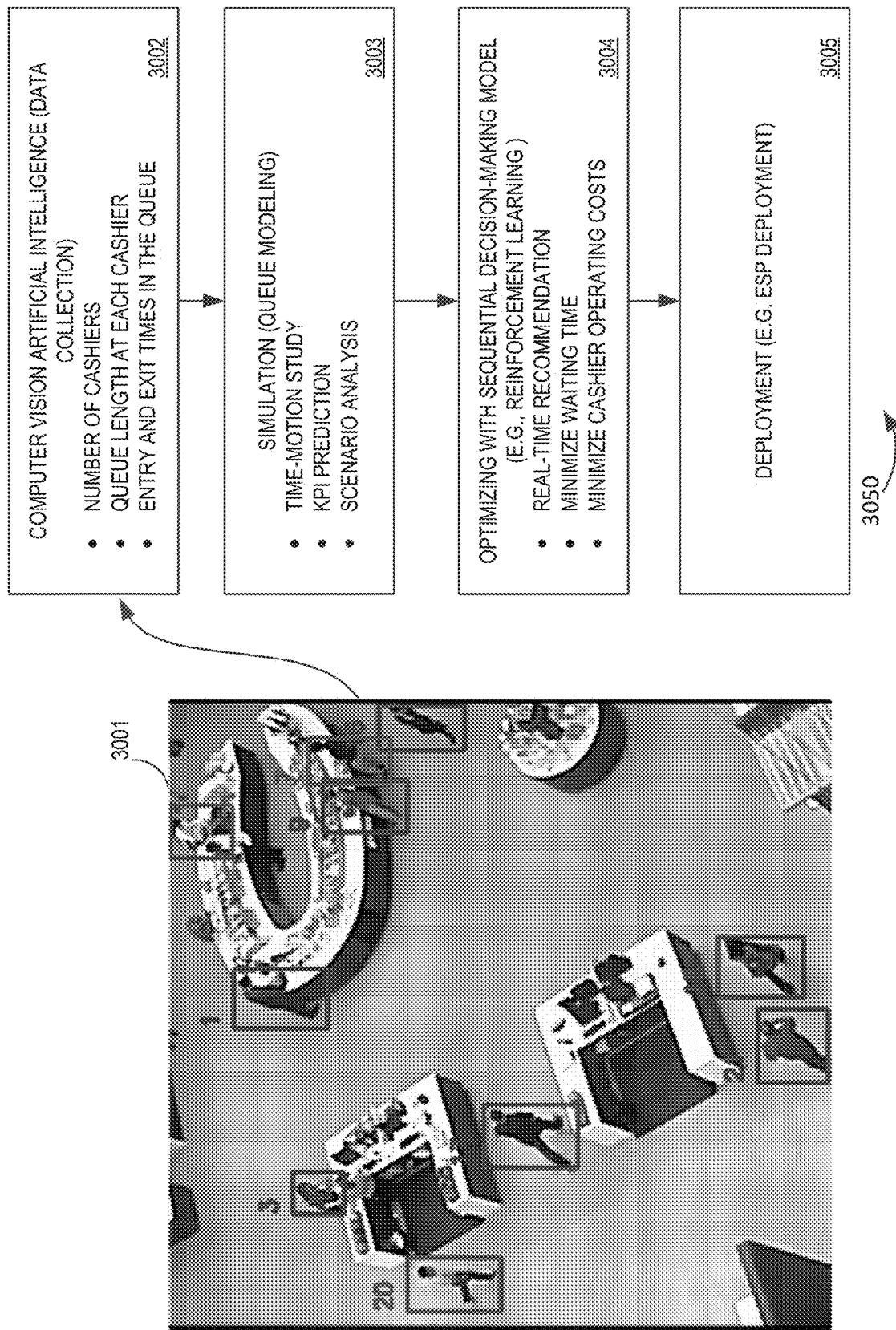
FIG. 30 illustrates an example flow diagram for executing a control system for controlling a queue in at least one embodiment of the present technology.

FIG. 30 illustrates an example flow diagram 3050 for executing a control system for controlling a queue (e.g., queue at a process point as shown in image 3001) in an experiment involving an operating cafeteria.

Traditionally, the data collection process for queue monitoring is manual (e.g., a person with a stopwatch monitors when a person enters a queue and when they exit the queue). In an operation 3002, SAS® Computer Vision Artificial Intelligence (AI) provided by SAS Institute Inc. of Cary N.C. was used to automate data collection. SAS® Computer Vision will keep track of the number of agents at every point in time, the queue length at each agent, and also the entry and exit times for every person in the queue in the experiment.

Techniques described herein for object detection can be used. For example, in the experiment a standard deep learning model was trained, specifically Tiny-Yolo-v2 described herein, to perform the object detection task of detecting persons in each frame of the video footage. Because of the extreme camera angles, bounding boxes were used around each person in a subset of 5000 video frames, to train the Tiny-Yolo-v2 model from scratch. The original architecture of Tiny-YOLO-v2 uses a combination of convolution and max-pooling layers to generate object detection feature maps of size 13-by-13 from an input image of size 416-by-416. In this experiment, the original architecture is modified to generate feature maps of size 26-by-26 which provided a finer grid for object detection. After training the object detection model, each frame was scored from holdout video data resulting in bounding boxes around each detected person.

Embodiments herein also comprises tracking an object through an obstruction in the image data (e.g., a counter in front of person 3 of image 3001) or between images captured by two different devices (e.g., as a person leaves one camera image and enters another). Traditional object detection models make predictions to detect people in each frame independent of previous and future frames. This prevents from tracking people across frames which is helpful for detecting the formation of queues. In this example, the results from an object detection model are passed into an object tracking model to track individual people across frames. In this case, a Simple Online Real-Time tracker described herein, which is a Kalman-filter based algorithm, is used to track objects across frames. Embodiments herein modify the original algorithm to include Kalman filter predictions from the tracker when missed by the object detection model. This way a computing system can keep track of people across frames even if the object detection model fails to detect them in a few frames. The object tracking model assigns a unique identifier for each tracked person (e.g., a number 1 through 21). Results from the object tracking model are used for analyzing the trajectory of each person to determine queueing near agent stations. Object detection and tracking results are shown on image 3001. Blue boxes indicate predictions using the object detection model and red boxes indicate predictions from the tracker missed by the object detection model in the experiment. Across multiple images captures over several days, most people were captured by the tracker and/or object detection model.

In an operation 3003, simulation is performed (e.g., a simulation of the cafeteria environment in image 3001).

The simulated environment can comprise a plurality of states. In this example, the simulated environment included a first state for when an object arrives in the group, a second state for when an object is in the group; and a third state for when an object leaves the group. A computing system can evaluate the simulated action in each one of the plurality of states. For instance, a queue region can be generated next to each agent location in image 3001 when a queue begins forming. Objects entering and exiting the queue can be tracked. A simulation is performed to simulate the physical environment (e.g., the cafeteria in image 3001) to predict a predicted entry or exit from the queue for each subsequent person entering the queue.

A time-motion study can be performed to collect data for the simulation and simulations used to predict key performance indicators (KPI). In this example, a discrete event simulation was used to predict and minimize key performance indicators related to waiting times at groups forming at agent locations using the data collected by computer vision artificial intelligence. The simulation can then be used to analyze scenarios in the collected data and in the simulation. For instance, multiple simulations were used to predict waiting time under scenarios (e.g., scenarios not seen in the data collection) and arrive at the best computer policy (e.g., an offline policy).

In an operation 3004, sequential decision-making models are trained on the results of a simulation model. In this example, the sequential decision-making models were used to make real-time recommendations on how many agents to have at every point in time to minimize waiting time for customer and agent operating costs. Reinforcement learning, which is a sequential decision-making model, is used in this example. Reinforcement learning recommendations are implemented in practice with the help of SAS® Event Stream Processing (ESP) provided by SAS Institute Inc. of Cary N.C. Simulated actions (e.g., sending an agent to one of the agent locations) can be evaluated based on the predicted entry or exit. For instance, there may be competing goals that need to be evaluated (e.g., minimizing an agent operating cost associated with supporting an agent but there is also a goal to minimize waiting time).

In an operation 3005, the computing system can deploy a trained computing agent according to the sequential decision-making models to make real-time recommendations for subsequent gathered data. For instance, simulations of the physical environment can be performed by transmitting to the computing agent information indicating a movement, of a given object, in the group, where the computing agent is trained according to the sequential decision-making algorithm for a simulator.

FIG. 31 illustrates an example of data collection of tracking objects in a group. An experiment in a physical environment could comprise simulating a plurality of stages of the experiment and tracking for a given stage one or more metrics for a given stage (e.g., one or more metrics related to a count of objects in the group, a size of the group, a waiting time for the object in the group).

In this case, counts were recorded at a stage of arrival in a queue for each five-minute increment that a cafeteria was open. Each color in graph 3150 shows different data collections for different days. The black dotted line 3160 shows an average number of people purchasing food for all the days and the average is shown numerically in dataset 3100. The average and the variation around the average is useful for simulation prediction beyond collected data. For instance, in one or more embodiments, simulated actions can be evaluated to predict a change in one or more metrics based on simulated actions.

Figure 32:
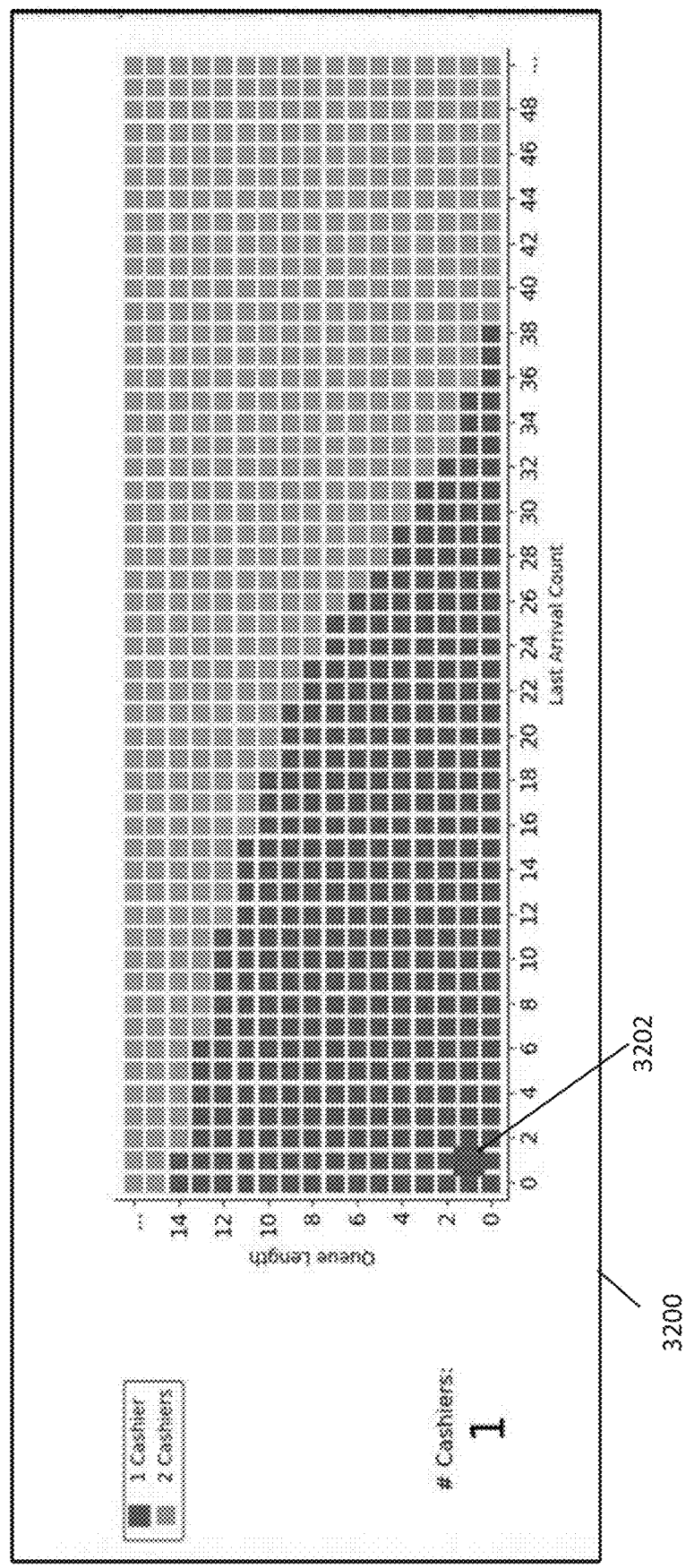
FIG. 32 illustrates an example indication to augment a physical environment in at least one embodiment of the present technology.

FIG. 32 illustrates an example indication to augment a physical environment based on simulated actions. In this example, the graph 3200 shows a recommendation action based on metrics for queue length and last arrival count at a stage. For instance, if currently the last arrival count is 1 and the queue length is only 1 only 1 agent is needed as shown as datapoint 3202. However, at data points in yellow, 2 agents would be recommended by a trained computing system. To minimize constant change at a boundary datapoint, a delay could be introduced for an alert such that an object needs to be in a new region (yellow or blue) for a certain period of time or be several datapoints a way from a previous region.

Claimed embodiments, advantageously provide an end-to-end pipeline from first, starting from real-time streaming footage from a camera, and applying computer vision algorithm to summarize the images into structured metrics such as time of entry and exit of each person into each queue; then second building and validating a simulated queuing model; and third creating a real-time recommendation model using reinforcement learning to decide the optimal number of agents.

Figure 33:
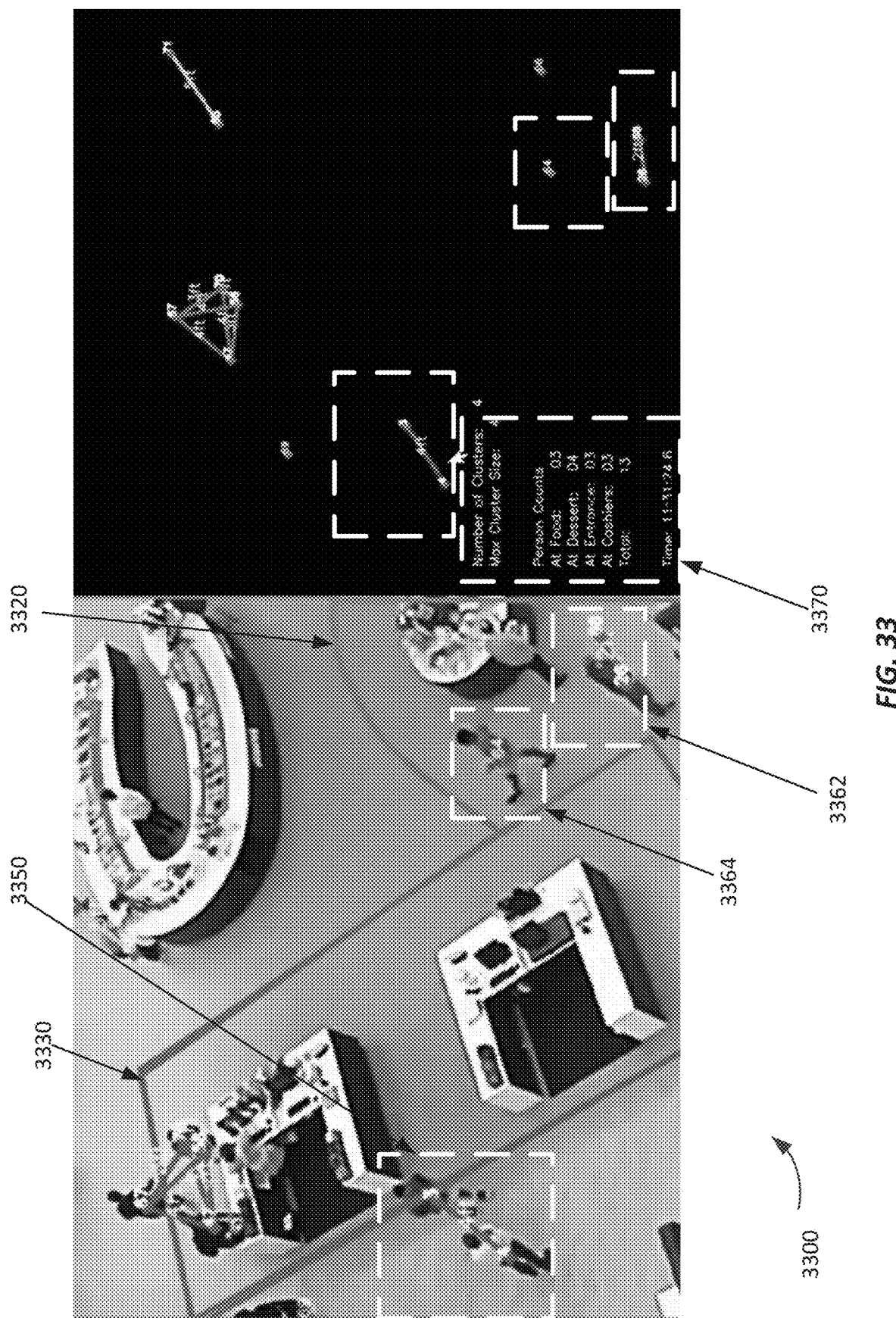
FIG. 33 illustrates an example of tracking objects in a group to maintain social distancing in at least one embodiment of the present technology.

Those of ordinary skill in the art will appreciate other applications. For instance, FIG. 33 illustrates an example of tracking objects in a group to maintain social distancing. Image 3300 is a split image with a left side representation of a cafeteria scene and a right-side representation of the same cafeteria scene, but with the privacy of the individuals protected.

In both representations, a distance between objects detected in a group is tracked and updated as it changes until the object leaves a group. For instance, there is a distance of 4 feet between objects in group 3350. In this case, the computing system refrains from tracking a respective distance when an object of the pair of objects leaves the group. For instance, object 3364 with identifier 64 leaves group 3362 so that the distance between objects is only tracked in the group remaining (e.g., 2 feet between the remaining objects). In this case objects are also no longer tracked when they exceed a certain distance (e.g., 6 feet for social distancing). Colors can also be used in a display to indicate whether an action should be taken. For instance, red could be used to indicate a distance of four feet or less and yellow is used to show between 5 feet and 6 feet. In response to a red indication an alert could be sent to the individuals in the group, but yellow no action will be taken. Other criteria could be required before sending an alert or detecting a group (e.g., a positive virus test case for one of the members of the group).

One of the challenges with video image distortion is getting an accurate measurement. One or more embodiments advantageously track trajectory information (e.g., position or velocity) accounting for this distortion. For instance, determining a trajectory indication could comprises determining a velocity of an object based on determining an initial position of the first object in the image data, a subsequent position of the first object in the image data; and a change in physical distance between the initial position and subsequent position accounting for a distortion of the physical distance in the image data. Techniques described herein could be used to account for the video distortion.

In one or more embodiments, objects can be tracked in a concealed form (e.g., to protect privacy in video image). For instance, embodiments herein can advantageously track an aspect of a movement, of a given object, in the group by tracking a concealed object. For instance, the computing system can determine a given set of pixels associated with the given object in the image data; generate an alternative visual identifier for the given object that provides a unique identifier for the given set of pixels absent in the image data (e.g., 64 for object 3354) and generate modified image data with pixel information associated with the given set of pixels that comprises the concealed object corresponding to the given object (e.g., the right representation) and track the aspect of the movement, of the given object, in the group by tracking, based on the alternative visual identifier, the concealed object in the modified image data.

As shown in the right side of image 3300 real-time statistics can also be maintained to even obscure the physical environment. In this example, large geographic regions are defined. For instance, in the example in FIG. 33 an agent region 3330 separates an entrance region from a food/dessert region, and a line 3320 divides the food region from the dessert region. In some embodiments, multiple camera feeds are used to capture multiple images at a same point in time. For instance, another camera captures an entrance region not fully shown in the image 3300. Statistics 3370 are displayed capturing metrics from all the camera feeds at a point in time. For instance, counts at the food region, dessert region, entrance region and agent region are displayed without having to show these areas. Cluster information can also be provided in the statistics 3370 to show information on groups (e.g., a max size).

Other visualizations can be provided to a user of the computing system tracking and making recommendations on augmenting the physical environment.

Figure 34:
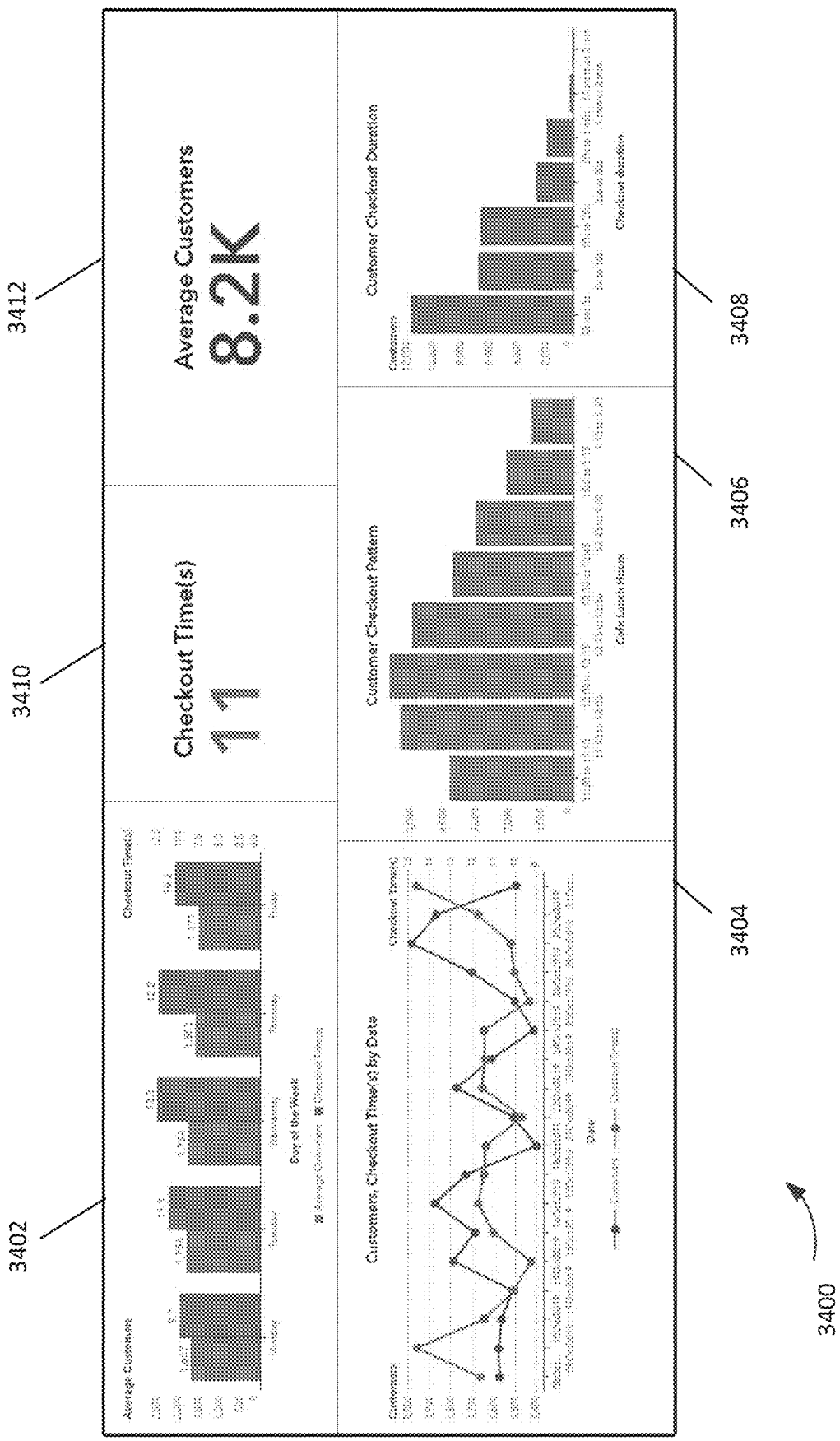
FIG. 34 illustrates an example dashboard in at least one embodiment of the present technology.

FIG. 34 illustrates an example dashboard 3400 for a user to see a video image pipeline (e.g., a video image or computer vision pipeline shown in FIG. 35) running in action for a real-time inferencing engine in Event Stream Processing.

Computer vision model coverts unstructured data such as videos to structured information such as the customer arrival pattern and checkout duration. All this information can be automatically be fed into a dashboard for analysis. In the example in FIG. 34, SAS® Visual Analytics, provided by SAS Institute Inc. provides a flexible and interactive tool to create dashboard 3400 using the structured data gather through computer vision models.

Bar Chart 3402 displays average customer arrival and check out times by day of the week. Time series plot 3404 indicates a number of customers and checkout time over the 16 days during which the data was collected in an experiment. The dashboard 3400 also displays customer checkout pattern graph 3406 and duration of checkout graph 3408 for data collected during the lunch time period. Holistic metrics can also be shown in the dashboard 3400. Metric 3410 shows the maximum check out time of 11 seconds and metric 3412 shows average customers for the cafeteria of 8,200.

Figure 35:
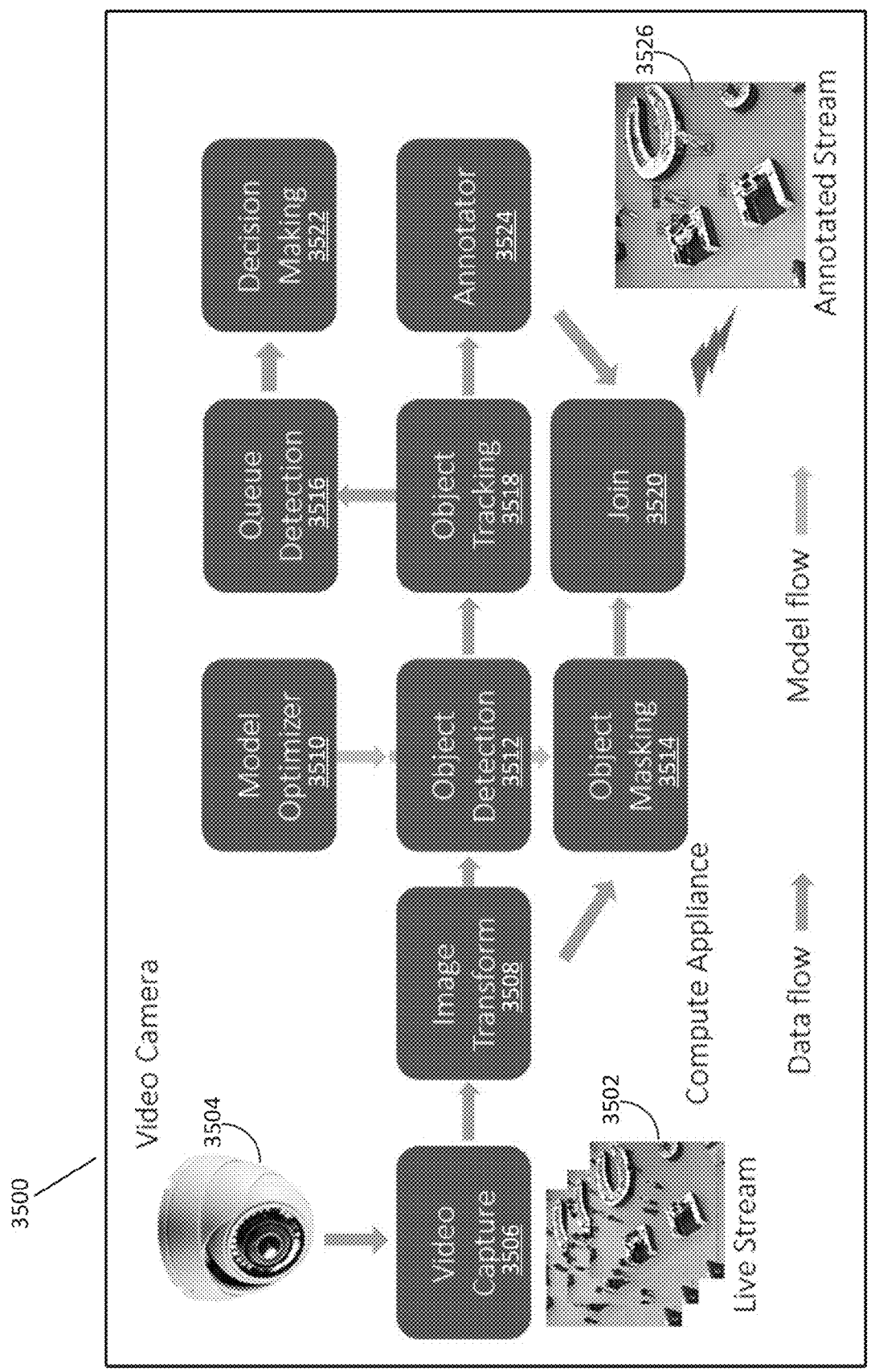
FIG. 35 illustrates an example block diagram for an edge video system in at least one embodiment of the present technology.

FIG. 35 illustrates an example block diagram for an edge video system 3500 in which object masking is also used to enhance customer privacy and identity protection through visual pixel masking, blurring, and/or concealing. In this embodiment, customer identity is masked in the proposed real-time streaming pipeline to perform decision making regarding a physical environment.

In one or more embodiments, the deployment of this inference pipeline is implemented in Event Streaming Processing (ESP). The deployed framework achieves real-time performance on a computer appliance which can be located on premise (e.g., in an edge device) or off premise with respect to the video camera system. The system can also be deployed in a smart camera device where the camera module and the computation module are housed together. The system can support different computer architectures such as a Linux® Operating System (OS) on ARM® and X86™ architectures.

In the example, the image frames 3502 from an example video camera 3504 are captured and streamed into the pipeline through Video Capture module 3506. Each video frame is transformed through a serial of operations, e.g. video transformation options described herein like cropping, in Image Transform module 3508. For instance, the transformation can ensure the dimension and color format of video frames are compatible with the subsequent models. The transformed images are sent to both Object Detection module 3512 and Object Masking module 3514. Object Detection module 3512 scores on each input image and produces the detected bounding boxes on objects in the image (e.g., bounding boxes described herein and shown, for instance, for people objects in FIG. 30). For instance, the Objection Detection module 3512 can be used to identify and to segment a human in each video frame. The human identification and segmentation can be achieved through scoring each video frame by a deep learning neural network model which classifies each pixel as human from the rest of the scene. The neural network model can be trained on the same training data set used for object detection model training.

Output from the Object Detection module 3512 can be fed into Object Tracking module 3518. The Object Tracking module 3518 can record key points (e.g., a center location of each human detection) and bounding box information. The center location and its temporal history from previous image frames drive a position tracking model to predict the center location of an object in the future frame. In case Object Detection module 3512 fails to detect the same person in the next frame, for instance due to occlusion, the predicted human position can be used instead. The combination of Object Detection module 3512 and Object Tracking module 3518 produces robust human detection and position tracking. The original video image, the detected or predicted human detection bounding boxes and the central positions in that image can be sent to the Annotator module 3524, which fuses the aforementioned input features into a single annotated image (e.g., image 3526) of common format.

Tracking results from the Object Tracking module 3518 are fed into Queue Detection module 3516. This module performs 2-stage single-linkage agglomerative cluster to detect individual groups from each video frame. In the example, of the cafeteria, a queue contains an ordered list of detected patron/human identifiers as well as the patron's position and velocity. Given predefined polygonal regions in the video frames, each queue is assigned to one polygonal region (e.g., region 2902 in FIG. 29). From each detected queue, Queue Detection module 3516 derives a head-of-queue location, queue length, waiting time, processing time, and/or arrival count. Decision Making module 3522 can consume output of Queue Detection module 3516. The model in Decision Making module 3522 (e.g., a reinforcement Learning agent) uses the information of the reduction and the growth of the queue, and/or the number of new arrivals to the queue, and scores the trained policy to, for instance, produce recommendations for activating/deactivating the agent in order to improve the queuing.

In some implementations, the output images from Annotator module 3524 still have the captured people in its original resolution and can be easily identified if viewed. If these images are consumed and stored without further alternation, they pose a customer privacy risk. To mitigate and protect captured object privacy, an Object Masking module 3514 can be used. In this example, the Object Masking module 3514 takes each image from Image Transformation module 3508 and classifies each pixel in an image to be either people or not people. With respect to every input image, the output of Object Masking module 3514 is an image of the same dimension as the input image. Each pixel in the output image is labelled. By combining the output image of Object Masking module 3514 and the output image of Annotator module 3524, Join module 3520 produces a fused image such that the color of all the detected people pixels is altered (e.g., to a uniform color). This in turn masks the identity of objects in the scene. The masked images not only highlight the detected people with unique identifiers, render the people movement trajectory, but also mask every detected person so that their identities cannot be revealed. For instance, output of segmentation and object detection can be fused together so that only the pixels representing customers in a scene are replaced so that customer identity cannot be revealed in the fused video frames.

In one or more embodiments, a trained Object Detection model and Object Masking model is further optimized with respect to the deployed computer appliance hardware in order to achieve faster inference speed. The model optimization can be performed in Model Optimizer module 3510. For example, given deep learning neural network models, Model Optimizer module 3510 can reduce the number of parameters whose values are close to zero and can quantize the parameter values with lower precision floating point data type or even integer data type with minimum model accuracy degradation while achieving much faster inference speed and much smaller memory consumption requirement. The optimized models are sent to Object Detection module 3512 and Object Masking module 3514. When there are better models available, the described pipeline can redeploy the new models without pipeline downtime.

The edge video system 3500 could comprise one or more modules or comprise less modules. For instance, object masking module 3514 and Object Tracking module 3518 could be combined to track objects that are already masked. One or more modules are deployed on a computer appliance which can be either hosted anywhere such as in a data center, on-premises server room, or a rugged case located right next to the camera. Multiple camera streams can be processed by one or more such pipelines given the appliance's compute capacity.

Given the prevalent presence of video cameras in the public space, customer privacy protection is of high priority. One or more embodiments provide for object concealment while tracking of objects.

Figure 36:
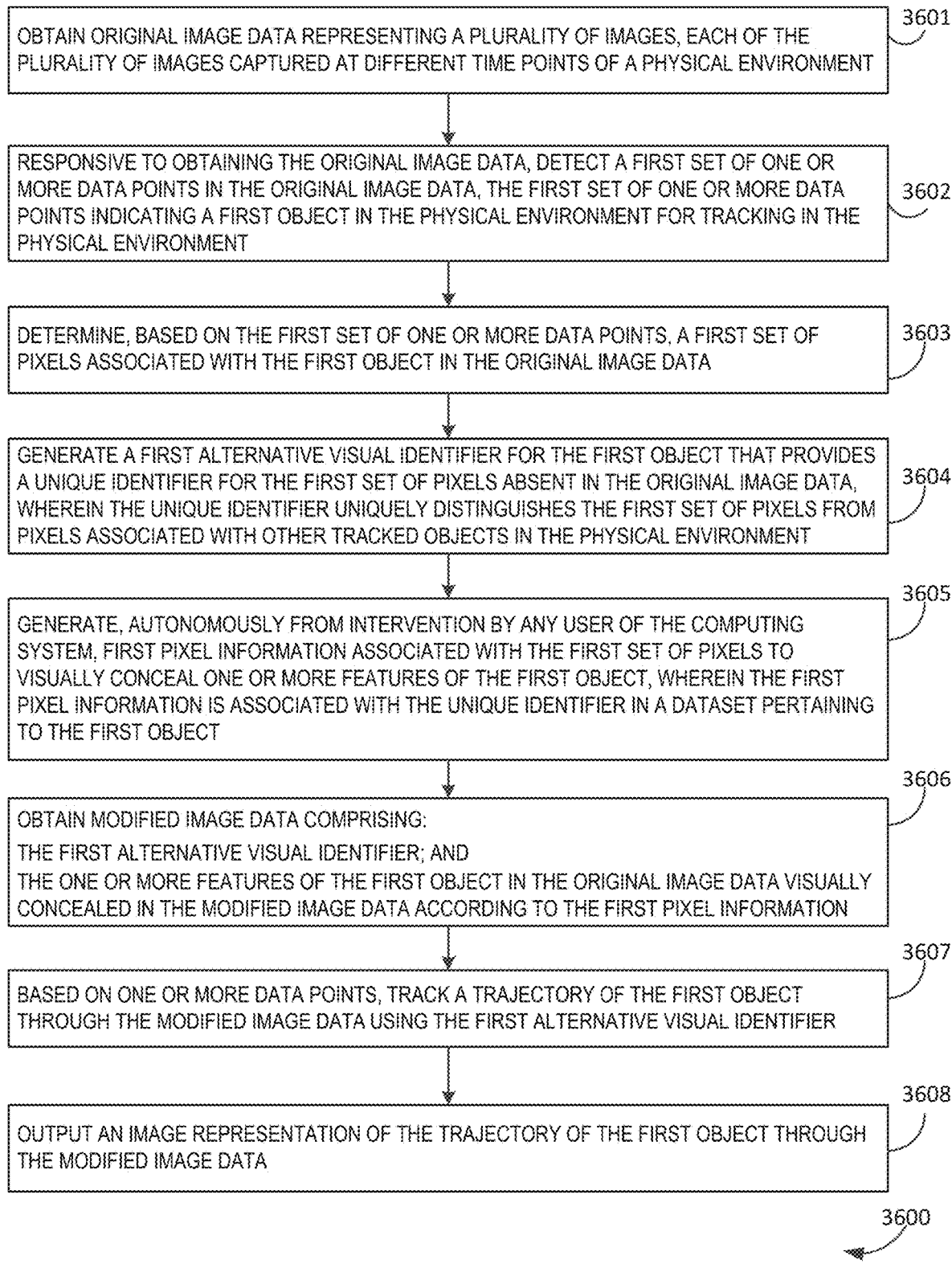
FIG. 36 illustrates an example flow diagram for visually concealing tracked objects in at least one embodiment of the present technology.

FIG. 36 illustrates an example flow diagram of a method 3600 for visually concealing tracked objects. Each operation can be performed autonomously by one or more computing devices (e.g., devices in control system 2500 of FIG. 25).

In an operation 3601, the method 3600 comprises obtaining original image data representing a plurality of images. Each of the plurality of images is captured at different time points of a physical environment. For instance, image data 2530 in FIG. 25.

In an operation 3602, the method 3600 comprises responsive to obtaining the original image data, detecting a first set of one or more data points in the original image data. The first set of one or more data points indicates a first object in the physical environment for tracking in the physical environment. Embodiments here describe a variety of ways to identify points including center points or edge points of an object, and can detect even obscured data points of an object.

In an operation 3603, the method 3600 comprises determining, based on the first set of one or more data points, a first set of pixels associated with the first object in the original image data. As explained with respect to FIG. 35, one or more embodiments can distinguish pixels of an object from their surroundings.

Figure 37:
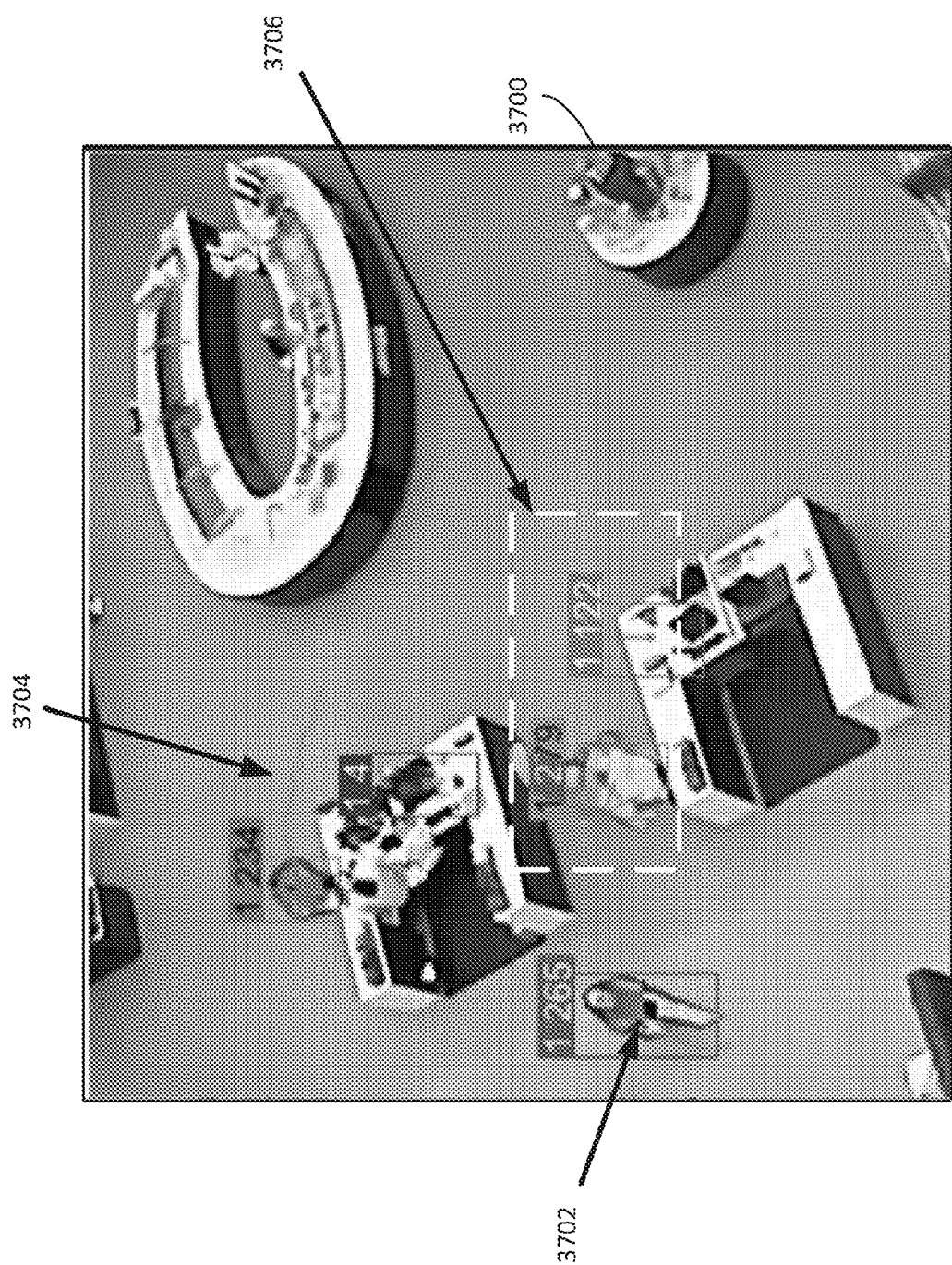
FIG. 37 illustrates an example of pixel concealing in at least one embodiment of the present technology.

In an operation 3604, the method 3600 comprises generating a first alternative visual identifier for the first object that provides a unique identifier for the first set of pixels absent in the original image data. The unique identifier uniquely distinguishes the first set of pixels from pixels associated with other tracked objects in the physical environment. For instance, FIG. 37 illustrates an example of pixel concealing in image 3700. As shown in FIG. 37 different number identifiers can be assigned to each of the objects in an image 3700 modified from an original video image.

In an operation 3605, the method 3600 comprises generating, autonomously from intervention by any user of the computing system, first pixel information associated with the first set of pixels to visually conceal one or more features of the first object. The first pixel information is associated with the unique identifier in a dataset pertaining to the first object. For instance, the method conceals the first object in the modified image data by augmenting information pertaining to the first set of pixels such that a given aspect of individual pixels of the first set of pixels in the original image data is a same aspect, or is an aspect generated according to a same function, for each of the individual pixels in the modified image data.

As shown in FIG. 37, the pixels associated with people have been turned a negative image to hide their identity according to a negative image function that inverts the light representation of the first set of pixels. Other functions could have been used (e.g., one that would scramble the pixel representations or cause the pixel representations to flash). In this case, pixels representing the objects clothing was also associated with the people and changed color according to the negative image function as well. In other embodiments, pixels not directly associated with the object can be distinguished (e.g., only concealing a human or a human body part). FIGS. 38A-C illustrate an example of pixel concealing and data point detection. For instance, as shown in FIG. 38A, modeling by SAS Institute Inc. was used to identify key points of a human (e.g., eyes or limb joints are denoted with a dot connected by different colored line segments in image 3800). This data point detection can be used in embodiments, as shown in FIG. 38B, to distinguish clothing from humans or to simply blur out or change to a same pixel color an aspect of a human such as their face in a modified video image 3830.

In an operation 3606, the method 3600 comprises obtaining modified image data (e.g., image 3700) comprising: the first alternative visual identifier; and the one or more features of the first object in the original image data visually concealed in the modified image data according to the first pixel information.

In an operation 3607, the method 3600 comprises, based on the first set of one or more data points, tracking a trajectory of the first object through the modified image data using the first alternative visual identifier. For instance, this could be tracking based on a single point of a set of multiple points or a point predicted from the set (e.g., if the point is obscured).

In an operation 3608, the method 3600 comprises outputting an image representation of the trajectory of the first object through the modified image data. This could go to storage or be provided to the user of the computing system for accessing recommendations or forming their own recommendations regarding a physical environment for the objects. Several image representations could also be aggregated to show the trajectory (e.g., using heat map aggregation).

FIG. 37 illustrates an example of pixel concealing in image 3700. In this example, the image 3700 is an image representation of the trajectory of an object with identifier 1234. The first object is represented as moving by the green trajectory line 3704 in a concealed form (i.e. in the negative image format) with the first alternative visual identifier (identifier 1234) based on the augmented set of pixels.

In this example, the center point of object with identifier 1234 is tracked and the trajectory shows a pathway of the center point through the modified image data using the first alternative visual identifier. However, other points could be selected (e.g., the corners of a rectangular bounding box around the object with identifier 1234.

As shown in image 3700 multiple objects can be tracked (e.g., object 3702 with identifier 1265). In this case, a computing system can detect a second set of one or more data points in the original image data where the second set of one or more data points indicates a second object in the physical environment. The computing system can determine, based on the second set of one or more data points, a second set of pixels associated with the second object in the original image data, where the second set of pixels and the first set of pixels comprise different pixels. The computing system can generate a second alternative visual identifier for the second object (e.g., identifier 1265 is different from identifier 1234). The computing system can generate second pixel information associated with the second set of pixels to visually conceal one or more features of the second object. The computing system can obtain modified image data with the first alternative visual identifier and the second alternative visual identifier with one or more features of the first object and the second object visually concealed in the modified image data. In this case, both objects are shown in a negative image format.

In one or more embodiments, a group can be detected according to techniques described herein. For instance, the group can be detected by detecting a distance between the first object and the second object that is below a threshold and determining a trajectory indication of the first object compared to the second object. As an example, a group 3706 is detected forming at the process point between objects with identifiers 1279 and 1122). The objects are close together and their trajectories do not indicate they are moving apart. In this case, the object and its group are still detected and maintained based on tracking even though the person has moved down as indicated by its trajectory angle below the counter. In this case, the group is indicated visually by having a similar color (pink) for the objects in the group. With the group tracking, statistics can also be displayed regarding the group (e.g., using techniques described with respect to FIG. 33) and/or a computing agent can be used to make decisions regarding the physical environment. For instance, the computing agent can output a recommendation for the physical environment (e.g., a computing agent trained according to the sequential decision-making algorithm).

FIGS. 38A-C illustrate another example of pixel concealing and data point detection. In this example, datapoints of people are detected by SAS Institute Inc. in image 3800 in order to track the body parts of the object through different store cameras. Embodiments herein can be used to conceal the faces of captured video data. In the example shown in FIG. 38B, the pixels of the face are changed to a same color and luminosity as well as a similar oval shape in modified image 3830. In FIG. 38C, a dataset 3860 is shown with pixel and/or object information associated with one or more alternative visual identifiers for the objects. In this case a unique identifier column 3861 provides a numerical number for each object. Emotion information column 3862 retains an emotion of the object detected in the object pixels since this emotion is obscured in the modified video image 3830. Other demographic information can also be stored or estimated regarding the object (e.g., an age column 3863 and a gender column 3864).

The computing system can generate the alternative visual identifier 3832 by assigning, to the first alternative visual identifier, one or more predefined possible criteria for evaluating the first object (e.g., demographic information, emotion, ethnicity, age, and/or gender). In this case, there were only two tracked objects, so demographic information can be used or assigned to form an alternative visual identifier 3832 to uniquely distinguish the objects and is displayed with the object in image 3830. Additionally, or alternatively, a numerical identifier from unique identifier column 3861 could also be used or assigned to the criteria. Additionally, or alternatively, the unique identifier, or information associated with the unique identifier, is derived from an estimation of the first object's interaction in the physical environment (e.g., an objects emotion to a physical environment or when the object arrives in the physical environment). Additional information pertaining to the object or other tracked objects can also be displayed. For instance, in this retail physical environment the object with identifier 3832B is trying on a shirt tracked in the store and a description of the tracked shirt (long_sleeve_top) is shown with an estimation of the fit (92.6%) in identifier 3834.

Pixel information could be stored (e.g., pixel color column 3865 is used to store a pixel color for obscuring the object face). In some embodiments, a computing system conceals an object by deleting the original pixel information; and replacing the original pixel information with masked pixel information. The trajectory of a tracked object can be tracked using the first alternative visual identifier and the masked pixel information. This is a secure method to track an object. However, the original pixel information need not be deleted, and the object can be tracked to simply output an image representation displaying a representation of the alternative visual identifier and the masked pixel information to a user of the computing system for real-time viewing that preserves privacy of tracked objects. For instance, in tracking packages it may be useful to retain the address information visible on the image screen but for real-time decision making that may not be relevant information to show to a user concerned with how the packages are moving or grouping.

Figure 39:
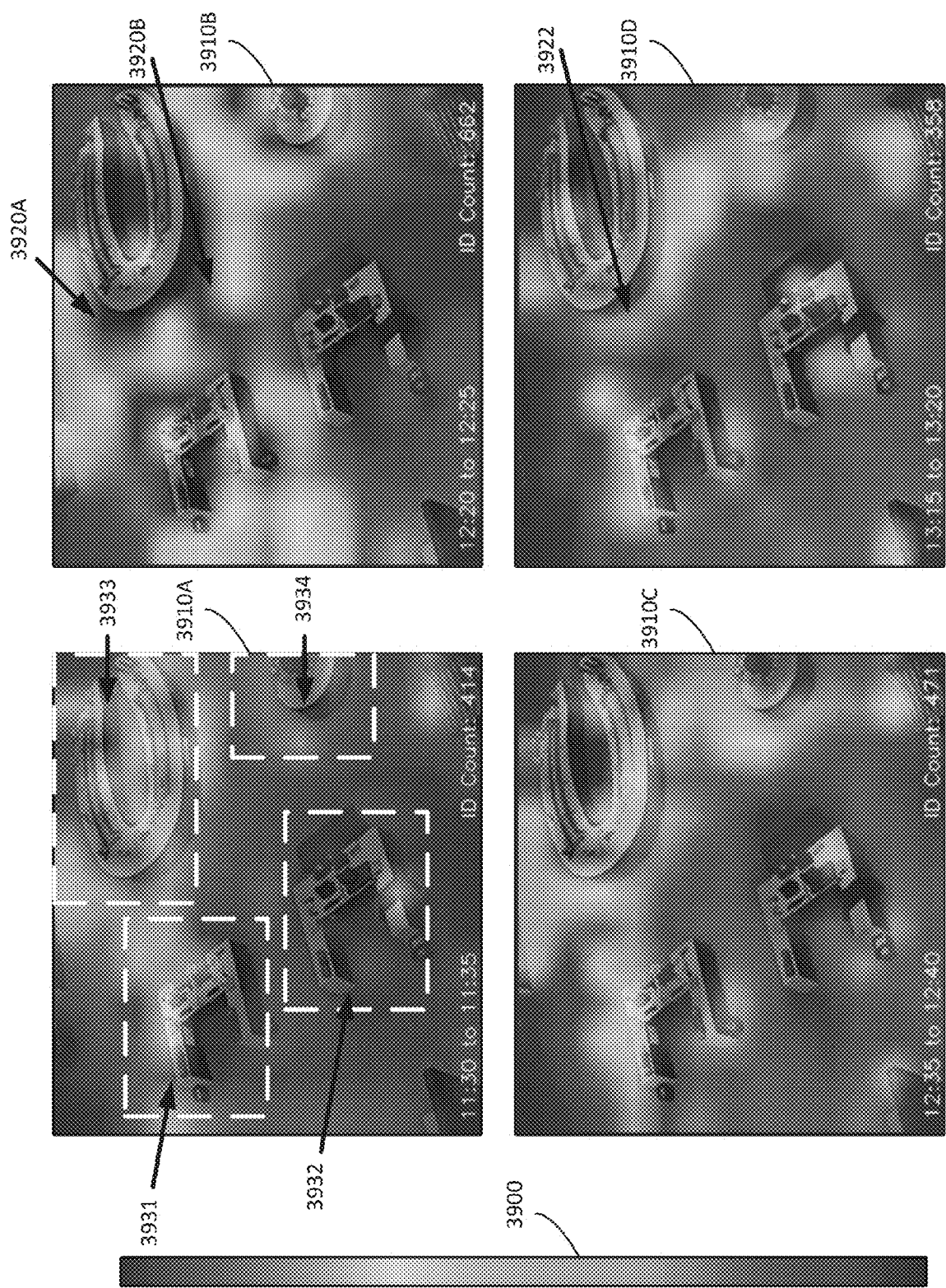
FIG. 39 illustrates an example of pixel concealing with heat map indexes in at least one embodiment of the present technology.

FIG. 39 illustrates an example of pixel concealing with heat map indexes. Index 3900 shows a spectrum of colors for heat of objects tracked ranging from high heat (red) to low heat or ambient air (blue). In one or more embodiments, an object can be concealed by augmenting pixels associated with an object such that a given aspect of individual pixels of the set of pixels in the original image data is represented by an index according to a heat map. A person standing in one place for a long time or with other objects may be represented with a red index as opposed to more transient objects that may be represented with a yellow or green indexes.

Images 3910 shows objects captured at different times points concealed with a heat map index. An identifier count displayed on the images 3910 shows the number of objects tracked in the image 3910 at the captured time point. For instance, the cafeteria experienced a low in activity for an image 3910D captured at a time point from 13:15 to 13:20 with only 358 patrons and a high in activity with an identifier Count of 662 at 3910B captured at a time point from 12:20 to 12:25. In this example, the output image represents an aggregating or averaging, for a given pixel location, indexes according to a heat map for multiple time points of the different time points (e.g., multiple images 3910). In this way patterns in concealed object movement may become more visible. For instance, as shown in image 3910A different geographic regions are defined for the physical environment including a primary agent area 3931, a secondary agent area 3932, an entrée area 3933 and a dessert area 3934. As shown in image 3910B, lines 3920 in image 3910B curve toward entrée area 3933. However, in image 3910D, line 3922 curves in one line long away from the entrée area 3933 toward dessert area 3934. Aggregated person tracking data over a given time-interval and heatmap visualizations can be used to assist with qualitative visual analysis of the data.

In one or more embodiments, the heatmaps can be provided relative to geofences defining areas of interest to quantify and visualize the relative differences in amount of time spent at those. Higher traffic areas can be quickly identified (e.g., over a given 5 minute-interval). Colors closer to blue represent low traffic and colors closer to red represent high traffic. For instance, the lines shown in the images relative to the geofence areas (e.g., entrée area 3933) may indicate more people eat desserts in the late afternoon and it would be more efficient or better organize the patrons to have the secondary agent area 3932 open rather than the primary agent area 3931.

Further, geofence polygonal area can be generated in the modified image data and objects are concealed in the modified image data by augmenting the first set of pixels such that a given aspect of individual pixels of the set of pixels in the original image data is represented by an index according to a heat map when the first object is in the geofence polygonal area for study. For example, the area of study could be an area comprising candy for determining interest in different candy products in the area.

Figure 40:
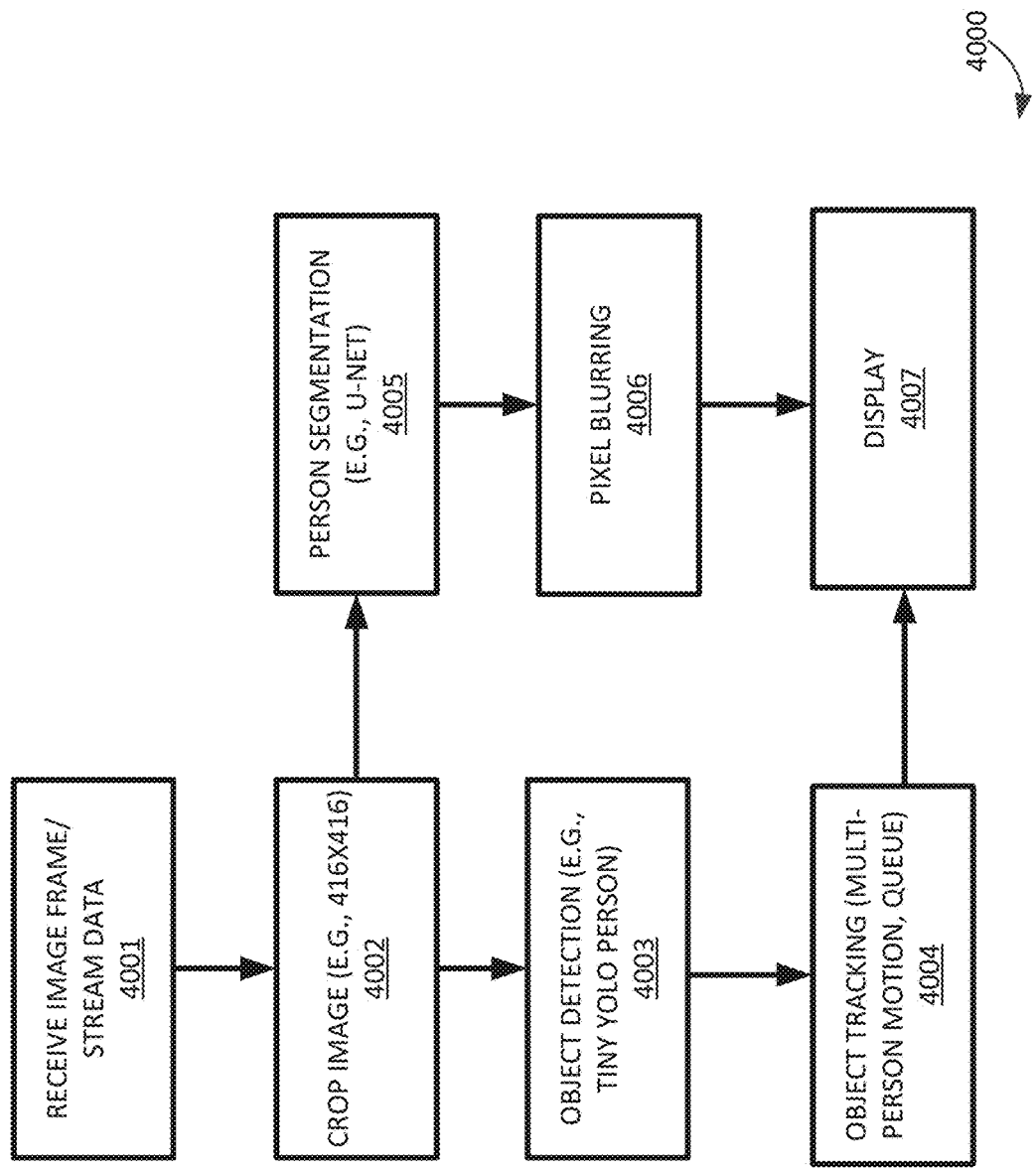
FIG. 40 illustrates an example of object tracking for person detection in at least one embodiment of the present technology.

FIG. 40 illustrates an example block diagram 4000 for person detection, tracking and segmentation. The example block diagram 4000 can be used as part of the computer vision pipeline shown in FIG. 35 or implemented by control system 2500 to protect the privacy of people in the video so that the identities of individuals cannot be determined during visualization. An image frame or stream of data is received in image module 4001. The raw images can be manipulated for processing. For instance, the raw images can be cropped in a crop image module 4002 (e.g., using techniques described herein). In a classical time-motion study of queueing, the data gathering process can be highly time-consuming and laborious as a researcher is tasked with manually watching people as they move through queues and recording the entry and exit times into those queues. In one or more embodiments, a computer vision pipeline is used to automate this data gathering process by extracting information from unstructured video data. Starting with the footage of a video camera, a computer vision model detects and tracks people using object detection module 4003 and object tracking models module 4004, while also detecting other information about the object's interaction with their physical environment (e.g., the formation of a queues near the agent stations and recording the entry and exit times of each person going through each queue of interest). It can also be used to track an object through multiple images. For instance, the object detection module 4003 can be used to determine a bounding box and associate the bounding box with the first object and its alternative visual identifier. A you only look once (YOLO) detection algorithm can then be used to identify the bounding box in a second image of the plurality of images and output an image representation of the trajectory of the rectangular bounding box between images.

The computer vision pipeline can also perform person segmentation to blur the pixels corresponding to each person for privacy protection. The cropped images can be fed to a segmentation module 4005 (e.g., to detect data points of objects according to a deep learning model providing semantic segmentation, instance segmentation, or both). For instance, a segmentation model may be used to find instances of people.

Output from the segmentation module is fed to a pixel blurring module 4006 to conceal (e.g., blur) pixels corresponding to each person. Individual frames from the same videos can be used to train the segmentation model in segmentation module 4005, annotated using polygons to separate pixels belonging to human from those of background. Due to the special nature that the training samples are extremely unbalanced, the percentage of human pixels is less than 5%, any lightweight segmentation model may predict all pixels as background and no person can be detected. As a remedy, a heavy yet more precise model—U-Net is a good backbone choice for the segmentation model. In this example, the segmentation model contains 44 layers with more than 23 million parameters. U-Net showed greater performance in processing unbalanced classes data than other segmentation neural network models. The segmentation model is then trained using 22 labeled images for 25 epochs and tested using testing images. The misclassification rate on new images is only 2.2%, with more than 80% of human pixels correctly detected. U-Net is also more efficient in terms of transfer learning adapting to new vision scenario.

A display module 4007 can be used to display images (e.g., with object tracking or object concealment described herein). One or more components of block diagram 4000 may be comprised in one or more edge devices in a physical environment as described herein. The one or more edge devices may conduct queries on the original image data as part of an event stream process to output the image representation. The display module 4007 could directly show to a user in the physical environment the image representation.

In one or more embodiments, a computing system could additionally or alternatively display recommendations regarding the physical environment (e.g., from a trained computing agent).

Figure 41:
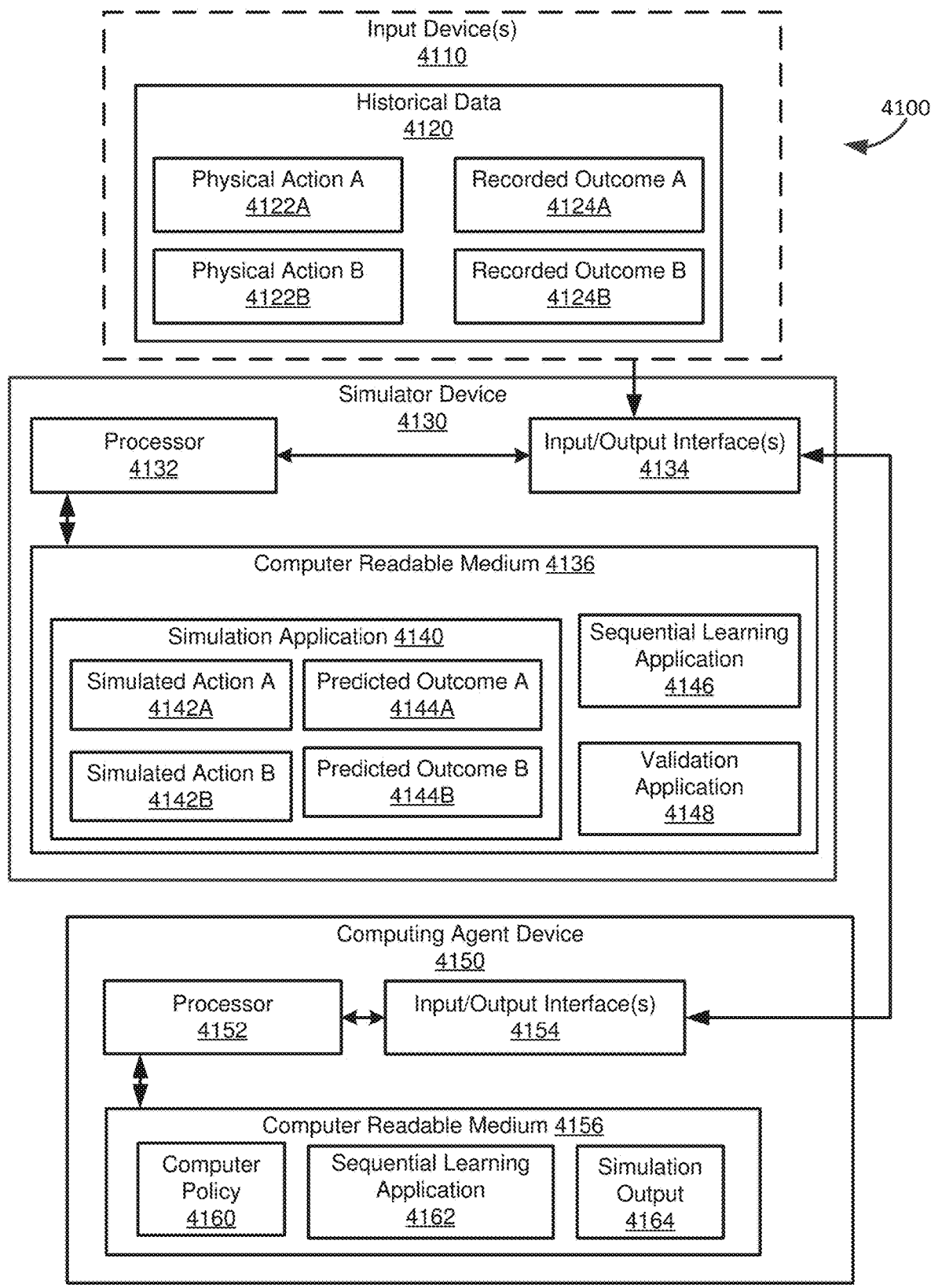
FIG. 41 illustrates an example block diagram of a system for training a computing agent in at least one embodiment of the present technology.

FIG. 41 illustrates an example block diagram of a training system 4100 for training a computing agent. The training system 4100 comprises an input device 4110, a simulator device 4130 and a computing agent device 4150. The training system 4100 could be a part of control system 2500 of FIG. 25. For instance, the input device 4110 could be input device 2504, and the simulator device 4130 and computing agent could be comprised in one or more computing devices 2502 or output devices 2570. In one or more embodiments, one or more components of the training system 4100 is comprised in one or more edge devices in the physical environment 2540. The computing agent device 4150 and simulator device 4130 are shown as separate devices as an example but could be comprised on the same device (e.g., with a same processor, and/or computer readable medium).

In one or more embodiments, an input device 4110 is used to receive historical data 4120. For instance, the historical data 4120 comprises one or more physical actions 4122 taken in an experiment in a physical environment (e.g., physical environment 2540). For instance, the action could be to send or refrain from sending an agent to a process point for an experiment on reducing wait times at a process point location. Alternatively, or additionally, the historical data 4120 comprises a recorded outcome. There could be one or more recorded outcomes for each physical action taken in the experiment. For instance, a wait time in response to sending an agent to a process point. The experiment could have different user-defined stages (e.g., arriving at the process point, waiting at the process point, and leaving the process point). The outcome could be according to one or more user-defined performance indicators related to the plurality of user-defined stages. For instance, a recorded count may be relevant at an arriving stage, an exit time could be relevant for leaving the process point and a waiting time or payment processing time could be relevant to waiting at the process point.

In one or more embodiments, the simulator device 4130 comprises an input and/or output interface(s) 4134 for receiving information from an input device 4110 (e.g., for the simulation). For example, the simulator device 4130 may receive processing stages for a simulated environment. Alternatively, or additionally, the simulator may receive historical data 4120 for validating a simulation.

In one or more embodiments, the input and/or output interface(s) 4134 is for receiving and/or sending to a computing agent device 4150 (e.g., for training the computing agent device 4150).

In one or more embodiments, the input and/or output interface 4134 comprise multiple different input and/or output interfaces, comprises an input and/or output interface described herein, and/or comprise one or features of an input and/or output interface described herein (e.g., input interface 2505 and/or output interface 2506). In one or more embodiments, the simulator device 4130 comprises a processor 4132 for executing instructions in a computer readable medium 4136. In one or more embodiments, the processor 4132 comprises a processor described herein and/or comprises one or more features of a processor described herein (e.g., processor 2508 of FIG. 25). In one or more embodiments, the computer readable medium 4136 comprises a computer readable medium described herein and/or comprise one or more features of a computer readable medium described herein (e.g., computer readable medium 2510 of FIG. 25).

For instance, the computer readable medium 4136 comprises a simulation application 4140 for generating a computing representation of a simulated environment of the physical environment. The simulator can be used to simulate scenarios in lieu of or in addition to conducting experiments in a physical environment. The simulator may be a discrete event simulator, and the simulated environment may comprise one or more processing stages (e.g., correlating with the user-defined stages). Additionally, the simulation application can obtain simulation data. The simulation data may comprise multiple simulated actions 4142 taken by the simulator device 4130 in the simulated environment of the physical environment. Additionally, or alternatively, the simulation data comprises a predicted outcome 4144 for simulated actions taken by the simulator device 4130. A predicted outcome may be according to one or more user-defined performance indicators related to the plurality of processing stages.

In one or more embodiments, the computer readable medium 4136 comprises a validation application 4148 for validating an accuracy of the discrete event simulator at predicting the recorded outcome in the experiment. This could include for instance, validating based on the historical data (e.g., how similar was output of one or more scenarios to recorded outcomes 4142 of the historical data 4120). However, as the simulator can perform much more scenarios than can be feasibly recorded, the validation could comprise other tactics to ensure that the simulator is correlating with likely results if the experiment were conducted in a physical environment.

In one or more embodiments, the computer readable medium 4136 comprises a sequential learning application 4146 for training a computing agent according to a sequential decision-making algorithm (e.g., a reinforcement learning algorithm).

In one or more embodiments, the computing agent device 4150 comprises an input and/or output interface(s) 4154 for receiving and/or sending to a simulator device 4130 (e.g., for receiving training).

In one or more embodiments, the input and/or output interface 4154 comprise multiple different input and/or output interfaces, comprises an input and/or output interface described herein, and/or comprise one or features of an input and/or output interface described herein (e.g., input interface 2505 and/or output interface 2506 of FIG. 25).

In one or more embodiments, the computing agent device 4150 comprises a processor 4152 for executing instructions in a computer readable medium 4156. In one or more embodiments, the processor 4152 comprises a processor described herein and/or comprises one or more features of a processor described herein (e.g., processor 2508 of FIG. 25). In one or more embodiments, the computer readable medium 4156 comprises a computer readable medium described herein and/or comprise one or more features of a computer readable medium described herein (e.g., computer readable medium 2510 of FIG. 25).

For instance, the computer readable medium 4156 comprises a sequential learning application 4162 for receiving training from a sequential learning application 4146 of a simulator device according to a sequential decision-making algorithm (e.g., receiving a computer policy 4160 indicating instruction for the computing agent device 4150 to take an action according to the sequential decision-making algorithm or simulation output 4164). For instance, the computing agent device 4150 can send to the simulator device 4130 a computer instruction, according to the computer policy 4160 for a simulated action. In response, the computing agent device 4150 can receive simulation output 4164 (e.g., a new state in the simulated environment and a reward indication for the simulated action). Using this simulation output 4164, the computing agent device 4150 can learn (e.g., learn to make recommendations for a physical environment as described herein).

Sequential decision-making algorithms are a field of artificial intelligence that takes the dynamics of an environment into consideration when solving a problem. It is considered also a step-by-step decision theory because each step produces a result or new state that must be considered before making a next decision. Many types of sequential decision-making algorithms exist including multi-armed bandit algorithm, contextual bandit algorithm, dynamic programming, and reinforcement learning algorithm. Reinforcement learning is a field of study in which an agent interacts with an environment and the goal is to optimize an objective in a sequential decision-making problem. Through interacting with the environment in many episodes, the reinforcement learning agent learns a policy (e.g., a mapping of the state to action). In other words, for any given state, it returns the appropriate action to optimize the objective.

Reinforcement Learning algorithms are generally categorized into two main sets. The first one is online algorithms, where the learning agents interact with a physical environment and improve its policy on the fly based on the feedback from the physical environment. The second class of algorithms is called Batch-reinforcement learning algorithms, where there is no interaction between reinforcement learning agent and the physical environment (e.g., the reinforcement learning agent is remote from the physical environment and there is no online connection to reach the physical environment). In Batch-reinforcement learning algorithms, during the training, the learner has access to a set of transitions from the environment and only utilizes the information it has to come up with a policy to deploy it during the inference. Since the data set is limited, it is unlikely the global optimal policy will come out of any given data set. In other words, the policy achieved in this process depends highly on the quality of the data set and therefore the exploration is not the task of a learning agent. However, batch-reinforcement learning algorithms are proved to be more stable than online reinforcement learning especially in the case of function approximation. Moreover, batch-reinforcement learning algorithms do not need to be connected to an environment during the training, and they only input any given dataset from any arbitrary policy already run. Therefore, the training becomes faster. On the other hand, since there is not any physical environment, it cannot evaluate the trained policy, and one needs an off-policy policy evaluation method. Although, the off-policy policy evaluation methods are not powerful enough to be used in the real-world.

In some situations, the only available information is unstructured data, i.e., the video of the surveillance cameras, and there is not a physical environment to train the reinforcement learning agent. In this situation, one could consider two cases to train the reinforcement learning agent: (i) building a simulation of the environment based on the historical data, (ii) using any of the batch-reinforcement learning algorithms in which they only need historical data from interaction of another agent with the environment. The first approach is possible; although, having an accurate environment needs brute-force methods like Monte-Carlo simulation which results in a slow environment. Training a reinforcement learning policy with a slow environment is difficult. Following the second approach is feasible too although difficult where there is limited historical data and obtaining enough historical data is time consuming. For instance, it might take months to gather historical data if each episode of experiment data is, for instance, one day, because any reinforcement learning algorithm needs thousands of episodes for an accurate training. So, one cannot run a batch-reinforcement learning algorithm directly and successfully solely on the data.

One or more embodiments provide an alternative approach to traditional sequential decision-making algorithms like reinforcement learning algorithms by using the limited historical data and building an accurate simulation model to generate data. For instance, obtained historical data and a batch-reinforcement learning algorithm can both be used by simulation application 4140. An obtained simulation is used to address the issue of policy-evaluation in the batch-reinforcement learning algorithms for directly monitoring the training performance of the Batch-reinforcement learning algorithm. To build the simulation in one or more example embodiments, a SAS® Simulation Studio provided by SAS Institute Inc. of Cary N.C. is used. SAS® Simulation Studio is a general-purpose discrete event simulator (i.e., it can be used for any system with non-continuous processes). It uses a brute-force method to obtain the accurate real-world problem of physical environments like production lines, grocery stores, banks, traffic problems, and harbors.

Figure 42:
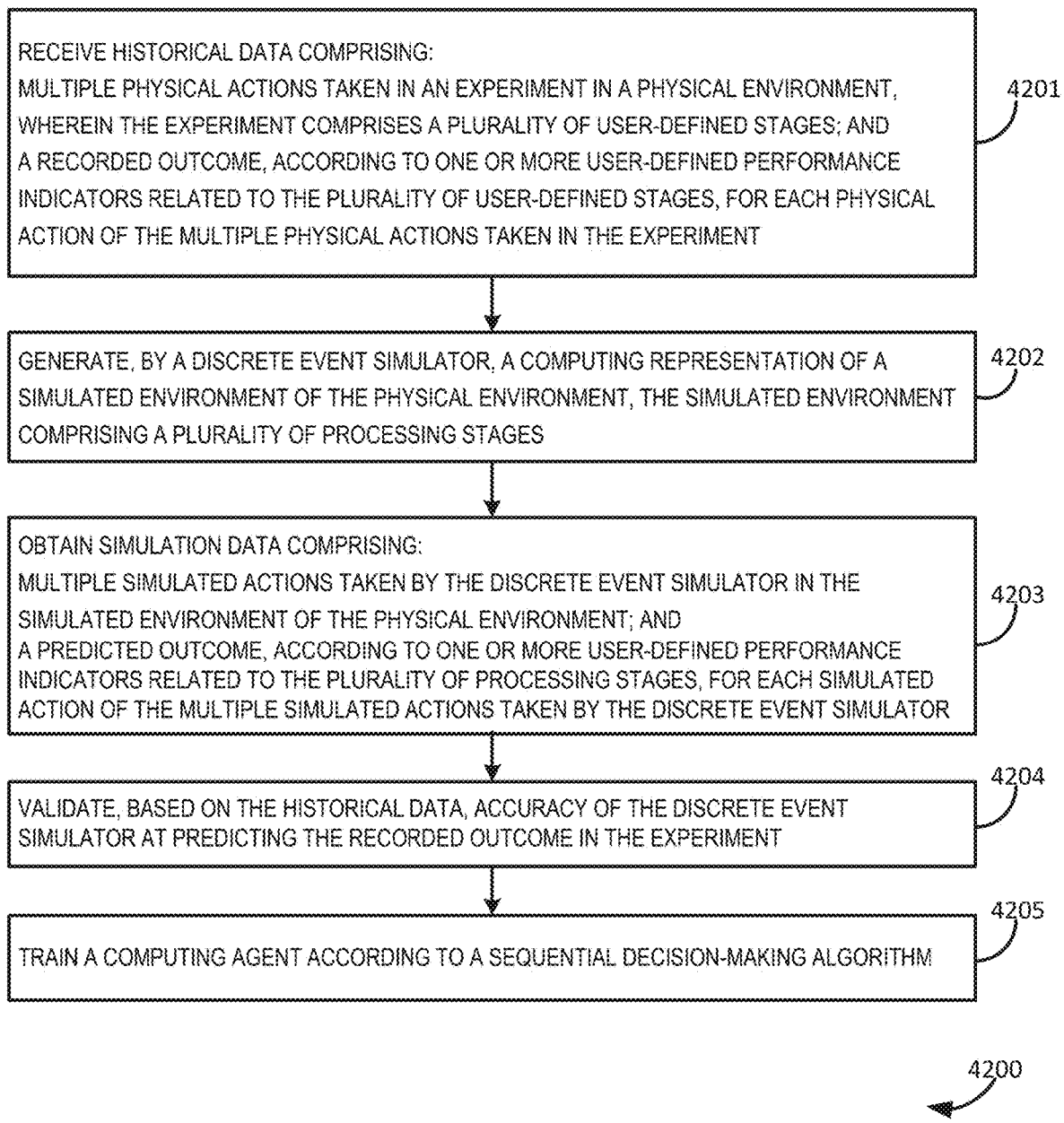
FIG. 42 illustrates an example flow diagram for training a computing agent in at least one embodiment of the present technology.

FIG. 42 illustrates an example flow diagram of a method 4200 for training a computing agent. The method could be implemented by one or more computing devices (e.g., computing devices in training system 4100).

Figure 44:
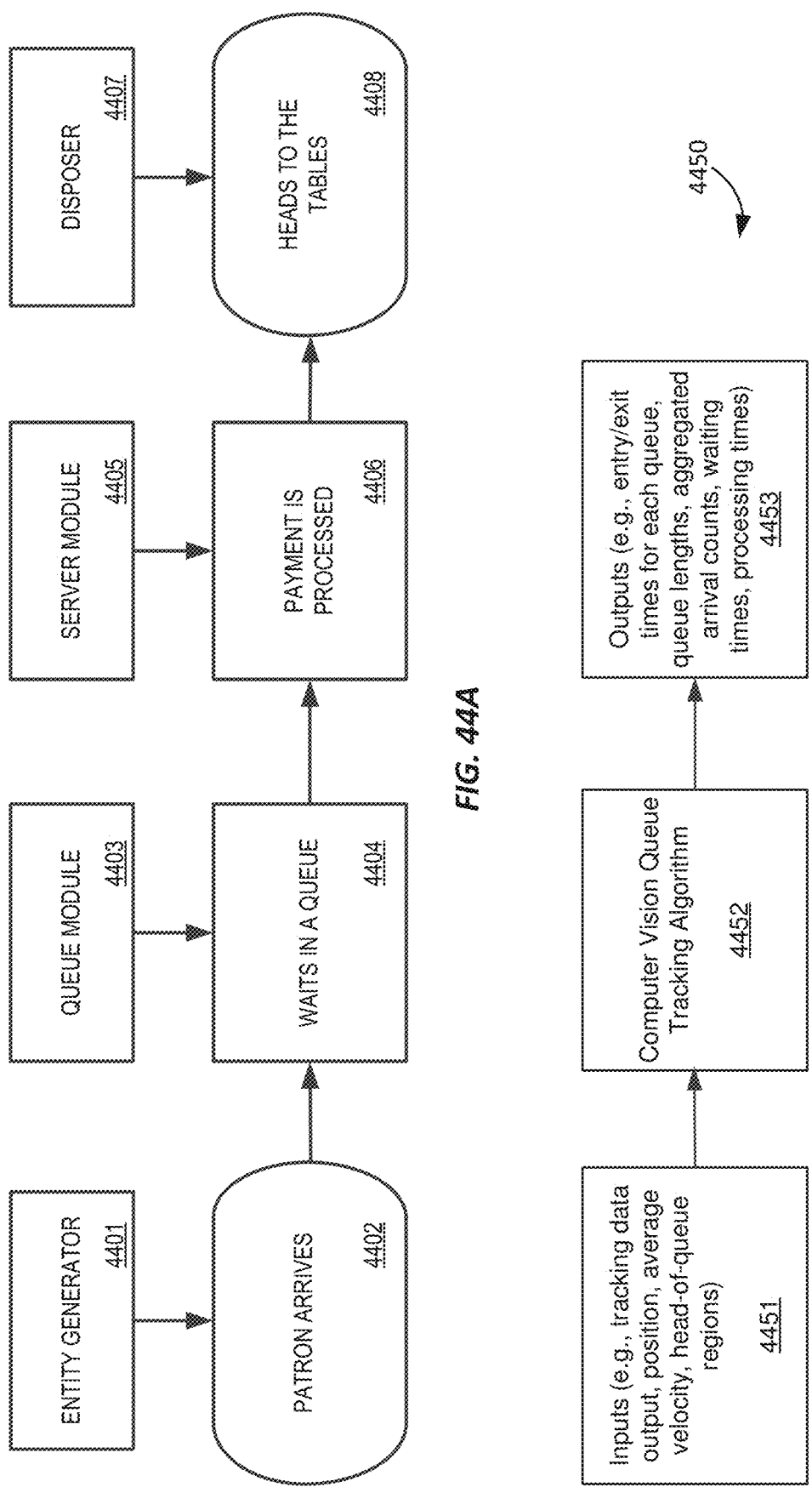
FIGS. 44A-B illustrate an example of outcomes and states in an example related to queues in at least one embodiment of the present technology.

An operation 4201 of method 4200 comprises receiving historical data. The historical data comprises multiple physical actions taken in an experiment in a physical environment. The experiment comprises a plurality of user-defined stages. For instance, FIG. 44A shows an example of user-defined stages for a scenario in an experiment conducted in a cafeteria. In a patron arrives stage 4402, a patron arrives (e.g., at a process point or a line from a process point). In a waits-in-a-queue stage 4404, the patron waits in a queue. In a payment-is-processed stage 4406 the patron's payment is processed, and in a heads-to-the-tables stage 4408 the patron heads to a tables area (e.g., with their purchased food). The physical action taken in the experiment could be for instance, increasing or decreasing the number of agents at the process point, or opening or closing process points locations.

Alternatively, or additionally the historical data comprises a recorded outcome, according to one or more user-defined performance indicators related to the plurality of user-defined stages, for each physical action of the multiple physical actions taken in the experiment. FIG. 44B shows an example of recorded outputs 4453 (e.g., entry or exit times for each queue, queue lengths, aggregated arrival counts at a stage, waiting times at a stage, processing times at a stage, etc.). As shown in FIG. 44B, a computer vision queue tracking algorithm 4452 (e.g., implemented by a computing device or system described herein), can be used to generate these outputs 4453 from captured inputs 4451 (e.g., tracking data output such as position or velocity of objects and/or head of queue regions).

An operation 4202 of method 4200 comprises generating, by a discrete event simulator, a computing representation of a simulated environment of the physical environment. The simulated environment comprising a plurality of processing stages. For instance, as shown in 44B, the simulator can be used to simulate the user-defined stages of the experiment. For instance, an entity generator 4401 is used to simulate the patron arrives stage 4402, a queue module 4403 is used to simulate the waits-in-a-queue stage 4404, a server module 4405 is used to simulate the payment-is-processed stage 4406 and a disposer 4407 is used to simulate an end heads-to-the-tables stage 4408.

An operation 4203 of method 4200 comprises obtaining simulation data. In this case of the simulator, since there is no physical environment, the simulator can be used to produce the input scenarios and output for the stages of the experiment. For instance, the simulation data comprises multiple simulated actions taken by the discrete event simulator in the simulated environment of the physical environment. Alternatively, or additionally, the simulation data comprises a predicted outcome, according to one or more user-defined performance indicators related to the plurality of processing stages, for each simulated action of the multiple simulated actions taken by the discrete event simulator.

An operation 4204 of method 4200 comprises validating, based on the historical data, accuracy of the discrete event simulator at predicting the recorded outcome in the experiment. For instance, the output of the discrete event simulator should correlate with the historical data results to determine that the discrete event simulator is appropriately simulating the environment.

An operation 4205 of method 4200 comprises training a computing agent according to a sequential decision-making algorithm (e.g., a reinforcement learning algorithm). In one or more embodiments, the operations described in the method 4200 could be in a different order, be combined or be comprised of multiple operations. For instance, operation 4205 could be implemented using one or more operations described in FIG. 43.

Figure 43:
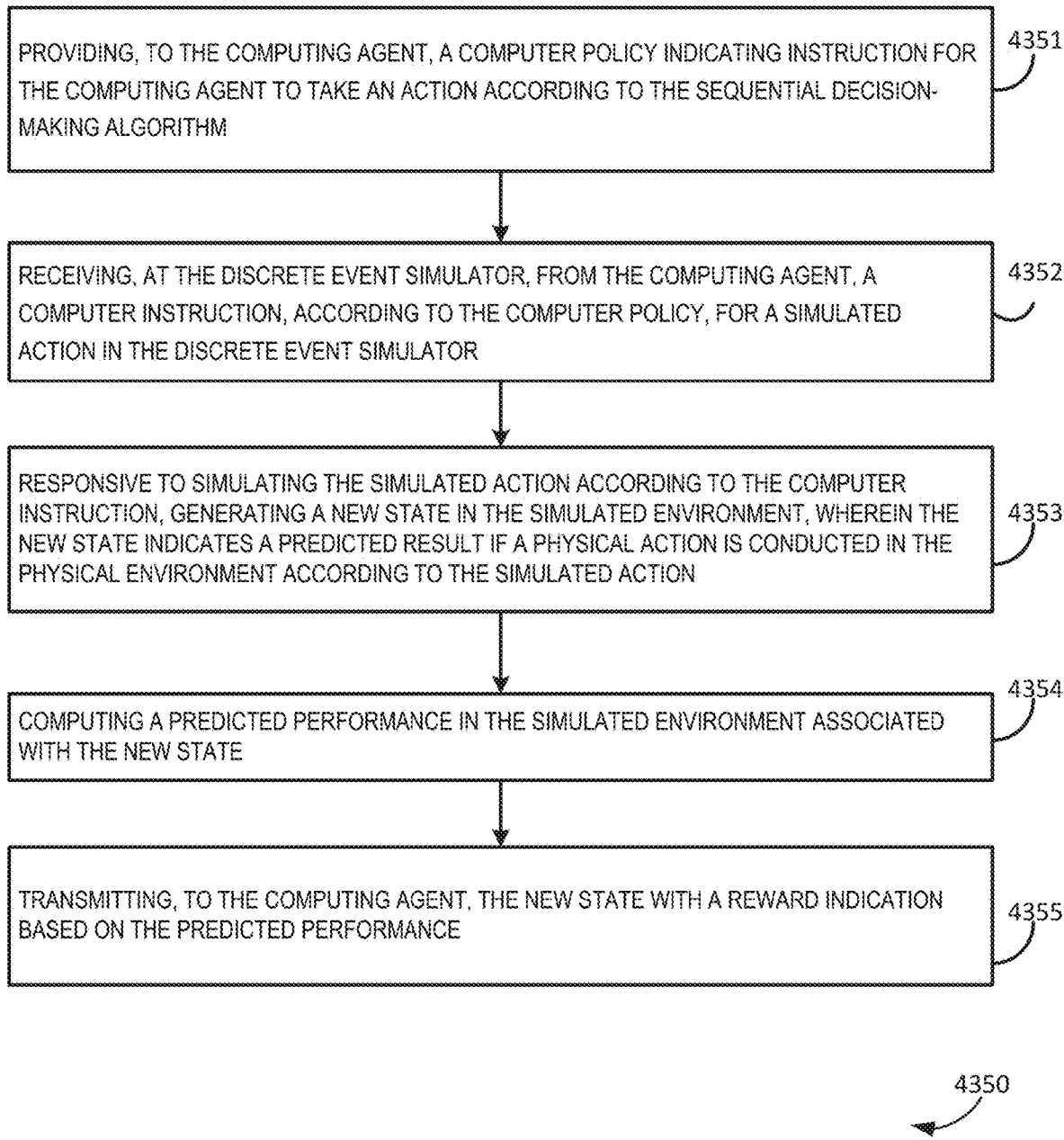
FIG. 43 illustrates an example flow diagram for transmitting a reward indication in at least one embodiment of the present technology.

FIG. 43 illustrates an example flow diagram of a method 4350 for transmitting a reward indication and a new state. Method 4350 can be conducted as part of operation 4205 to train a computing agent by transmitting rewards for actions that would improve a performance in the simulated environment.

In an operation 4351, the method 4350 comprises providing, to the computing agent, a computer policy indicating instruction for the computing agent to take an action according to the sequential decision-making algorithm.

In an operation 4352, the method 4350 comprises receiving, at the discrete event simulator, from the computing agent, a computer instruction, according to the computer policy, for a simulated action in the discrete event simulator.

In an operation 4353, the method 4350 comprises response to simulating the simulated action according to the computer instruction, generating a new state in the simulated environment. The new state indicates a predicted result if a physical action is conducted in the physical environment according to the simulated action.

In an operation 4354, the method 4350 comprises computing a predicted performance in the simulated environment associated with the new state.

In an operation 4355, the method 4350 comprises transmitting, to the computing agent, the new state with a reward indication based on the predicted performance.

In one or more embodiments, the computing agent aggregates the reward indication with other reward indications to generate a cumulative reward. The cumulative reward can be used, for instance, to determine whether a series of actions by the computing agent improves a baseline performance. In this way the computing agent can learn complex action processes.

FIGS. 44A-B illustrate an example of inputs and outputs collected for an experiment conducted on queues in a cafeteria. A computer vision pipeline (e.g., implementing method 4450) is used to obtain structured data from unstructured raw video footage, which can then be passed to a discrete event simulator and a real-time sequential decision-making algorithm (e.g., reinforcement learning) for making recommendation for a physical environment as described herein.

In the experiment, shown in FIG. 29, people were detected in a physical environment actively waiting in a queue (e.g., waits-in-a-queue stage 4404). The queues could be a part of multiple queues that can form at multiple varying locations in the experiment. One challenge with this type of scenario is that queue shapes can vary as they grow and at different times a queue can dynamically grow out into different directions. FIG. 39, for example, shows the variation in queues at different times (e.g., lines 3920 versus line 3922).

In the experiment, inputs 4451 were collected. Including object (person) detection/tracking data was collected. For instance, position information (on video frames) at each time step for each person, with each person having been assigned a unique identifier. The position information is also used to derive aggregated average velocity information. Head-of-queue location data was collected including regions of interest (on video frames) that defines where queues grow from. In the experiment, tracking was conducted for queue forming at the agent stations. A polygonal region was defined in front of each potential agent location. Also obtained was time-varying information of which of these locations is active. In the experiment, a computer vision model was used to determine which agent stations are active to focus on people waiting in queues that grow out of only those locations.

At each frame, the computer vision queue tracking algorithm 4452 first performs a 2-stage single-linkage agglomerative clustering. Both position and derived average velocity information is used to perform this clustering. The 2-stages refers to a first stage in which two persons are close to each other in position for them to be in the same cluster, but the second stage additionally requires that they must also have similar velocities for them to be in the same cluster. This information can be stored in a dataset using an affinity matrix technique where the i,j entry is infinity if person i and person j have distinct velocities, and otherwise the i,j entry is the Euclidean distance between their positions. This ensures that when two people are close to each other but moving in opposite directions they are not in the same cluster, as the assumption is that people waiting in a queue are moving in similar directions.

After the clustering is complete, active head-of-queue location data is used to decide which clusters contain at least one member within head-of-queue region. Each such region has their own unique identifier to track the status of the queue over time (across multiple video frames). For example, for each head-of-queue (active agent station) identifier, output 4453 could comprise a list of person-identifiers that are members of that queue, and entry and exit time of each person-identifier into that queue. This can be aggregated to provide overall waiting times. As another example of output 4453 correlated with a stage of the experiment, entry and exit into the head-of-queue region can be aggregated to provide processing time (e.g., after a person has arrived at the front of the queue how long does it take for the agent to process them in a payment-is-processed stage 4406)

Output 4453 can be used as input to a sequential decision-making algorithm. For example, at each time point, data was aggregated for the last predetermined period, e.g., 5-minutes, to provide the arrival count which in combination with queue length provides two of the state space variables for a reinforcement learning agent. The predetermined period is adjustable by a user.

In the experiment, output 4453 included entry and exit times out of each queue, aggregated arrival counts, queue lengths, waiting times, and processing times based on the application of a cafeteria environment. However, for other environments, other feature extraction is possible for other types of applications. For instance, if the environment is a street, the computer vision queue tracking algorithm 4452 can be used to extract additional features such as relative traffic levels at different regions, number of people in groups, and many others. If the application is a transportation hub, other entities humans could be tracked (e.g., cars, planes, trains, boats, etc.)

In the experiment a stream of inputs included video frames recorded by a closed-circuit television (CCTV). However, models to extract these features could be performed with alternative sensory inputs (e.g., Sonar, LiDAR, or RF identifier, etc.) depending on the application. After learning a good representation of the inputs, it can serve as a data-feeder to dashboard or simulation. Additionally, or alternatively, multiple video inputs or different inputs could be used for modeling with multiple service points. Output can be passed to a sequential decision-making algorithm.

Figure 45:
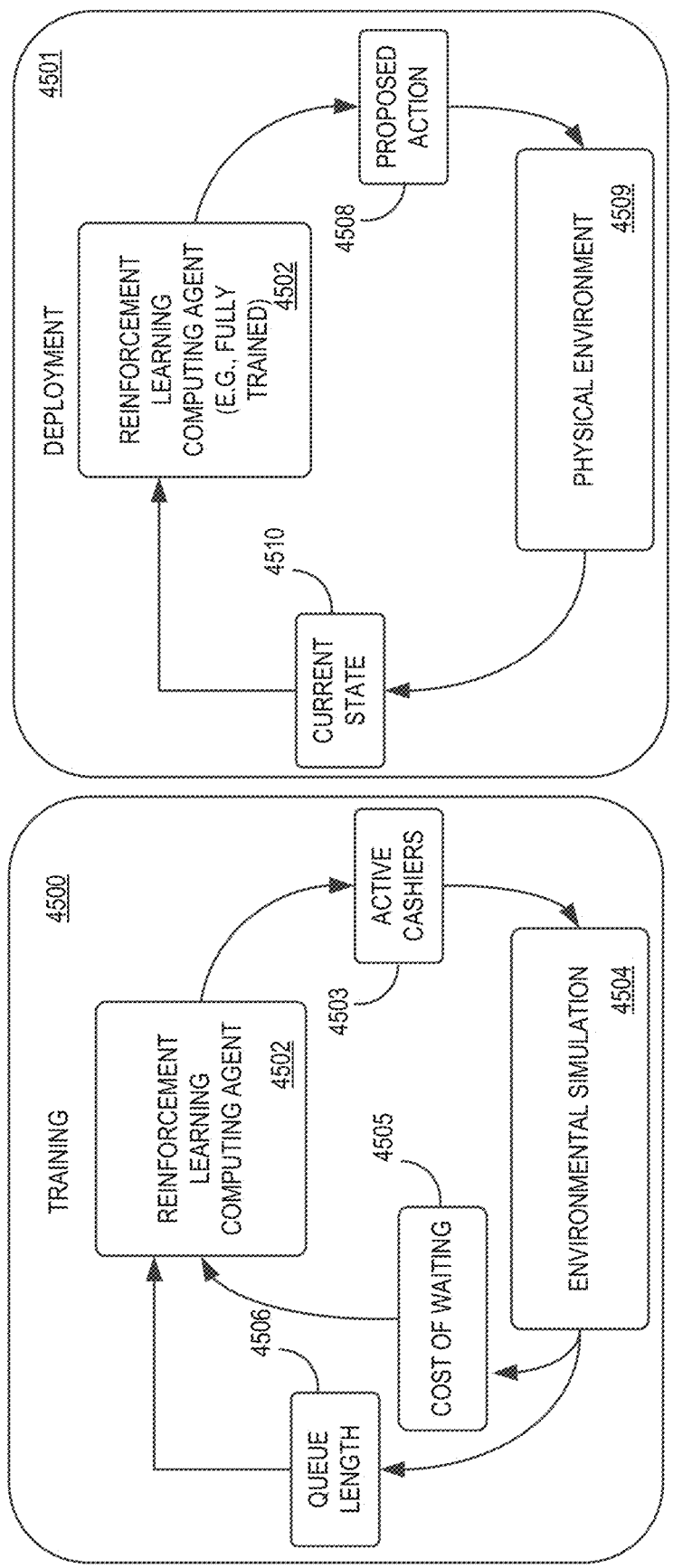
FIG. 45 illustrates example flow diagrams of training and deployment according to a reinforcement learning algorithm in at least one embodiment of the present technology.

FIG. 45 illustrates an example flow diagrams of training and deployment according to a reinforcement learning algorithm for the experiment shown in FIGS. 44A and 44B. Reinforcement learning typically needs access to an environment for training before deployment. If there is a limited number of historical data for training, one cannot use reinforcement learning algorithms for training the policy. However, in one or more embodiments, reinforcement learning is integrated with a discrete-event stochastic simulation software. Reinforcement learning algorithms are used as an example sequential decision modeling algorithm because they advantageously do not need to understand dynamics and/or transition within an environment to understand a reward based on a dynamic of the environment. It can make decisions based simply on the new state and reward. Other algorithms could be used.

As shown in FIG. 45, discrete event simulator is used as a reinforcement learning environment (e.g., SAS® Simulation Studio) to generate simulated data in order to train a batch-reinforcement learning algorithm in a training stage 4500. Later, the discrete event simulator is used to do performance evaluation of the trained policy in a deployment stage 4501. For instance, the reinforcement learning is used for queueing optimization and design by making sequential decision for managing a queuing system such that the reinforcement learning agent decides about agents' schedules.

In one or more embodiments, a computing system obtains simulation data of multiple simulated actions taken in the discrete event simulator by generating scenarios in a discrete event simulator. In the example shown in FIG. 45, the training stage 4500 comprises a computing agent 4502 (e.g., a reinforcement learning computing agent) that makes an action decision (e.g., a number of active agents 4503), and provides this to the environmental simulation 4504 (e.g., a discrete event simulator), who feeds back to the computing agent 4502 predicted metrics for queue length 4506 and other cost of waiting 4505 based on that action decision. In one or more embodiments, the training can occur in a physical environment or remote from a physical environment (e.g., without needing a connection to communicate with a remote server in the environment collecting information). Alternatively, or additionally, a computing system trains a computing agent 4502 remote from the physical environment and can receive additionally historical information (e.g., over an online connection). For instance, the computing agent 4502 receives, over a communications network, from a first remote server (e.g., one collecting data in the physical environment), datasets of the multiple physical actions and recorded outcomes corresponding to the multiple physical actions indexed by time statuses.

In one or more embodiments, the computing system is comprised to further deploy the computing agent trained according to the reinforcement learning algorithm in the physical environment by: monitoring, by a client node comprising the computing agent 4502 (e.g., fully trained), the physical environment for occurrence of one or more of a plurality of learned states according to the reinforcement learning algorithm; detecting a current state 4510 for the physical environment from the plurality of learned states; and issuing, by the computing agent 4502, based on the current state, a proposed action 4508 (e.g., a number of agents). This can be transmitted as, for instance, as a recommendation to the physical environment 4509.

Monitoring or tracking in the physical environment 4509 can be used to feedback an updated current state 4510 of the physical environment to the computing agent. For instance, monitoring the physical environment 4509 may comprise obtaining image data captured over time of the physical environment 4509 and detecting one or more objects in the image data as described herein (e.g., detecting a location and/or trajectory of an object). The proposed action 4508 may comprise issuing a recommendation to change a location or trajectory of the object or another different object in the physical environment 4509. For instance, in the queue scenario a first person may be used to track a first state of formation of a queue, but a second person entering the queue may have a changed location or trajectory by opening up a second process point location for the second person.

In one or more embodiments, the monitoring comprises tracking position, velocity or region for the object as described herein. For instance, the monitoring outputs could comprise performance indicators such as an entry or exit time of an object, from a given user-defined stage of different user-defined stages; a count or length comprising the object; a waiting or processing time for service to the object at a given user-defined stage of different user-defined stages; or other outputs described herein (e.g., outputs 4453 in FIG. 44B). The new or current state could even represent one or more performance indicators at a given processing stage of the plurality of processing stages.

Since extracting large quantities of historical data from visual inputs is limited, a discrete event simulation can be used as shown in FIG. 45 to augment the generation process. For instance, SAS® Simulation Studio offers the power to build flexible, data-driven, and scalable digital representations of any industrial system. Therefore, it is particularly suitable to play the role of a data-generation program for dynamic stochastic systems. In one or more embodiments, a computing system can obtain simulation data by generating stochastic models for the simulated environment comprising multiple inputs with random variation over a time period of a simulation of the simulated environment. The multiple inputs with random variation comprise one or more inputs different than one or more inputs observed in the physical environment. Simulated actions can then be generated as responses to the simulated multiple inputs.

In an experiment conducted, SAS® Simulation Studio is used to model queue dynamics and generate simulated queue dynamical data. The stochasticity of the simulator enables generating wide variety of scenarios that has not happened in the past for more robust policies. Furthermore, its underlying construction allows for more variation by allowing users to hot start the simulation in any initial state through the use of data tables.

In one or more embodiments, portable containers are used to convert a Discrete Event Simulator software (e.g., SAS® Simulation Studio) into an interactive reinforcement learning environment (e.g., through a REpresentational State Transfer application programming interface or REST API)

enabling the application of reinforcement learning algorithms from any platform capable of using Hypertext Transfer Protocol (HTTP).

Figure 46:
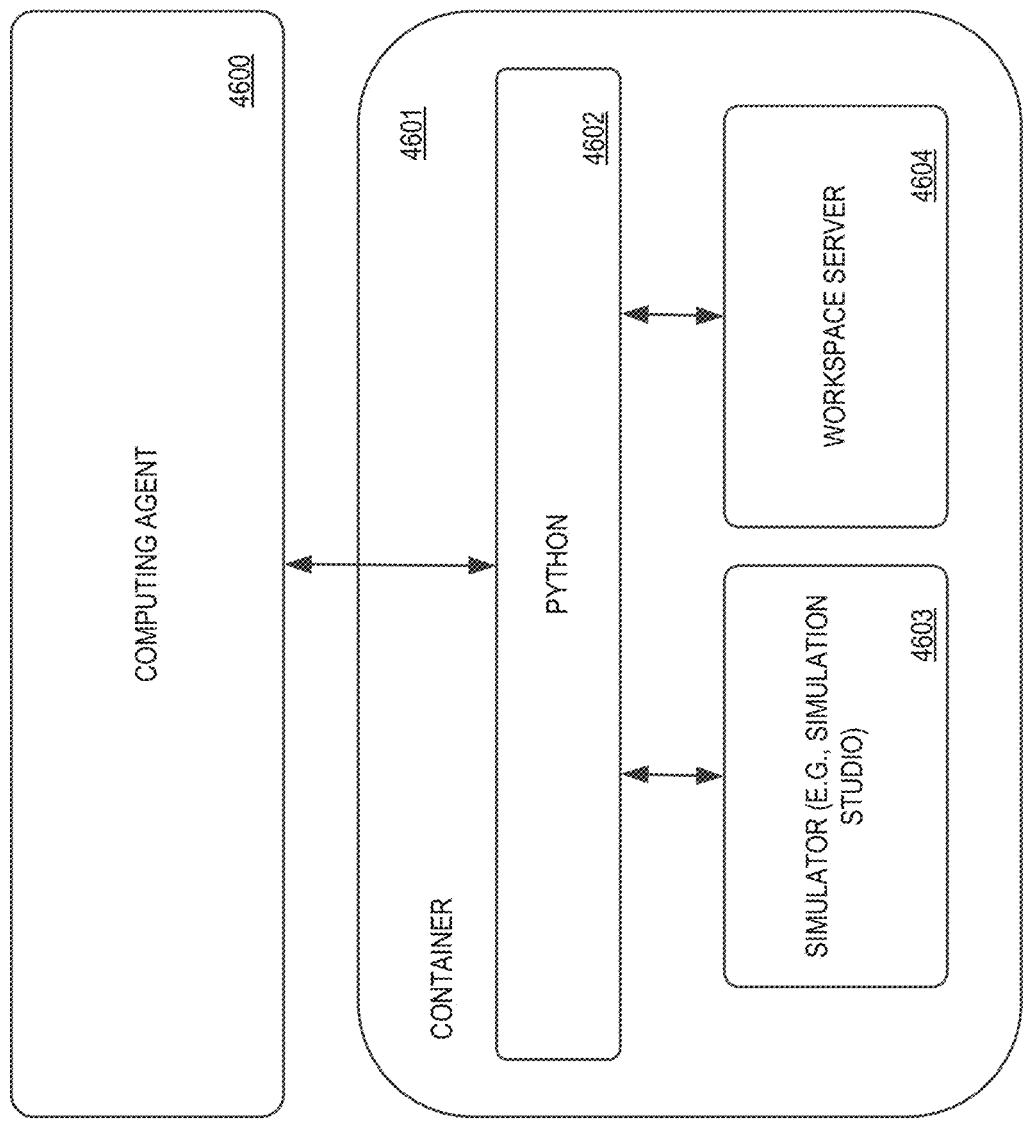
FIG. 46 illustrates an example block diagram of a simulator in a container in at least one embodiment of the present technology.

FIG. 46 illustrates an example block diagram of a simulator 4603 in a container 4601. The container 4601 comprises a package of isolated instructions isolated from modeling instructions associated with a computing agent 4600 outside the container 4601. The package of isolated instructions comprise simulator instructions for executing the simulator 4603 (e.g., Simulator studio and/or a discrete event simulator) in the container 4601. The modeling instructions are for executing the sequential decision-making algorithm outside the container 4601.

For instance, a computing system can be used to train the computing agent 4600 by transmitting from the container 4601 a new state for a discrete event implemented by the simulator 4603. Additionally, or alternatively, a computing system can be used to train the computing agent 4600 by transmitting from the container 4601 a reward indication in response to a selected action resulting in the new state.

The container 4601 can comprise a customized wrapper that emulates a physical environment such that the computing agent 4600 determines that it is training with a physical environment rather than a simulator. Instructions of the container (e.g., instructions of a discrete event simulator) and the modeling instructions can comprise different computing languages.

In one or more embodiments, the container 4601 comprises a workspace server 4604 for providing, to a computing agent, the computer policy. Alternatively, or additionally, the workspace server 4604 comprises receiving client node requests in a computer language different than the isolated instructions for executing the discrete event simulator (e.g., python language 4602).

Regardless of whether the sequential decision-making algorithm(s) is applied online or batch methods, training a reinforcement learning agent may involve a large amount of data (e.g., a current state of an environment at time step t, an action taken by a reinforcement learning agent at t, and/or a state of the environment at the next time step, t+1).

In some applications (e.g., queue monitoring applications), it is not advisable to turn management of a physical environment over to an untrained algorithm. Therefore, there is no way for the agent to interact with and receive feedback from the real environment. Instead, by creating a simulation of the physical environment dynamics (e.g., cafeteria dynamics using SAS® Simulation Studio), the computing agent 4600 can be trained. The simulation can be configured with an initial state that represents the condition of the physical environment at a given time. Next, any action taken by the computing agent 4600 updates that configuration, and then the simulation is repeatedly run in the simulator 4603 to estimate how the physical environment might evolve in response to that action.

Previously, SAS® Simulation Studio was designed to be run either manually through a user interface or in a batch mode, neither of which affords the ability for a reinforcement learning algorithm to interact with it. To resolve this, an application was developed that wraps SAS® Simulation Studio and provides a common API that can be used by any reinforcement learning algorithm to drive the simulation and train the reinforcement learning agent on the resulting data.

Figure 47:
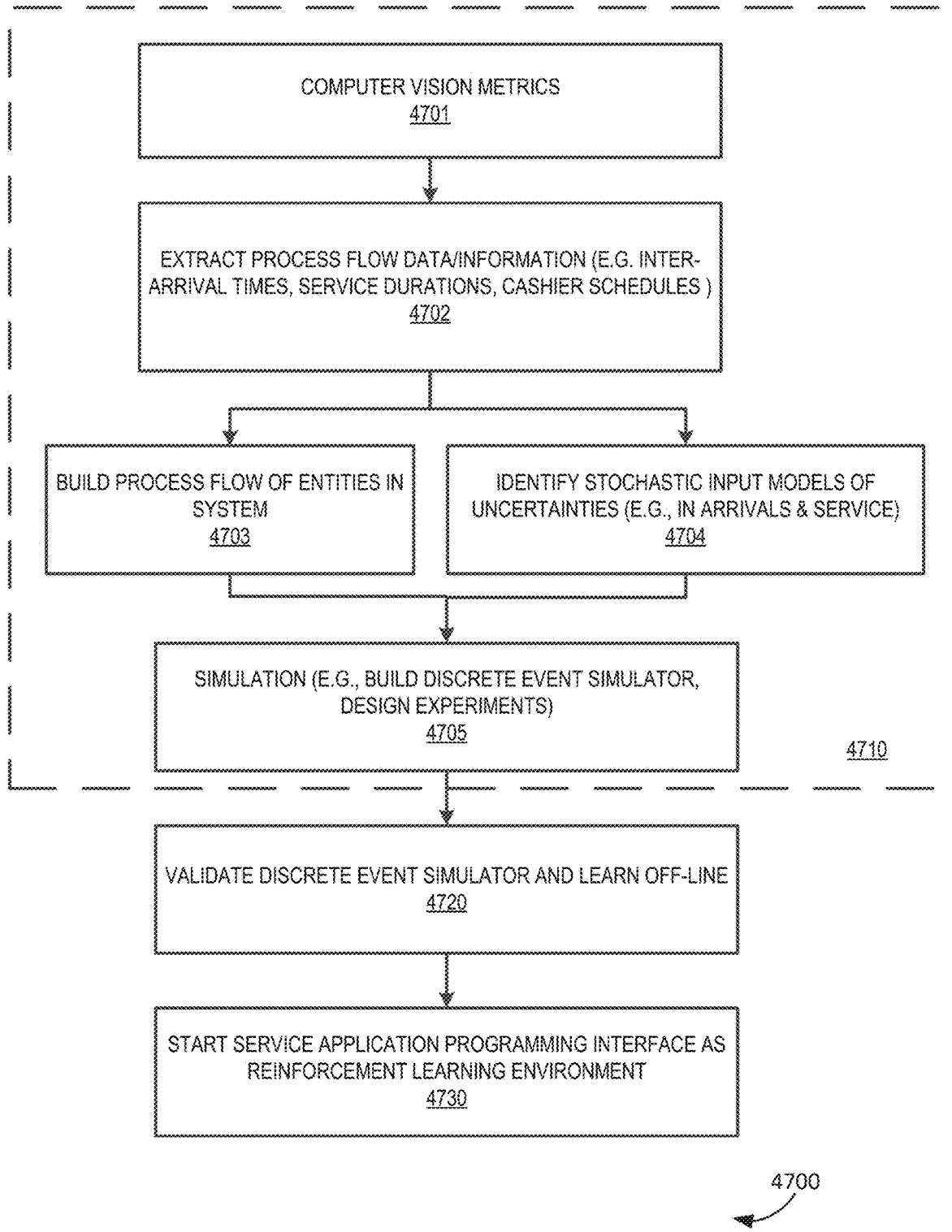
FIG. 47 illustrates an example flow diagram for building a simulation in at least one embodiment of the present technology.

FIG. 47 illustrates an example flow diagram 4700 for building a simulation. There are three stages in this example. The first stage 4710 is to use simulation to create a digital representation of the system entities flowing through the system queues. The foundation of this simulation model is a computer-vision generated time-stamped dataset of the system entities. This dataset will also be used for the validation of the developed simulation. The second stage 4720 is to use the validated simulation to perform off-line learning. The third stage 4730 is to modify the validated simulation to serve as the reinforcement learning environment, thereby, to support on-line learning. Each of these stages could comprise one or more operations or different operations than shown herein.

In the first stage 4710, a user chooses a digital representation technology. In the experiment regarding the cafeteria shown in FIGS. 44A and 44B, a discrete event simulation is chosen to model two discrete events: arrival of a patron to a queue and departure of the patron after payment to mimic the flow of patron through the cafeteria. However, other simulators could have been chosen for other applications. SAS® Simulation Studio was selected for the discrete event simulator because it provides a flexible, data-driven and scalable industrial system simulator. In addition to being able to capture detail of process modeling, SAS® Simulation Studio allows its users to capture different levels of (stationary or non-stationary) uncertainty in the process flow. Here, there are two random processes: number of patrons arriving in the system queue during a time-interval of interest and the amount of time it takes to make the payment. These two processes are illustrated in patron arrives stage 4402 and payment-is-processed stage 4406 in FIG. 44A.

The times of arrivals of the patrons to the cafeteria are explicitly stated in the computer vision generated data (e.g., by receiving computer vision metrics in an operation 4701). Therefore, the interarrival times between consecutive arrivals can be readily pulled from the computer vision generated data to be used for representing the patron arrival process. However, extracting the data to be used for modeling the payment time in an operation 4702 is not a straightforward task. This is the case because computer vision generated data is primarily made of patrons' arrival times to and departure times from the queues, and their difference presents the time-in-system. The time-in-system would overlap with payment time if the patron would arrive an empty system with zero queue length. It is for this reason that one of the tasks performed in the first stage 4710 is to identify those records of the patrons that can be used for accurately capturing the distribution of the payment time.

In one or more embodiments, a computing system receives historical data of an experiment by selecting based on performance indicators, time sequences that provide different values recorded according to the multiple performance indicators for each of user-defined stages and extracting the historical data associated with the time sequences selected.

One or more operations can be used to characterize the non-stationary arrival process. For instance, in an operation 4703, a process flow is built. In the example experiment, the payment time is relatively short, and the considerable portion of uncertainty in the process flow is due to the time-dependent arrivals of patrons to the queue. Characterizing the arrivals of patrons with a changing rate over the course of the lunch period in a day as well as over the days of the week, the weeks of the month, and the months over the year is one of the tasks that can be accomplished by this first stage 4710 of the development. Simulation accounts for any unexpected event with impact on the arrival rates of the patrons to the queue and reflects it in its generation of the sample paths showing how the operations of the system may unfold in a day.

In an operation 4704, stochastic input models of uncertainty are identified. A stochastic model estimates probability distributions of potential outcomes by allowing for random variation in one or more inputs over time. The stochastic input that equips simulation in this example with this capability is the non-homogeneous Poisson process that is directly characterized by the computer-vision generated arrivals data. The non-homogeneous Poisson distribution process was selected based on considerations such as the underlying arrival process was nonstationary and short duration where identified during which the rate of arrivals remains constant and the interarrival time intervals behave independent. Other distributions could be used to measure other model arrival processes with different considerations. An input modeling algorithm investigates the goodness of the fit associated with each length of time that divides the entire simulation horizon into time buckets (e.g., equal time bucks). An example suggestion would be dividing a two-hour lunch period into five-minute intervals. Then, the input modeling algorithm identifies the arrival rate for each of the 24 five-minute intervals.

After completing the characterization of the non-stationary arrival process, in a simulation operation 4705, a simulation experiment is designed for estimating several different key performance indicators (KPIs). The choice of the KPIs may differ from one industrial setting to another. Examples of those suitable for the example cafeteria queues were: (a) a number of minutes a patron spends waiting in the queue; (b) a number of patrons that can be identified to be waiting in the queue at any time; (iii) a total number of patrons the cafeteria may serve during a two-hour period. Each of these KPIs can be customized for any other service or manufacturing setting, and SAS® Simulation Studio has the flexibility to capture them for any industrial setting. Once the KPIs of focus are identified, they are calculated directly from the computer-vision generated data and from the simulation. The simulation experiments are designed to conduct sufficiently large number of replications to ensure narrow confidence intervals for the KPIs' mean predictions. In one or more embodiments, the operation 4705 comprises validating the use of simulation as an adequate digital representation of the system under consideration. For instance, distributional properties of these two sets of KPI from the historical data (e.g., the computer vision metrics and extracted information) and from the simulation data are compared. Comparison aims to detect any statistically significant differences between what computer-vision generated data suggests and what is simulated.

Once validated, further experiments can be conducted with the digital representation of a physical environment to answer any what-if questions without creating any disturbance for the actual physical system. For example, if a user wants to see the impact of a single agent at the cafeteria versus two agents at the cafeteria, simulation of the two scenarios is conducted to predict performance.

In a second stage 4720, a scalable, data-driven, and flexible dynamic simulator for the system under consideration. The simulator serves as a virtual laboratory to assess the impact of operational policies and strategic design and investment decisions. In the cafeteria example, the simulator is used to understand the performance of various agent schedules and to perform risk-and-return tradeoff. Because SAS® Simulation Studio is a tool to enable the analysis of thousands of scenarios to perform risk-and-return tradeoff, in this example it is able to consider what would be a good agent schedule and what features of a schedule would lead to poor system performance. This learning can be conducted off-line (e.g., with no connection to the physical environment). Such off-line learning is valuable information for the third stage 4730 where the computing system can move away from the assumption of pre-designed static schedules to be replaced with real-time schedule adjustment.

In the third stage 4730, the simulator completely serves as the environment for the reinforcement learning. This could involve changes to the way the simulation experiments have been designed in the second stage 4720. First, the length of each replication of the simulation is adjusted to the desired time step of the reinforcement learning algorithm. Second, the assumption can be relaxed (e.g., an assumption of starting the simulation with no patrons in the systems and/or with all agents in the idle state). Simulation can be modified to read the starting state vector and the action set directly from input datafiles. Because the simulator is data-driven, this task can be performed smoothly by utilizing the successful integration of simulation and reinforcement learning. Finally, the Bucket module of SAS® Simulation Studio is used to collect all system (cafeteria), resource (agent) and entity (patron) flow data to predict how the system has performed as well as the state of the system at the end of a reinforcement learning time step.

This example three-stage environment development can be extended to any industrial setting independent of its flow complexity and high levels of uncertainty in which it may be exposed.

FIGS. 48A-E illustrate an example graphical user interface 4800 for a simulation conducted for the cafeteria experiment.

Figure 48A:
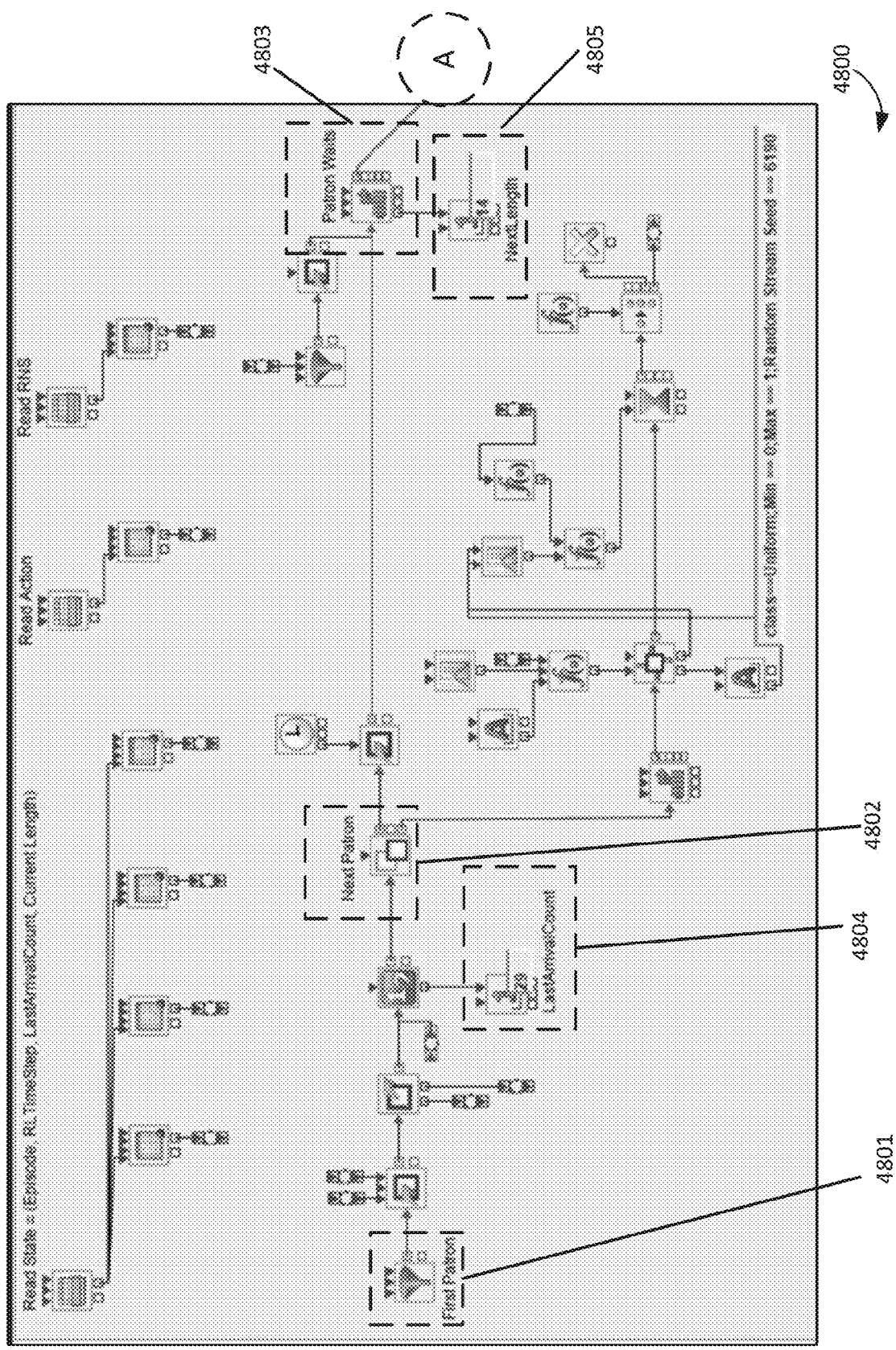

In this example, a computing system (e.g., a computing system in training system 4100 of FIG. 41 or of control system 2500 on FIG. 25) displays a graphical user interface for object-oriented modeling of the physical environment by a user. As shown in graphical user interface 4800 objects are used to represent objects in the physical environment (e.g., a first patron object 4801). In this example, the graphical user interface 4800 is from SAS® Simulation Studio, which uses blocks or module objects to build a simulation. The user can build the simulation stages by selecting objects to represent the physical environment via the graphical user interface 4800. For instance, as shown in FIG. 48A, graphical user interface 4800 includes stages like next patron stage 4802 or patron waits stage 4803). The computing system can generate the simulated environment in accordance with the user selection. The different performance indicators can be used to track the simulation (e.g., a last arrival count 4804 associated with the next patron stage 4802 or a length indicator 4805 associated with the patron waits stage 4803). The model continues at a point A in FIG. 48B into a process for a paid-for-lunch stage 4820.

FIG. 48C shows experiment statistics 4850 as simulation experiments are simulated. This could be a data set and/or displayed in graphical user interface 4800 (e.g., the experiments window of SAS® Simulation Studio). The experiment statistics 4850 can also keep track of average information across several experiments (e.g., the last arrival count, a queue length (next length), and a reward). In this case the average reward is a cumulative reward that is aggregated from reward indications at several time steps for determining whether a series of actions by the computing agent improves a baseline performance. Alternatively, or additionally, the experiment statistics 4850 can keep track of current experiments (e.g., a type of scenario, the number of times it is repeated (replicates), the number of episodes, and the current reinforcement learning (RL) time step). These values coincide with the values shown on the graphical user interface 4800 in FIG. 48D for episode indicator 4860 and RL TimeStep indicator 4861.

FIG. 48D also shows other indicators pertaining to the simulation that can be displayed in graphical user interface 4800. For instance, Random number seed (RNS) indicator 4863, specifies the initial state to generate pseudo random numbers for scenarios. An action indicator 4862 specifies an index of an action taken. In this case the index indicates how many agents to use. A current reward indicator 4864 shows a current reward computed by the simulator for a proposed action by the computing agent. In one or more embodiments, the computing system generates, by the simulator, a value that varies as a function of an improvement in the predicted performance over a baseline performance that is a previously predicted performance or threshold predicted performance; and transmits the reward indication to the computing agent indicating the value.

As shown in FIG. 48D, the real time reward is much smaller in magnitude at −116.483 compared to the cumulative average reward shown in FIG. 48C which is much larger in magnitude −1,932.12098. The real time reward may be correlated with predicted performance improvement for a time period or stage period and one or more recorded outcomes based on a given action taken by the computing agent according to the sequential decision-making algorithm. In contrast, the cumulative reward may involve several stages to judge a complex series of actions by the computing agent. In this case, the rewards are negative because the proposed actions in this scenario are not improving a previously predicted performance or threshold predicted performance. The cumulative reward may also be calculated by the computing agent based on several rewards from the simulator for different stages.

Figure 48E:
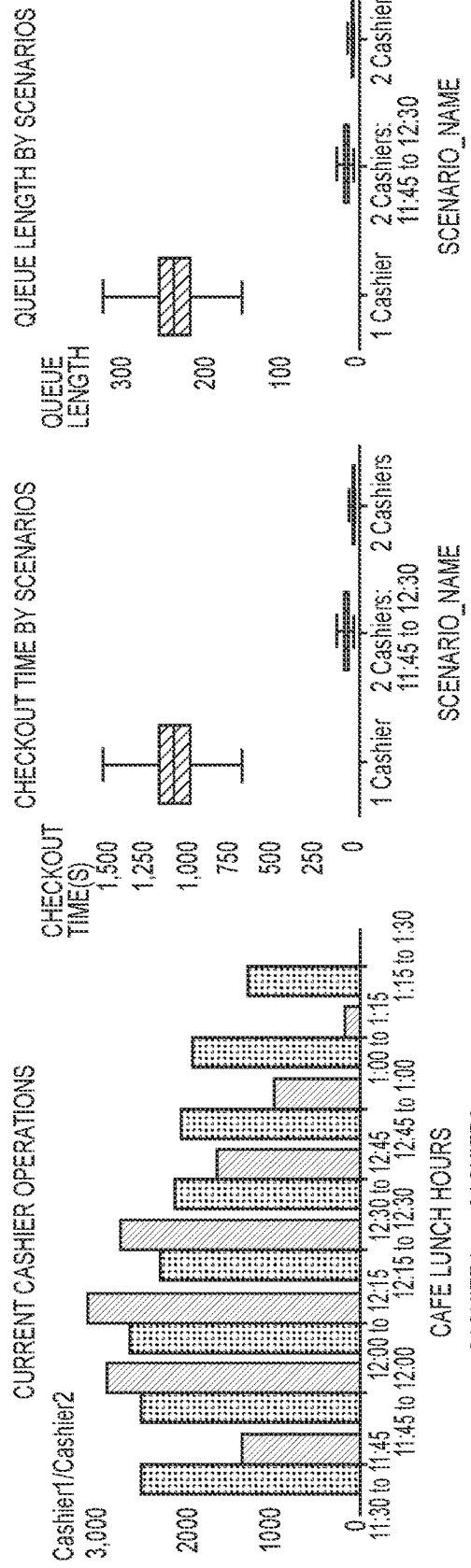

Real time statistics from the simulator can also be shown in the dashboard 4880 in FIG. 48E, which is similar to the dashboard 3400 in FIG. 34 for experiment data of the physical environment. In this case though the metrics are with respect to scenarios in the simulator. For instance, as shown in the table in dashboard 4880, checkout time in seconds, average queue length, and throughput is given with respect to different scenarios simulated by the simulator.

Figure 49:
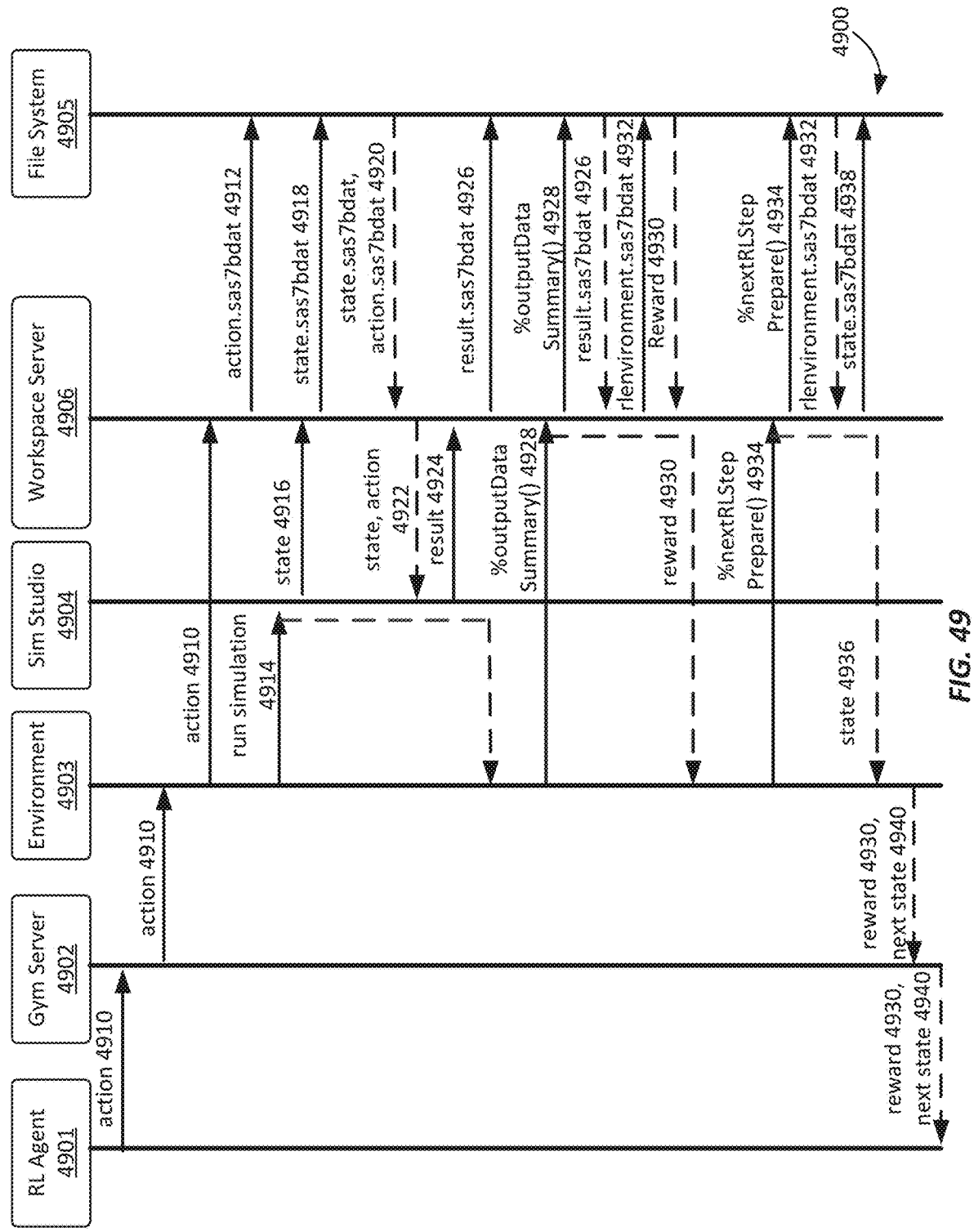
FIG. 49 illustrates an example flow diagram for returning a reward and action in at least one embodiment of the present technology.

FIG. 49 illustrates an example flow diagram 4900 for returning a reward and action. In one or more embodiments, an application's application programming interface (API) exposes an HTTP REST interface to clients (e.g., reinforcement learning agent 4901) that is a computing agent that accepts an action a from the client (e.g., action 4910 such as sending an agent or refraining from sending an agent) and returns the immediate reward (e.g., reward 4930) for taking that action in the environment according to a sequential decision-making algorithm.

The flow diagram 4900 shows example signaling for a single step of a reinforcement learning algorithm, but the flow diagram 4900 could be looped for each step of a simulation. In this example, a reinforcement learning agent 4901 signals an action 4910 to gym server 4902. The gym server 4902 sends the action 4910 as a recommendation to the environment 4903. The action 4910 is also shared with the Workspace Server 4906. In this implementation, Simulation Studio 4904 expects inputs and outputs to come from Workspace Server 4906. Workspace Server 4906 reads and writes data to File System 4905. Workspace Server 4906 can be considered an intermediary between the Simulation Studio 4904 and File System 4905. For instance, the Workspace Server 4906 communicates with a file system 4905 to store the action as action.sas7bdat file 4912. In this case, the environment 4903 can be an emulated environment that communicates with a simulation (e.g., simulation studio 4910). In other words, the application translates action 4910 into the appropriate input data for Simulation Studio 4904 and writes action 4910 and any other configuration data to disk. The Simulation studio 4904 receives from the RL agent 4901, via the REST API, input files indicating a starting state vector and a dataset comprising a data representation of a given action 4910 recommended by the RL agent 4901.

In response to the action 4910, the environment 4903 can run a simulation operation 4914 at the simulation studio 4904. The simulation studio 4904 can be used to produce a state 4916 as part of a simulation that is shared with the workspace server 4906. Results of the run simulation operation 4914 can also be optionally fed back to the environment 4903 (e.g., whether the simulation attempt succeeded or not). The state 4916 is shared with the file system 4905 as state.sas7bdat file 4918. The state and action can be returned back to the simulation studio 4904 (e.g., filenames 4920 are shared by the file system 4905 to the workspace server 4906 and state, action 4922 is shared by the workspace server 4906 with the simulation studio 4904). Based on the state 4916 and action 4910, the simulation studio can determine a result 4924 (e.g., a predicted performance). In this implementation, results are also stored in the file system 4905 as result.sas7bdat file 4926. In this example, the application executes SAS® Simulation Studio to simulate the environment and reads the simulation output data from disk.

The application can translate the simulation results into a reward r (e.g., reward 4930) and a next state s' (e.g., next state 4940) and return a real-time response to the reinforcement learning agent containing r and s' (e.g., transmitting via the REST API). For instance, the environment 4903 can provide an output data summary function 4928 request to receive a reward 4930 for the action 4910 from the file system 4905. The workspace server 4906 can also store a reinforcement learning environment in the file system as rlenvironment.sas7bdat file 4932. The file system 4905 can optionally return back the result.sas7bdat file 4926 and the reward 4930.

The Environment 4903 can also provide a next reinforcement learning step prepare function 4934 to prepare for the next step in the reinforcement learning algorithm. Environment 4903 instructs Workspace server 4906 according to the next reinforcement learning step prepare function 4934 to copy the next state 4936 to state.sas7bdat 4918. This increments the current state of the simulation in anticipation of additional requests from the RL agent 4901. A state 4936 can be returned to the environment 4903 and stored in the file system 4905 as state.sas7bdat file 4938. The environment 4903 can return a received reward 4930 and state 4936 as a next state 4940 to the gym server 4902 who can return this to the RL agent 4901 for training or deploying the RL agent 4901. The Workspace server 4906 can receive file rlenvironment.sas7bdat file 4932 for determining the state 4936.

In this example, the RL agent 4901 used a fitted Q Iteration (FQI), which is the most popular batch-reinforcement learning algorithm which is useful for table-based reinforcement learning problems. In general, table-based algorithms are not scalable for the problems with large state and action spaces. Therefore, function approximation techniques must be used to resolve the curse of dimensionality. Utilizing neural network as function approximation, the FQI algorithm can be extended to Fitted Q-Network (FQN) algorithm. In particular, FQN uses a dataset of transitions obtained from a random policy in order to train a neural network. Later, this neural network, which is called a policy here, is able to output an action given a state as an input. Following a similar line of ideas from Deep Q-Network (DQN), FQN defines two neural networks namely policy network and target network. During the training FQN freezes the weights of the target network for C iterations, and minimizes the difference between the estimated Q-values based on the policy network and the target network. After C iterations, the weights of the target network are set to those of the policy network. To improve the stability of the algorithm, it further defines a replay memory that stores a set of transitions, and minimization is conducted over a minibatch of samples picked from this replay memory.

Figure 50:
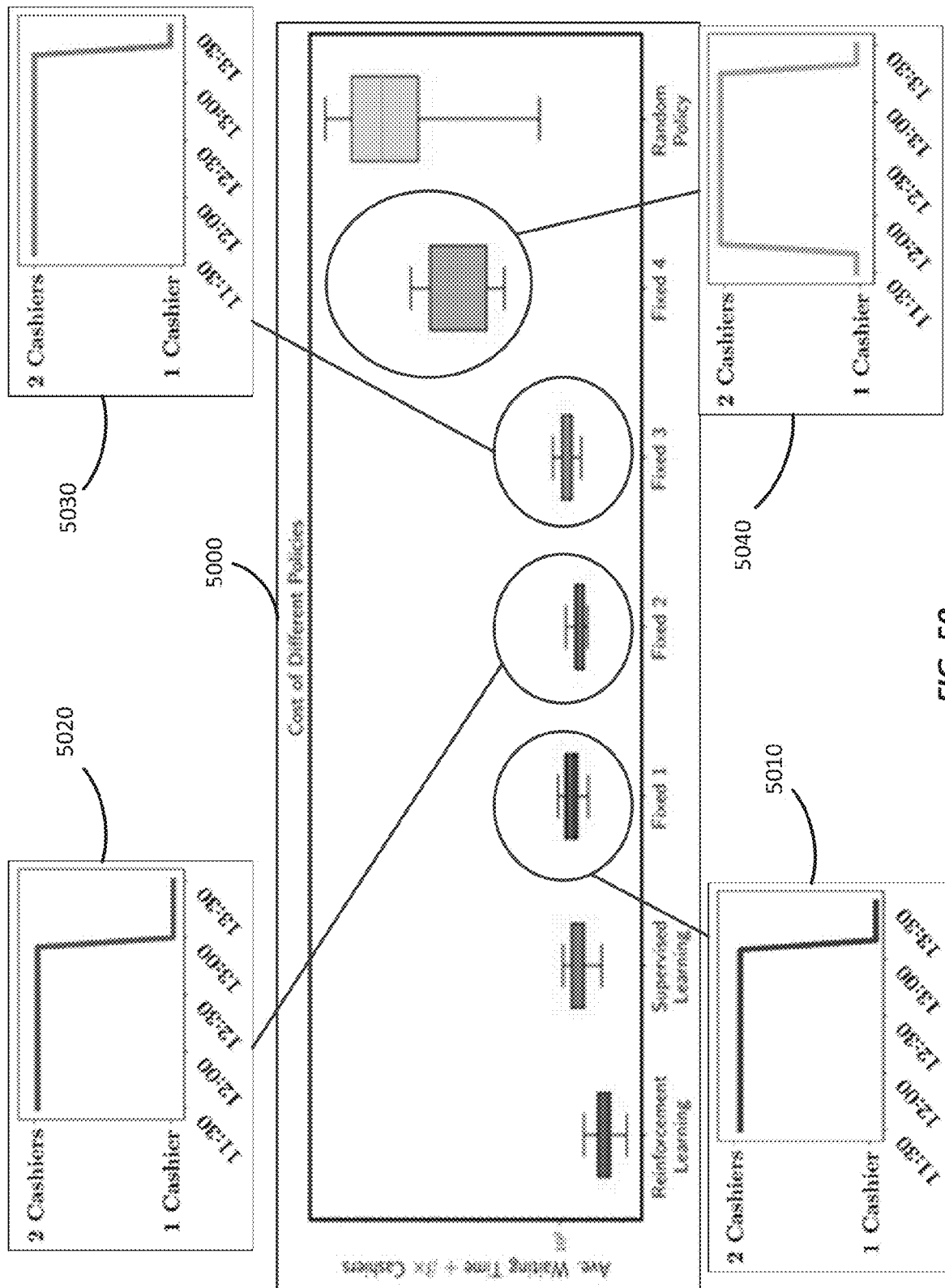
FIG. 50 illustrates example performances in at least one embodiment of the present technology.

FIG. 50 illustrates example performances for the case study described herein for agents in a cafeteria. In this experiment, optionally one or two agents serves the people checking out their lunch. Decision points were defined to be every 5 minutes from 11:30 AM to 1:30 PM. The cost of the system was assumed to be a linear combination of average waiting time of people in the queue and the cost of adding an extran agent, with hyperparameter $\beta$ controlling the scaling tradeoff between these two cost components. This parameter controls the degree to which to prioritize having shorter queues or less operational cost of agents.

In a first test a reinforcement learning model was used as described with respect to FIG. 49. To evaluate the performance of reinforcement learning, several baselines are considered. The first baseline includes a random policy approach in which one or two agents are randomly chosen at every decision point. Four fixed schedules baselines were also considered that were based on most common historical schedules used in this cafeteria. Fixed schedules choose one or two agents depending on current time, irrespective to how busy the system is. Graph 5010 shows the schedule for fixed schedule 1; graph 5020 shows the schedule for fixed schedule 2, graph 5030 shows the schedule for fixed schedule 3, and graph 5040 shows the schedule for fixed schedule 4. In another alternative baseline, supervised learning was used for decision making. This approach uses the historical data to approximate which action in the proximity of the current state achieved the best immediate reward. This method learns an approximate mapping from state space to best historical action space using a neural network.

FIG. 50 shows a graph 5000 plotting a box plot for a metric of each of the approaches. The chosen metric reflected the average weight times and the cost of the agents. Reinforcement learning achieves significantly lower cost with respect to the other alternative both in terms of average and outliers. Random policy achieved as expected poor performance. The box plot for fixed schedule 4 showed results nearly as bad as random policy. This shows that human intuition to have more agents during a typically busy period (e.g., the middle of the lunch period) achieves poor performance compared to computing techniques described herein.

The specific method used in embodiments was Reinforcement Learning. However, as shown by different modeling approaches, there are other alternatives based on supervised learning that are also possible. Further, there are different types of sequential decision-making algorithms that may be better suited for different types of applications. For instance, multi-armed bandit algorithms are useful especially in applications where there are low dependencies between time steps, e.g. in the low-congested system where the queue length is always small.

Embodiments herein are relevant to other environments besides cafeteria environments, such as environments with queuing systems. Queueing systems are used in many different environments including managing lines at government agencies, airports, grocery stores, traffic, elevators, and amusement parks. Techniques for queueing system control described herein allow for optimization and efficiency of queueing systems. Having autonomous decision makers that are continually monitoring the status of queues and are sending notifications to managers to take actions with regards to the new changes can improve human experiences. Techniques herein also can advantageously provide ways for real-time monitoring and tracking that protects privacy of tracked objects.

What is claimed is:

1. A computer-program product tangibly embodied in a non-transitory machine-readable storage medium, the computer-program product including computing instructions operable to cause a computing system to:
receive historical data comprising:
multiple physical actions taken in an experiment in a physical environment, wherein the experiment comprises a plurality of user-defined stages; and
a recorded outcome, according to one or more user-defined performance indicators related to the plurality of user-defined stages, for each physical action of the multiple physical actions taken in the experiment;
generate, by a discrete event simulator, a computing representation of a simulated environment of the physical environment, the simulated environment comprising a plurality of processing stages;
obtain simulation data comprising:
multiple simulated actions taken by the discrete event simulator in the simulated environment of the physical environment; and
a predicted outcome, according to one or more user-defined performance indicators related to the plurality of processing stages, for each simulated action of the multiple simulated actions taken by the discrete event simulator;
validate, based on the historical data, accuracy of the discrete event simulator at predicting the recorded outcome in the experiment; and
train a computing agent according to a sequential decision-making algorithm, by:
providing, to the computing agent, a computer policy indicating instruction for the computing agent to take an action according to the sequential decision-making algorithm;
receiving, at the discrete event simulator, from the computing agent, a computer instruction, according to the computer policy, for a simulated action in the discrete event simulator;
responsive to simulating the simulated action according to the computer instruction, generating a new state in the simulated environment, wherein the new state indicates a predicted result if a physical action is conducted in the physical environment according to the simulated action;
computing a predicted performance in the simulated environment associated with the new state; and
transmitting, to the computing agent, the new state with a reward indication based on the predicted performance.

2. The computer-program product of claim 1, wherein the reward indication is aggregated, by the computing agent, with other reward indications to generate a cumulative reward for determining whether a series of actions by the computing agent improves a baseline performance.

3. The computer-program product of claim 1,
wherein the sequential decision-making algorithm is a reinforcement learning algorithm; and
wherein the computing system is comprised to further deploy the computing agent trained according to the reinforcement learning algorithm in the physical environment by:
monitoring, by a client node comprising the computing agent, the physical environment for occurrence of one or more of a plurality of learned states according to the reinforcement learning algorithm;
detecting a current state for the physical environment from the plurality of learned states; and
issuing, by the computing agent, based on the current state, a proposed action.

4. The computer-program product of claim 3,
wherein the monitoring the physical environment comprises:
obtaining image data representing a plurality of images, each of the plurality of images captured over time of a physical environment;
detecting a first object in the image data;
wherein detecting the current state for the physical environment comprises detecting one of a location or trajectory of the first object; and
wherein the issuing the proposed action comprises issuing a recommendation to change a location or trajectory of a second object in the physical environment, wherein the second object is the first object or a different object in the physical environment.

5. The computer-program product of claim 1, wherein the computing instructions are operable to cause the computing system to:
display a graphical user interface for object-oriented modeling of the physical environment by a user;
receive input, via the graphical user interface, of user selection of objects to represent the physical environment; and
generate the computing representation of the simulated environment in accordance with the user selection.

6. The computer-program product of claim 1,
wherein the computing system comprises a container with a package of isolated instructions isolated from modeling instructions;
wherein the package of isolated instructions comprise simulator instructions for executing the discrete event simulator in the container; and
wherein the modeling instructions are for executing the sequential decision-making algorithm outside the container.

7. The computer-program product of claim 6, wherein the computing instructions are operable to cause the computing system to train the computing agent by transmitting from the container:
the new state for a discrete event implemented by the discrete event simulator; and
the reward indication in response to a selected action resulting in the new state.

8. The computer-program product of claim 6, wherein the container comprises a customized wrapper that emulates the physical environment.

9. The computer-program product of claim 6,
wherein the container comprises a workspace server for receiving client node requests in a computer language different than the isolated instructions for executing the discrete event simulator; and
wherein the providing, to a computing agent, the computer policy comprises receiving a client node request regarding the computer policy from the workspace server.

10. The computer-program product of claim 6, wherein the discrete event simulator instructions and the modeling instructions comprises two different computing languages.

11. The computer-program product of claim 1,
wherein the computing instructions are operable to cause the computing system to generate, by the discrete event simulator, a value that varies as a function of an improvement in the predicted performance over a baseline performance that is a previously predicted performance or threshold predicted performance; and
wherein the transmitting the reward indication comprises transmitting the reward indication to the computing agent indicating the value.

12. The computer-program product of claim 11, wherein the baseline predicted performance is based on a historical baseline predicted performance corresponding to:
a time period; and
multiple recorded outcomes based on a given action taken by the computing agent according to the sequential decision-making algorithm.

13. The computer-program product of claim 1,
wherein the receiving, at the discrete event simulator, from the computing agent comprises receiving, from one or more clients nodes, via a Representational State Transfer (REST) Application programming interface (API), input files comprising a starting state vector and a dataset comprising a data representation of a given action recommended by the computing agent; and
wherein the transmitting the new state and the reward indication comprises transmitting via the REST API, a dataset with indicator of the reward and the new state corresponding to the given action.

14. The computer-program product of claim 1,
wherein the computing instructions are operable to cause the computing system to train the computing agent by receiving, over a communications network, from a first remote server, datasets of the historical data; and
wherein the historical data comprises the multiple physical actions, and recorded outcomes corresponding to the multiple physical actions indexed by time statuses.

15. The computer-program product of claim 14, wherein the computing instructions are operable to cause the computing system to obtain simulation data of multiple simulated actions taken in the discrete event simulator by generating scenarios in the discrete event simulator for the physical environment without communicating with a given remote server.

16. The computer-program product of claim 1, wherein the computing system is comprised in one or more edge devices in the physical environment.

17. The computer-program product of claim 1,
wherein the computing instructions are operable to cause the computing system to track an aspect pertaining to an object in the physical environment, wherein the aspect comprises a position, velocity or region for the object;
wherein the recorded outcome comprises one or more of:
an entry or exit time, of the object, from a given user-defined stage of the plurality of user-defined stages;

a count or length comprising the object;
a waiting or processing time for service to the object at the given user-defined stage of the plurality of user-defined stages;
wherein the new state represents multiple performance indicators at a given processing stage of the plurality of processing stages.

18. The computer-program product of claim 1, wherein the computing instructions are operable to cause the computing system to receive the historical data by:
wherein the one or more user-defined performance indicators related to the plurality of user-defined stages comprise multiple performance indicators;
selecting, based on the multiple performance indicators, time sequences that provide different values recorded according to the multiple performance indicators for each of the user-defined stages; and
extracting the historical data associated with the time sequences selected.

19. The computer-program product of claim 1,
wherein the computing instructions are operable to cause the computing system to obtain the simulation data by generating stochastic models for the simulated environment comprising multiple inputs with random variation over a time period of a simulation of the simulated environment;
wherein the multiple inputs with random variation comprise one or more inputs different than one or more inputs observed in the physical environment; and
wherein the multiple simulated actions are responses by the discrete event simulator to the multiple inputs.

20. A computer-implemented method comprising:
receiving historical data comprising:
multiple physical actions taken in an experiment in a physical environment, wherein the experiment comprises a plurality of user-defined stages; and
a recorded outcome, according to one or more user-defined performance indicators related to the plurality of user-defined stages, for each physical action of the multiple physical actions taken in the experiment;
generating, by a discrete event simulator, a computing representation of a simulated environment of the physical environment, the simulated environment comprising a plurality of processing stages;
obtaining simulation data comprising:
multiple simulated actions taken by the discrete event simulator in the simulated environment of the physical environment; and
a predicted outcome, according to one or more user-defined performance indicators related to the plurality of processing stages, for each simulated action of the multiple simulated actions taken by the discrete event simulator;
validating, based on the historical data, accuracy of the discrete event simulator at predicting the recorded outcome in the experiment; and
training a computing agent according to a sequential decision-making algorithm, by:
providing, to the computing agent, a computer policy indicating instruction for the computing agent to take an action according to the sequential decision-making algorithm;
receiving, at the discrete event simulator, from the computing agent, a computer instruction, according to the computer policy, for a simulated action in the discrete event simulator;
responsive to simulating the simulated action according to the computer instruction, generating a new state in the simulated environment, wherein the new state indicates a predicted result if a physical action is conducted in the physical environment according to the simulated action;
computing a predicted performance in the simulated environment associated with the new state; and
transmitting, to the computing agent, the new state with a reward indication based on the predicted performance.

21. The computer-implemented method of claim 20, wherein the reward indication is aggregated, by the computing agent, with other reward indications to generate a cumulative reward for determining whether a series of actions by the computing agent improves a baseline performance.

22. The computer-implemented method of claim 20,
wherein the sequential decision-making algorithm is a reinforcement learning algorithm; and
wherein the method further comprises deploying the computing agent trained according to the reinforcement learning algorithm in the physical environment by:
monitoring, by a client node comprising the computing agent, the physical environment for occurrence of one or more of a plurality of learned states according to the reinforcement learning algorithm;
detecting a current state for the physical environment from the plurality of learned states; and
issuing, by the computing agent, based on the current state, a proposed action.

23. The computer-implemented method of claim 22,
wherein the monitoring the physical environment comprises:
obtaining image data representing a plurality of images, each of the plurality of images captured over time of a physical environment;
detecting a first object in the image data;
wherein detecting the current state for the physical environment comprises detecting one of a location or trajectory of the first object; and
wherein the issuing the proposed action comprises issuing a recommendation to change a location or trajectory of a second object in the physical environment, wherein the second object is the first object or a different object in the physical environment.

24. The computer-implemented method of claim 20, wherein the method further comprises:
displaying a graphical user interface for object-oriented modeling of the physical environment by a user;
receiving input, via the graphical user interface, of user selection of objects to represent the physical environment; and
the generating the computing representation of the simulated environment comprises generating in accordance with the user selection.

25. The computer-implemented method of claim 20,
wherein the method further comprises generating, by the discrete event simulator, a value that varies as a function of an improvement in the predicted performance over a baseline performance that is a previously predicted performance or threshold predicted performance; and
the transmitting the reward indication comprises transmitting the reward indication to the computing agent indicating the value.

26. The computer-implemented method of claim 25, wherein the baseline predicted performance is based on a historical baseline predicted performance corresponding to:
   a time period; and
   multiple recorded outcomes based on a given action taken by the computing agent according to the sequential decision-making algorithm.

27. The computer-implemented method of claim 20,
   wherein the receiving, at the discrete event simulator, from the computing agent comprises receiving, from one or more clients nodes, via a Representational State Transfer (REST) Application programming interface (API), input files comprising a starting state vector and a dataset comprising a data representation of a given action recommended by the computing agent; and
   wherein the transmitting the new state and the reward indication comprises transmitting via the REST API, a dataset with indicator of the reward and the new state corresponding to the given action.

28. The computer-implemented method of claim 20,
   wherein the training the computing agent comprises training by receiving, over a communications network, from a first remote server, datasets of the historical data; and
   wherein the historical data comprises the multiple physical actions, and recorded outcomes corresponding to the multiple physical actions indexed by time statuses.

29. The computer-implemented method of claim 28, wherein the obtaining the simulation data comprises obtaining simulation data of multiple simulated actions taken in the discrete event simulator by generating scenarios in the discrete event simulator for the physical environment without communicating with a given remote server.

30. A computing system comprising processor and memory, the memory containing instructions executable by the processor wherein the computing system is configured to:
   receive historical data comprising:
      multiple physical actions taken in an experiment in a physical environment, wherein the experiment comprises a plurality of user-defined stages; and
      a recorded outcome, according to one or more user-defined performance indicators related to the plurality of user-defined stages, for each physical action of the multiple physical actions taken in the experiment;
   generate, by a discrete event simulator, a computing representation of a simulated environment of the physical environment, the simulated environment comprising a plurality of processing stages;
   obtain simulation data comprising:
      multiple simulated actions taken by the discrete event simulator in the simulated environment of the physical environment; and
      a predicted outcome, according to one or more user-defined performance indicators related to the plurality of processing stages, for each simulated action of the multiple simulated actions taken by the discrete event simulator;
   validate, based on the historical data, accuracy of the discrete event simulator at predicting the recorded outcome in the experiment; and
   train a computing agent according to a sequential decision-making algorithm, by:
      providing, to the computing agent, a computer policy indicating instruction for the computing agent to take an action according to the sequential decision-making algorithm;
      receiving, at the discrete event simulator, from the computing agent, a computer instruction, according to the computer policy, for a simulated action in the discrete event simulator;
      responsive to simulating the simulated action according to the computer instruction, generating a new state in the simulated environment, wherein the new state indicates a predicted result if a physical action is conducted in the physical environment according to the simulated action;
      computing a predicted performance in the simulated environment associated with the new state; and
      transmitting, to the computing agent, the new state with a reward indication based on the predicted performance.

\* \* \* \* \*